US012756742B2

(12) United States Patent
Vasudevan et al.

(10) Patent No.: US 12,756,742 B2
(45) Date of Patent: Oct. 6, 2026

(54) SYSTEM AND METHOD FOR PROVABLY SECURE NETWORK OPERATIONS ENSURING INTEGRITY AND AVAILABILITY OF DISTRIBUTED NETWORK RESOURCES

(71) Applicant: Uberspark Inc., Aledo, TX (US)

(72) Inventors: Amit Vasudevan, Aledo, TX (US); Ajit Vasudevan, San Jose, CA (US); Michael J McCall, Pittsburgh, PA (US)

(73) Assignee: UBERSPARK, INC., Aledo, TX (US)

( * ) Notice: Subject to any disclaimer, the term of this patent is extended or adjusted under 35 U.S.C. 154(b) by 0 days.

(21) Appl. No.: 19/409,695

(22) Filed: Dec. 4, 2025

(65) Prior Publication Data

US 2026/0156150 A1 Jun. 4, 2026

Related U.S. Application Data

(60) Provisional application No. 63/727,712, filed on Dec. 4, 2024.

(51) Int. Cl.
*H04L 9/40* (2022.01)
*H04L 41/14* (2022.01)

(52) U.S. Cl.
CPC ........ *H04L 63/1483* (2013.01); *H04L 41/145* (2013.01); *H04L 63/0236* (2013.01); *H04L 63/1458* (2013.01)

(58) Field of Classification Search
CPC ............. H04L 63/1483; H04L 63/0236; H04L 63/1458; H04L 41/145
See application file for complete search history.

(56) References Cited

U.S. PATENT DOCUMENTS

| | | | |
|---|---|---|---|
| 8,627,414 | B1 | 1/2014 | McCune et al. |
| 10,380,346 | B2 | 8/2019 | Sood et al. |

(Continued)

FOREIGN PATENT DOCUMENTS

| | | |
|---|---|---|
| WO | 2024163410 A1 | 8/2024 |

OTHER PUBLICATIONS

Satish Kumar Malaraju, "Securing Cloud Environments with Bastion Hosts", International Journal for Multidisciplinary Research (IJFMR), IJFMR220540257 vol. 4, Issue 5, Published Sep. 2022.*

(Continued)

*Primary Examiner* — Chau Le
(74) *Attorney, Agent, or Firm* — Cherin Law Offices, PC

(57) ABSTRACT

Systems and methods are provided for provably secure network monitoring. A significant technical problem exists in Distributed Network Resources (DNRs) due to their increased reliance on digital communication and control, which presents a substantial risk from cyberattacks. A mathematically-backed secure network monitoring framework is provided that utilizes bastion platforms in the network to ensure end-to-end protection by detecting and preventing cyber threats while isolating, attributing, and securely communicating DNR traffic. Prior to deployment, software for the bastion platform undergoes a formal verification process that models the network mathematically and then evaluates that model to determine if a trusted network security mechanism (TNSM) holds true for the network. TNSM is a security mechanism that enforces permitted patterns of operations of the network without adversarial influence. In some implementations TNSM utilizes anti-spoofing, anti-flooding, secure kill-switch, secure patch delivery, and secure network flow mechanisms to secure the network.

30 Claims, 14 Drawing Sheets

(56) References Cited

U.S. PATENT DOCUMENTS

| | | | |
|---|---|---|---|
| 12,093,367 B2 | 9/2024 | Vasudevan | |
| 12,367,328 B1 | 7/2025 | Vasudevan et al. | |
| 12,519,751 B2 * | 1/2026 | Lee | H04L 63/0236 |
| 2003/0191935 A1 * | 10/2003 | Ferguson | H04W 12/06 713/153 |
| 2013/0347116 A1 | 12/2013 | Flores et al. | |
| 2014/0317737 A1 | 10/2014 | Shin et al. | |
| 2017/0230419 A1 * | 8/2017 | Prafullchandra | G06F 21/604 |
| 2018/0115522 A1 | 4/2018 | Gleichauf | |
| 2020/0007498 A1 * | 1/2020 | Tang | H04L 63/0236 |
| 2022/0350876 A1 * | 11/2022 | Vasudevan | G06F 21/44 |
| 2024/0267736 A1 | 8/2024 | Vasudevan et al. | |
| 2024/0289432 A1 | 8/2024 | Vasudevan | |
| 2024/0346132 A1 | 10/2024 | Vasudevan et al. | |
| 2025/0373645 A1 * | 12/2025 | Kumar | H04L 41/145 |

OTHER PUBLICATIONS

Amit Vasudevan, "überSpark: Practical, Provable, End-to-End Guarantees on Commodity Heterogenous Interconnected Computing (CHIC) Platforms", Software Engineering Institute/Carnegie Mellon University, Retrieved from https://apps.dtic.mil/sti/trecms/pdf/AD1152737.pdf, Published 2021.*

Nam et al., "Bastion: A Security Enforcement Network Stack for Container Networks ", Retrieved From https://www.usenix.org/system/files/atc20-nam.pdf, Published Jul. 2020.*

Vasudevan, Amit et al: System and Methods for Provably Secure Authorized Code Execution, Authorized Cryptographic Operations and Authorized Network Communications; U.S. Appl. No. 19/345,409, filed Sep. 30, 2025.

Derakhshan et al. "Towards End-to-End Verified TEEs via Verified Interface Conformance and Certified Compilers" , In 2023 IEEE 36th Computer Security Foundations Symposium, Jul. 10, 2023 (pp. 324-339). IEEE. (Year 2023).

McCormack et al. "Formalizing an Architectural Model of a Trustworthy Edge IoT Security Gateway", In 2021 IEEE 27th International Conference on Embedded and Real-Time Computing Systems and Applications. Aug. 18, 2021 (pp. 93-102). IEEE. (Year 2021).

McCormack et al. "Jetfire: A Low-Cost, Trusted loT Security Gateway", Carnegie Mellon University CyLab, (Year 2020).

Erata et al: "Survey of Approaches and Techniques for Security Verification of Computer Systems", ACM Journal On Emerging Technologies in Computing Systems (JETC), ACM, 2 Penn Plaza, Suite 701 New York NY 10121-0701, USA, vol. 19, No. 1, Jan. 19, 2023 (Jan. 19, 2023), pp. 1-34.

Haglund Jonas et al: "Formally Verified Isolation of DMA", 2022 Formal Methods in Computer-Aided Design (FMCAD), FMCAD Association and Authors, Oct. 17, 2022 (Oct. 17, 2022), pp. 118-128.

Vasudevan, Amit et al: Practical / Provable, End-to-End Guarantees on Commodity Heterogenous Interconnected Computing Platforms, ACM SIGOPS Operating Systems Review, Jan. 1, 2020 (Jan. 1, 2020), XP093200075, Retrieved from the Internet: URL:https://storage.googleapis.com/gweb-research2023-media/pubtools/5739.pd.

Vasudevan, Amit et al: System and Methods for Unforgeable Telemetry in the Presence of Cyberattacks On a Computer Platform; U.S. Appl. No. 19/254,764, filed Jun. 30, 2025.

* cited by examiner (CONTINUED FROM FIG. 6A)

CONTINUE TO FIG. 8B (CONTINUED FROM FIG. 8A)

CONTINUE TO FIG. 9B (CONTINUED FROM FIG. 9A)

SYSTEM AND METHOD FOR PROVABLY SECURE NETWORK OPERATIONS ENSURING INTEGRITY AND AVAILABILITY OF DISTRIBUTED NETWORK RESOURCES

RELATED APPLICATIONS

This application claims the benefit of U.S. Provisional Application No. 63/727,712 filed on Dec. 4, 2024, which is incorporated herein in its entirety.

TECHNICAL FIELD

The present disclosure relates to at least the field of design of computer platforms including cybersecurity.

BACKGROUND ART

The subject matter discussed in the background section should not be considered prior art merely because of its mention in the background section. Similarly, a problem mentioned in the background section or associated with the subject matter of the background section should not be considered to have been previously recognized in the prior art. The subject matter in the background section merely represents different approaches, which in and of themselves, may also correspond to claimed embodiments.

The rapid growth of Distributed Network Resources (DNRs) across various sectors has led to an increased reliance on digital communication and control in both Information Technology (IT) and Operational Technology (OT) networks. This expansion encompasses multiple domains, including cloud computing, Internet of Things (IoT) applications, industrial control systems, and critical infrastructure. As a result, the attack surface has expanded, and the potential consequences of cyberattacks have become more severe. The proliferation of DNRs has created an ecosystem with numerous devices, systems, and networks that are interconnected, interdependent, and vulnerable to cyber threats.

Current security measures are struggling to keep pace with the evolving threat landscape, which is increasingly characterized by sophisticated AI-powered adversaries and 0-day threats that can morph into 0-hour threats through polymorphic malware that rewrites itself using artificial intelligence. These advanced threats can bypass traditional security controls, exploit unknown vulnerabilities, and compromise even the most secure systems. Furthermore, the commodity nature of many DNRs and their reliance on open-source software and common operating environments create a wide attack surface and single point of failure. Research has also shown that encryption can be easily broken at DNR end-point workstation and device platforms. Moreover, the commodity nature of today's DNR end-point workstation and device platforms expose a large attack surface even when such systems are air-gapped, as demonstrated by the Stuxnet malware which infected via a USB peripheral. Existing solutions fail to identify and mitigate adversarial vectors within safety-critical IT and OT networks on an end-to-end basis.

Traditional firewalls, intrusion detection systems, and encryption mechanisms are insufficient to address these vulnerabilities, particularly in safety-critical IT and OT networks that require robust security solutions that can provide end-to-end protection. Existing solutions often focus on specific aspects of network security, such as encryption or access control, and bolt-on security but fail to provide comprehensive protection against cyber threats by design. The custom-engineered nature of many DNRs and the complexity of modern networks make it essential to develop new security solutions that can adapt to the unique requirements and constraints of these environments.

Furthermore, the firewalls and intrusion detection systems themselves can become vulnerable to cyberattacks, thereby introducing a single point of failure that can compromise the entire network. As these security systems are often connected to the internet or other networks, they can be exploited by sophisticated attackers who can then use them as a pivot point to launch further attacks on the network. This can lead to a cascading effect, where the failure of a single security system can bring down the entire network.

The increasing reliance on digital communication and control in both IT and OT networks has created a pressing need for more robust security solutions that can provide robust guarantees for the integrity and availability of DNRs. The existing solutions fail to identify and mitigate adversarial vectors within these networks on an end-to-end basis, leaving them vulnerable to cyber threats.

To further illustrate the state of the art relevant to the subject matter described above, several representative prior-art references are summarized below.

In U.S. Pat. No. 8,627,414 issued Jan. 7, 2014, inventors McCune et al. disclose a computer including a processor and a verification device. The processor in the computer performs the steps of authenticating a secure connection between a hypervisor and the verification device, measuring the identity of at least a portion of a select guest before the select guest executes any instruction, and sending a measurement of the identity of the select guest to the verification device. The verification device compares the policy stored in the verification device with the measurement of the select guest received by the verification device. The steps of authenticating, measuring, sending, and comparing are performed after receiving a signal indicative of a request to execute the selected guest and without rebooting the computer.

In U.S. Pat. No. 12,093,367 issued Sep. 17, 2024, inventor Amit Vasudevan discloses a system architecture that structures commodity heterogeneous interconnected computer platforms around universal object abstractions, which are a fundamental system abstraction and building block that provides practical and provable end-to-end guarantees of security, correctness, and timeliness for the platform.

In U.S. Pat. No. 12,367,328 issued Jul. 22, 2025, the entirety of which is incorporated herein by reference, inventors Amit Vasudevan et al., disclose systems and methods for mathematical modeling of the hardware and software stack of commodity computer platforms. The mathematical model provides provable guarantees on memory, device, and program execution. This approach addresses the technical problem of reliance on system agents that rely on implicit trust in the operating environment, which can be exploited by sophisticated attackers using complex threats such as memory access exploits and code/data integrity exploits. The solution provides a proactive, mathematically-backed security solution that eliminates entire classes of cyberattacks by design, ensuring provable guarantees on commodity computer platforms running hardware and software stack elements at the lowest operating level. This approach has significant advantages over reactive cybersecurity methods, including reduced complexity and overhead, and increased confidence in the integrity of the system. The solution's main uses include providing mathematically-backed security and availability guarantees for critical infrastructure, financial institutions, and other organizations vulnerable to cyberattacks.

In U.S. patent application Ser. No. 19/254,764 filed on Jun. 30, 2025, the entirety of which is incorporated herein by reference, inventors Amit Vasudevan et al., disclose systems and methods for providing unforgeable telemetry on computer platforms. Mathematical modeling and theorem proving are utilized to guarantee the integrity of telemetry probe execution flow and trigger, thereby preventing circumvention and tampering of logged probe data. In contrast to current state-of-the-art solutions that rely implicitly on the operating environment, this approach provides a sound and complete assurance of telemetry output. The system enables organizations to map unforgeable telemetry probe data to industry and government cybersecurity regulatory controls, ensuring compliance therewith. This invention addresses the shortcomings of existing solutions, including their vulnerability to sophisticated attacks, operational complexity, and inability to provide unforgeable telemetry data, thereby providing a reliable and accurate monitoring output in the presence of cyberattacks on computer platforms.

In U.S. patent application Ser. No. 19/345,409 filed on Sep. 30, 2025, the entirety of which is incorporated herein by reference, inventors Amit Vasudevan et al., disclose system and methods for provably secure authorized code execution and authorized data encryption on computer platforms. The disclosure describes mathematically backed security guarantees at the very lowest operating level, including firmware, hypervisors, and operating systems, thereby cutting out entire classes of complex cyberattacks proactively by design. This solution institutes a secure by default system immune to attacks such as remote code execution, advanced persistent threats, ransomware, and memory access exploits. The system and method ensure authorized code execution and data encryption using dedicated program execution elements for commodity computer platforms.

SUMMARY

Systems and methods are provided for provably secure network monitoring. A significant technical problem exists in Distributed Network Resources (DNRs) due to their increased reliance on digital communication and control, which presents a substantial risk from cyberattacks. A mathematically-backed secure network monitoring framework is provided that utilizes bastion platforms in the network to ensure end-to-end protection by detecting and preventing cyber threats while isolating, attributing, and securely communicating DNR traffic. Prior to deployment, software for the bastion platform undergoes a formal verification process that models the network mathematically and then evaluates that model to determine if a trusted network security mechanism (TNSM) holds true for the network. TNSM is a security mechanism that enforces permitted patterns of operations of the network without adversarial influence. In some implementations TNSM utilizes anti-spoofing, anti-flooding, secure kill-switch, secure patch delivery, and secure network flow mechanisms to secure the network.

A first aspect relates to a system comprising a bastion platform having at least one processor, a network peripheral and at least one non-transitory computer-readable storage medium, the at least one non-transitory computer-readable storage medium having stored thereon a set of program execution elements (PEE), each PEE of the set of PEEs (i) executable by the at least one processor, (ii) having a respective privilege level, (iii) in a respective memory address space, and (iv) enforcing a trusted network security mechanism; a set of computer platforms, the set including the bastion platform and one or more second computer platforms, each of the one or more second computer platforms having a respective second processor, second network peripheral, and second non-transitory computer-readable storage medium; a network of the set of computer platforms; and a mathematical model of the network, the mathematical model (I) having a formal representation of the computer platforms including, for the bastion platform, a representation of the at least one processor, the network peripheral, the at least one non-transitory computer-readable storage medium, and the set of PEEs, and, for the one or more second computer platforms, a representation of the respective second processor, second network peripheral, and second non-transitory computer-readable storage medium, and (II) defining and proving the trusted network security mechanism for the set of computer platforms, the trusted network security mechanism enforcing permitted patterns of operations of the network, the operations of the network including at least one of (i) point-to-point network operations, (ii) broadcast network operations, (iii) multi-cast network operations, and (iv) operations involving access to and manipulation of the state of the bastion platform ("bastion platform network state").

In some embodiments of the system, each of the one or more second computer platforms has a respective network address, and the trusted network security mechanism comprises an anti-spoofing mechanism that ensures authenticity of the respective network addresses of the one or more second computer platforms In some embodiments of the system, the one or more second computer platforms includes a third computer platform, and the trusted network security mechanism comprises an anti-flooding mechanism that ensures that a network throughput of the third computer platform is limited to a predefined threshold.

In some embodiments of the system, the one or more second computer platforms includes a third computer platform; the trusted network security mechanism comprises a secure kill-switch mechanism; and the bastion platform utilizes the secure kill-switch mechanism to block network traffic from the third computer platform when a network throughput of the third computer platform exceeds a predefined threshold.

In some embodiments of the system, the one or more second computer platforms includes a source computer platform and a destination computer platform; and the trusted network security mechanism comprises a secure patch-delivery mechanism that permits the source computer platform to send a tamper-proof, signed patch to the destination computer platform.

In some embodiments of the system, the trusted network security mechanism comprises a secure network flow mechanism to permit only predefined network packet flow between the computer platforms.

In some embodiments of the system, the at least one non-transitory computer-readable storage medium further stores a set of runtime policies to configure the trusted network security mechanism.

In some embodiments, the system further comprises a user interface (UI) module to generate UI elements that provide real-time status of (i) the network, (ii) the bastion platform network state, and (iii) the trusted network security mechanism. The UI elements may include, for example, at least one of (i) a UI element showing real-time asset mapping of the computer platforms with their respective network addresses, (ii) a UI element showing the computer platforms and their network flow status, (iii) a UI element showing patch status of the computer platforms, and (iv) a UI element showing alerts for anti-spoofing, anti-flooding and kill-switch trusted network security mechanisms. The UI module may output, for example, the UI elements to a computer platform in the set of computer platforms.

In some embodiments of the system, the mathematical model (i) defines operational aspects of the network including the set of computer platforms, (ii) defines predicates for the trusted network security mechanisms that are translatable to proof obligations in a composable manner, and (iii) interprets and verifies the proof obligations.

In some embodiments of the system, the mathematical model for the bastion platform (i) defines operational aspects of hardware elements and software stack elements, (ii) defines predicates for security mechanisms on the bastion platform that are translatable to proof obligations in a composable manner, and (iii) interprets and verifies the proof obligations; the security mechanisms include the trusted network security mechanisms; the hardware elements comprise the at least one processor, the network peripheral, and the at least one non-transitory computer-readable storage medium; and the software stack elements comprise the set of PEEs.

In some embodiments of the system, the security mechanisms further include a trusted path security mechanism; the mathematical model further (i) defines a first subset of the set of PEEs are implemented in a low-level programming language, (ii) defines a second subset of the set of PEEs are implemented in a high-level programming language, and (iii) defines and proves the trusted path security mechanism of the union of the PEEs of the first subset and the PEEs in the second subset.

In some embodiments of the system, the bastion platform enforces a trusted path security mechanism for the set of PEEs, the trusted path security mechanism enforcing permitted patterns of operations of the bastion platform, the operations of the bastion platform including at least one of (i) memory access operations, (ii) peripheral access operations, (iii) operations of the at least one processor including at least execution of processor instructions, and (iv) operations involving access to and manipulation of a state of the at least one processor ("processor state"), a state of the at least one non-transitory computer-readable storage medium ("memory state"), and/or a state of a peripheral ("peripheral state").

In some embodiments of the system, a first subset of the set of PEEs are implemented in a low-level programming language; a second subset of the set of PEEs are implemented in a high-level programming language; the PEEs in the first subset enforce the trusted path security mechanism; and the PEEs in the second subset enforce the trusted path security mechanism.

In some embodiments of the system, each of the PEEs in the set of PEEs comprise one or more of the group consisting of a source code file, a binary executable file, a script executable file, a configuration file, and a platform-specific configuration file.

In some embodiments of the system, the one or more second computer platforms includes a set of trusted computer platforms, a set of untrusted computer platforms, and a set of other bastion platforms; and the bastion platform comprises a set of ports, the set of ports including (i) a set of management ports for managing a state of the bastion platform including network policies, (ii) a set of trusted-device ports for connecting to the set of trusted computer platforms, (iii) a set of untrusted-device ports for connecting to the set of untrusted computer platforms, and (iv) a set of bastion-platform ports for connecting to the set of other bastion platforms. The set of ports may, for example, be monitored and acted upon by the set of PEEs with one to one or one to many mapping.

A second aspect relates to a system for performing a computer-implemented method for formal verification of a design and operation of a network of a set of computer platforms, the set of computer platforms including a bastion platform and one or more second computer platforms, the system comprising one or more processors; and a non-transitory computer-readable storage medium storing computer-executable instructions that, when executed by the one or more processors, cause the one or more processors to perform operations comprising acts of modeling in a mathematical model the set of computer platforms in the network using a formal representation of a set of processors ("platform processors") including one or more bastion platform processors for the bastion platform, non-transitory computer-readable storage media ("platform memory") including bastion platform memory for the bastion platform, and a set of network peripherals of the computer platforms; further modeling in the mathematical model the bastion platform with a set of program execution elements (PEEs) in the formal representation, each PEE of the set of PEEs represented as (a) executable by the one or more bastion platform processors, (b) having a respective privilege level, and (c) utilizing a respective memory address space in the bastion platform memory; specifying, in the mathematical model, invariants, to enforce a trusted network security mechanism (TNSM), with assume-guarantee interface-confined mathematical reasoning; evaluating the mathematical model of the network; and determining from the evaluating that the TNSM holds true for the network.

In some embodiments of the system, the TNSM comprises at least one of the group consisting of an anti-spoofing mechanism, an anti-flooding mechanism, a secure kill-switch mechanism, a secure patch delivery mechanism, and a secure network flow mechanism.

In some embodiments of the system, the act of determining comprises determining from the evaluation whether the TNSM holds true for the network of the set of computer platforms regardless of composition or organization of the set of computer platforms and regardless of composition or organization of the PEEs in the set of PEEs of the bastion platform.

In some embodiments of the system, the method further comprises messaging queue semantics between a third computer platform and the bastion platform and between PEEs on the bastion platform, the third computer platform among the one or more second computer platforms; and performing in-situ partial order reduction to allow mathematical model evaluation of at least a subset of the set of computer platforms, the at least a subset including the bastion platform. In some embodiments, the in-situ partial order reduction employs dynamic partial order reduction (DPOR) to eliminate non-pertinent state space expansion and variable scoping issues associated with the use of DPOR in message passing interface modeling.

In some embodiments of the system, the formal representation in the mathematical model further includes a subset of the one or more second computer platforms that are adversary-controlled and at least one adversary model for each of the adversary-controlled computer platforms.

In some embodiments of the system, the formal representation further comprises (i) an interface defined for each computer platform in the set of computer platforms, wherein the interface includes conditions that must be met before and after execution of one or more network operations of the respective computer platform; (ii) a specification of the platform memory and memory regions accessible for each computer platform in the set of computer platforms; (iii) a representation of conditions as predicates over the platform memory's state(s), platform processors'state(s), and platform network peripheral state where the predicates indicate whether the platform memory's state(s), platform processors'state(s) and platforms network peripheral state satisfy the conditions; and (iv) enforced invariants of the TNSM at a start and at an end of each network operation.

In some embodiments of the system, the non-transitory computer-readable storage medium stores further computer-executable instructions that, when executed by the one or more processors, cause the one or more processors to perform additional operations comprising acts of providing, through the mathematical model, first executable instructions for defining an initial configuration of the computer platforms in the set of computer platforms and an initial global network state; providing, through the mathematical model, second executable instructions for executing a series of concurrent steps on each of the computer platforms, wherein each step is associated with a type label indicating a network operation being performed and a respective computer platform associated with the network operation; and providing, through the mathematical model, third executable instructions for managing an internal state of the network as well as internal state of each of the platform processors, including starting new threads and assigning memory locations to each thread for each of the computer platform, wherein the TNSM is enforced by checking corresponding invariants for each network operation.

In some embodiments of the system, the formal representation of the TNSM includes an anti-spoofing mechanism to ensure authenticity of network addresses of the computer platforms in the network.

In some embodiments of the system, the formal representation of the TNSM includes an anti-flooding mechanism that ensures that the throughput of a third computer platform among the one or more second computer platforms is limited to a predefined threshold.

In some embodiments of the system, the formal representation of the TNSM includes a secure kill-switch mechanism; and the bastion platform utilizes the secure kill-switch mechanism to block network traffic from a third computer platform among the one or more second computer platforms when the network throughput threshold exceeds a predefined threshold for the third computer platform.

In some embodiments of the system, the formal representation of the TNSM includes a secure patch-delivery mechanism that permits a source computer platform to send a tamper-proof signed patch to a destination computer platform, the source and destination computer platforms among the one or more second computer platforms.

In some embodiments of the system, the formal representation of the TNSM includes a secure network flow mechanism to permit only predefined network packet flow between the set of computer platforms.

In some embodiments of the system, the computer-executable instructions, when executed by one or more processors, further cause the one or more processors to perform operations comprising acts of defining, in the mathematical model, predicates for the TNSM on the set of computer platforms that are translatable to proof obligations; and providing a theorem prover in the mathematical model, wherein the evaluating the mathematical model further comprises interpreting and verifying the proof obligations using the theorem prover.

In some embodiments of the system, the computer-executable instructions, when executed by the one or more processors, further cause the one or more processors to perform operations comprising acts of defining, in the mathematical model, predicates for the TNSM on the set of computer platforms that are translatable to proof obligations; and providing a model checker in the mathematical model, wherein the evaluating the mathematical model further comprises interpreting and verifying the proof obligations using the model checker.

A third aspect relates to a non-transitory computer-readable storage medium storing computer-executable instructions that, when executed by one or more processors, cause the one or more processors to perform a computer-implemented method for formal verification of a design and operation of a network of a set of computer platforms, the set of computer platforms including a bastion platform and one or more second computer platforms, the computer-implemented method comprising acts of modeling in a mathematical model the set of computer platforms in the network using a formal representation of a set of processors ("platform processors") including one or more bastion platform processors for the bastion platform, non-transitory computer-readable storage media ("platform memory") including bastion platform memory for the bastion platform, and a set of network peripherals of the computer platforms; further modeling in the mathematical model the bastion platform with a set of program execution elements (PEEs) in the formal representation, each PEE of the set of PEEs represented as (a) executable by the one or more bastion platform processors, (b) having a respective privilege level, and (c) utilizing a respective memory address space in the bastion platform memory; specifying, in the mathematical model, invariants, to enforce a trusted network security mechanism (TNSM), with assume-guarantee interface-confined mathematical reasoning; evaluating the mathematical model of the network; and determining from the evaluating that the TNSM holds true for the network.

In some embodiments of the storage medium, the TNSM comprises at least one of the group consisting of an anti-spoofing mechanism, an anti-flooding mechanism, a secure kill-switch mechanism, a secure patch delivery mechanism, and a secure network flow mechanism.

In some embodiments of the storage medium, the act of determining comprises determining from the evaluation whether the TNSM holds true for the network of the set of computer platforms regardless of composition or organization of the set of computer platforms and regardless of composition or organization of the PEEs in the set of PEEs of the bastion platform.

In some embodiments of the storage medium, the method further comprises messaging queue semantics between a third computer platform and the bastion platform and between PEEs on the bastion platform, the third computer platform among the one or more second computer platforms; and performing in-situ partial order reduction to allow mathematical model evaluation of at least a subset of the set of computer platforms, the at least a subset including the bastion platform. In some embodiments, the in-situ partial order reduction employs dynamic partial order reduction (DPOR) to eliminate non-pertinent state space expansion and variable scoping issues associated with the use of DPOR in message passing interface modeling.

In some embodiments of the storage medium, the formal representation in the mathematical model further includes a subset of the one or more second computer platforms that are adversary-controlled and at least one adversary model for each of the adversary-controlled computer platforms.

In some embodiments of the storage medium, the formal representation further comprises (i) an interface defined for each computer platform in the set of computer platforms, wherein the interface includes conditions that must be met before and after execution of one or more network operations of the respective computer platform; (ii) a specification of the platform memory and memory regions accessible for each computer platform in the set of computer platforms; (iii) a representation of conditions as predicates over the platform memory's state(s), platform processors'state(s), and platform network peripheral state where the predicates indicate whether the platform memory's state(s), platform processors'state(s) and platforms network peripheral state satisfy the conditions; and (iv) enforced invariants of the TNSM at a start and at an end of each network operation.

In some embodiments of the storage medium, the medium stores further computer-executable instructions that, when executed by the one or more processors, cause the one or more processors to perform operations comprising acts of providing, through the mathematical model, first executable instructions for defining an initial configuration of the computer platforms in the set of computer platforms and an initial global network state; providing, through the mathematical model, second executable instructions for executing a series of concurrent steps on each of the computer platforms, wherein each step is associated with a type label indicating a network operation being performed and a respective computer platform associated with the network operation; and providing, through the mathematical model, third executable instructions for managing an internal state of the network as well as internal state of each of the platform processors, including starting new threads and assigning memory locations to each thread for each of the computer platform, wherein the TNSM is enforced by checking corresponding invariants for each network operation.

In some embodiments of the storage medium, the formal representation of the TNSM includes an anti-spoofing mechanism to ensure authenticity of the network addresses of the computer platforms in the network.

In some embodiments of the storage medium, the formal representation of the TNSM includes an anti-flooding mechanism that ensures that the throughput of a third computer platform among the one or more second computer platforms is limited to a predefined threshold.

In some embodiments of the storage medium, the formal representation of the TNSM includes a secure kill-switch mechanism; and the bastion platform utilizes the secure kill-switch mechanism to block network traffic from a third computer platform among the one or more second computer platforms when the network throughput threshold exceeds a predefined threshold for the third computer platform.

In some embodiments of the storage medium, the formal representation of the TNSM includes a secure patch-delivery mechanism that permits a source computer platform to send a tamper-proof signed patch to a destination computer platform, the source and destination computer platforms among the one or more second computer platforms.

In some embodiments of the storage medium, the formal representation of the TNSM includes a secure network flow mechanism to permit only predefined network packet flow between the set of computer platforms.

In some embodiments of the storage medium, the computer-executable instructions, when executed by one or more processors, further cause the one or more processors to perform operations comprising acts of defining, in the mathematical model, predicates for the TNSM on the set of computer platforms that are translatable to proof obligations; and providing a theorem prover in the mathematical model, wherein the evaluating the mathematical model further comprises interpreting and verifying the proof obligations using the theorem prover.

In some embodiments of the storage medium, the computer-executable instructions, when executed by the one or more processors, further cause the one or more processors to perform operations comprising acts of defining, in the mathematical model, predicates for the TNSM on the set of computer platforms that are translatable to proof obligations; and providing a model checker in the mathematical model, wherein the evaluating the mathematical model further comprises interpreting and verifying the proof obligations using the model checker.

A fourth aspect relates to a computer-implemented method for formal verification of a design and operation of a network of a set of computer platforms, the set of computer platforms including a bastion platform and one or more second computer platforms, the method comprising acts of: modeling in a mathematical model the set of computer platforms in a network using a formal representation of a set of processors ("platform processors") including one or more bastion platform processors for the bastion platform, non-transitory computer-readable storage media ("platform memory") including bastion platform memory for the bastion platform, and a set of network peripherals of the computer platforms; further modeling in the mathematical model the bastion platform with a set of program execution elements (PEEs) in the formal representation, each PEE of the set of PEEs represented as (a) executable by the one or more bastion platform processors, (b) having a respective privilege level, and (c) utilizing a respective memory address space in the bastion platform memory; specifying, in the mathematical model, invariants, to enforce a trusted network security mechanism (TNSM), with assume-guarantee interface-confined mathematical reasoning; evaluating the mathematical model of the network; and determining from the evaluating that the TNSM holds true for the network.

In some embodiments of the method, the TNSM comprises at least one of the group consisting of an anti-spoofing mechanism, an anti-flooding mechanism, a secure kill-switch mechanism, a secure patch delivery mechanism, and a secure network flow mechanism.

In some embodiments of the method, the act of determining comprises determining from the evaluation whether the TNSM holds true for the network of the set of computer platforms regardless of composition or organization of the set of computer platforms and regardless of composition or organization of the PEEs in the set of PEEs of the bastion platform.

In some embodiments, the method further comprises acts of messaging queue semantics between a third computer platform and the bastion platform and between PEEs on the bastion platform, the third computer platform among the one or more second computer platforms; and performing in-situ partial order reduction to allow mathematical model evaluation of at least a subset of the set of computer platforms, the at least a subset including the bastion platform.

In some embodiments of the method, the in-situ partial order reduction employs dynamic partial order reduction (DPOR) to eliminate non-pertinent state space expansion and variable scoping issues associated with the use of DPOR in message passing interface modeling.

In some embodiments of the method, the formal representation in the mathematical model further includes a subset of the one or more second computer platforms that are adversary-controlled and at least one adversary model for each of the adversary-controlled computer platforms.

In some embodiments of the method, the formal representation further comprises (i) an interface defined for each computer platform in the set of computer platforms, wherein the interface includes conditions that must be met before and after execution of one or more network operations of the respective computer platform; (ii) a specification of the platform memory and memory regions accessible for each computer platform in the set of computer platforms; (iii) a representation of conditions as predicates over the platform memory's state(s), platform processors'state(s), and platform network peripheral state where the predicates indicate whether the platform memory's state(s), platform processors'state(s) and platforms network peripheral state satisfy the conditions; and (iv) enforced invariants of the TNSM at a start and at an end of each network operation.

In some embodiments, the method further comprises acts of providing, through the mathematical model, first executable instructions for defining an initial configuration of the computer platforms in the set of computer platforms and an initial global network state; providing, through the mathematical model, second executable instructions for executing a series of concurrent steps on each of the computer platforms, wherein each step is associated with a type label indicating a network operation being performed and a respective computer platform associated with the network operation; and providing, through the mathematical model, third executable instructions for managing an internal state of the network as well as internal state of each of the platform processors, including starting new threads and assigning memory locations to each thread for each of the computer platform, wherein the TNSM is enforced by checking corresponding invariants for each network operation.

In some embodiments of the method, the formal representation of the TNSM includes an anti-spoofing mechanism to ensure authenticity of the network addresses of the computer platforms in the network.

In some embodiments of the method, the formal representation of the TNSM includes an anti-flooding mechanism that ensures that the throughput of a third computer platform among the one or more second computer platforms is limited to a predefined threshold.

In some embodiments of the method, the formal representation of the TNSM includes a secure kill-switch mechanism; and the bastion platform utilizes the secure kill-switch mechanism to block network traffic from a third computer platform among the one or more second computer platforms when the network throughput threshold exceeds a predefined threshold for the third computer platform.

In some embodiments of the method, the formal representation of the TNSM includes a secure patch-delivery mechanism that permits a source computer platform to send a tamper-proof signed patch to a destination computer platform, the source and destination computer platforms among the one or more second computer platforms.

In some embodiments of the method, the formal representation of the TNSM includes a secure network flow mechanism to permit only predefined network packet flow between the set of computer platforms.

In some embodiments, the method further comprises acts of defining, in the mathematical model, predicates for the TNSM on the set of computer platforms that are translatable to proof obligations; and providing a theorem prover in the mathematical model, wherein the evaluating the mathematical model further comprises interpreting and verifying the proof obligations using the theorem prover.

In some embodiments, the method further comprises acts of defining, in the mathematical model, predicates for the TNSM on the set of computer platforms that are translatable to proof obligations; and providing a model checker in the mathematical model, wherein the evaluating the mathematical model further comprises interpreting and verifying the proof obligations using the model checker.

A fifth aspect relates to a bastion platform comprising one or more processors; a network peripheral; and at least one non-transitory computer-readable storage medium storing computer-executable instructions that, when executed by the one or more processors, cause the bastion platform to perform a respective operation, the computer-executable instructions comprising a set of program execution elements (PEE), each PEE of the set of PEEs, when executed, having a respective privilege level, is in a respective memory address space, and enforcing a trusted network security mechanism for a set of computer platforms on a network including the bastion platform, wherein the trusted network security mechanism provides mathematically guaranteed enforcement of permitted patterns of operations of the network, the operations of the network including at least one of (i) point-to-point network operations, (ii) broadcast network operations, (iii) multi-cast network operations, and (iv) operations involving access to and manipulation of the state of a computer platform in the set of computer platforms.

In some embodiments of the bastion platform, the trusted network security mechanism comprises an anti-spoofing mechanism that ensures authenticity of network addresses of the computer platforms in the set of computer platforms.

In some embodiments of the bastion platform, the trusted network security mechanism comprises an anti-flooding mechanism that ensures that a network throughput of a computer platform in the set of computer platforms is limited to a predefined threshold.

In some embodiments of the bastion platform, the trusted network security mechanism comprises a secure kill-switch mechanism to block network traffic from a computer platform in the set of computer platforms when a network throughput of said computer platform exceeds a predefined threshold.

In some embodiments of the bastion platform, the trusted network security mechanism comprises a secure patch-delivery mechanism that permits a source computer platform in the set of computer platforms to send a tamper-proof, signed patch to a destination computer platform in the set of computer platforms.

In some embodiments of the bastion platform, the trusted network security mechanism comprises a secure network flow mechanism to permit only predefined network packet flow between the computer platforms in the set of computer platforms.

In some embodiments of the bastion platform, the at least one non-transitory computer-readable storage medium further stores a set of runtime policies to configure the trusted network security mechanism.

In some embodiments of the bastion platform, the computer-executable instructions stored on the at least one non-transitory computer-readable storage medium further comprise a user interface (UI) module that, when executed, generates UI elements that provide real-time status of the network, a bastion platform network state, and (iii) the trusted network security mechanism.

In some embodiments of the bastion platform, the UI elements generated by the execution of the UI module include at least one of (i) a UI element showing real-time asset mapping of the set of computer platforms with their respective network addresses, (ii) a UI element showing the set of computer platforms and their network flow status, (iii) a UI element showing patch status of the set of computer platforms, and (iv) a UI element showing alerts for anti-spoofing, anti-flooding and kill-switch trusted network security mechanisms. In some embodiments, the UI module, when executed, outputs the UI elements to a computer platform in the set of computer platforms.

In some embodiments of the bastion platform, the mathematical guarantees of the trusted network security mechanism are achieved via a mathematical model that (i) defines operational aspects of the network including the set of computer platforms, (ii) defines predicates for the trusted network security mechanisms that are translatable to proof obligations in a composable manner, and (iii) interprets and verifies the proof obligations.

In some embodiments of the bastion platform, the mathematical model (i) defines a first subset of the set of PEEs are implemented in a low-level programming language;

(ii) defines a second subset of the set of PEEs are implemented in a high-level programming language; and (iii) defines and proves a trusted path security mechanism of the union of the PEEs of the first subset and the PEEs in the second subset.

In some embodiments of the bastion platform, the computer-executable instructions further comprise a trusted path security mechanism that, when executed, enforces permitted patterns of operations of a subset of the set of computer platforms called bastion platform(s), the operations of the bastion platform(s) including at least one of (i) memory access operations; (ii) peripheral access operations; (iii) operations of one or more processors of the bastion platform(s) including at least execution of processor instructions; and (iv) operations involving access to and manipulation of a state of the one or more processors ("processor state"), a state of storage media of the bastion platform(s) ("memory state"), and/or a state of a peripheral of the bastion platform(s) ("peripheral state"). In some embodiments, a first subset of the set of PEEs are implemented in a low-level programming language; a second subset of the set of PEEs are implemented in a high-level programming language; the PEEs in the first subset enforce the trusted path security mechanism; and the PEEs in the second subset enforce the trusted path security mechanism.

In some embodiments of the bastion platform, each of the PEEs in the set of PEEs comprise one or more of the group consisting of a source code file, a binary executable file, and a script executable file. In some embodiments, a PEE in the set of PEEs further includes one or more of a configuration file and a platform-specific configuration file.

In some embodiments of the bastion platform, the trusted network security mechanism is adapted for the set of computer platforms to include the bastion platform, a set of trusted computer platforms, a set of untrusted computer platforms, and a set of other bastion platforms; and the computer-executable instructions, when executed by the one or more processors, provide a set of ports for the bastion platform, the set of ports including (i) a set of management ports for managing a state of the bastion platform including network policies, (ii) a set of trusted-device ports for connecting to the set of trusted computer platforms, (iii) a set of untrusted-device ports for connecting to the set of untrusted computer platforms, and (iv) a set of bastion-platform ports for connecting to the set of other bastion platforms.

In some embodiments of the bastion platform, the set of ports is monitored and acted upon by the set of PEEs with one to one or one to many mapping.

A sixth aspect relates to a non-transitory computer-readable storage medium storing computer-executable instructions that, when executed by one or more processors, cause the one or more processors to perform a respective operation, the computer-executable instructions comprising a set of program execution elements (PEE), each PEE of the set of PEEs, when executed, having a respective privilege level, is in a respective memory address space, and enforcing a trusted network security mechanism for a set of computer platforms on a network, wherein the trusted network security mechanism provides mathematically guaranteed enforcement of permitted patterns of operations of the network, the operations of the network including at least one of (i) point-to-point network operations, (ii) broadcast network operations, (iii) multi-cast network operations, and (iv) operations involving access to and manipulation of the state of a computer platform in the set of computer platforms.

In some embodiments of the storage medium, the trusted network security mechanism comprises an anti-spoofing mechanism that ensures authenticity of network addresses of the computer platforms in the set of computer platforms.

In some embodiments of the storage medium, the trusted network security mechanism comprises an anti-flooding mechanism that ensures that a network throughput of a computer platform in the set of computer platforms is limited to a predefined threshold.

In some embodiments of the storage medium, the trusted network security mechanism comprises a secure kill-switch mechanism to block network traffic from a computer platform in the set of computer platforms when a network throughput of said computer platform exceeds a predefined threshold.

In some embodiments of the storage medium, the trusted network security mechanism comprises a secure patch-delivery mechanism that permits a source computer platform in the set of computer platforms to send a tamper-proof, signed patch to a destination computer platform in the set of computer platforms.

In some embodiments of the storage medium, the trusted network security mechanism comprises a secure network flow mechanism to permit only predefined network packet flow between the computer platforms in the set of computer platforms.

In some embodiments of the storage medium, the medium further stores a set of runtime policies to configure the trusted network security mechanism.

In some embodiments of the storage medium, the computer-executable instructions further comprise a user interface (UI) module that, when executed, generates UI elements that provide real-time status of the network, a bastion platform network state, and (iii) the trusted network security mechanism. In some embodiments, the UI elements generated by the execution of the UI module include at least one of (i) a UI element showing real-time asset mapping of the set of computer platforms with their respective network addresses, (ii) a UI element showing the set of computer platforms and their network flow status, (iii) a UI element showing patch status of the set of computer platforms, and (iv) a UI element showing alerts for anti-spoofing, anti-flooding and kill-switch trusted network security mechanisms. In some embodiments, the UI module, when executed, outputs the UI elements to a computer platform in the set of computer platforms.

In some embodiments of the storage medium, the mathematical guarantees of the trusted network security mechanism are achieved via a mathematical model that (i) defines operational aspects of the network including the set of computer platforms, (ii) defines predicates for the trusted network security mechanisms that are translatable to proof obligations in a composable manner, and (iii) interprets and verifies the proof obligations.

In some embodiments of the storage medium, the mathematical model (i) defines a first subset of the set of PEEs are implemented in a low-level programming language; (ii) defines a second subset of the set of PEEs are implemented in a high-level programming language; and (iii) defines and proves a trusted path security mechanism of the union of the PEEs of the first subset and the PEEs in the second subset.

In some embodiments of the storage medium, the computer-executable instructions further comprise a trusted path security mechanism that, when executed, enforces permitted patterns of operations of a subset of the set of computer platforms called bastion platform(s), the operations of the bastion platform(s) including at least one of (i) memory access operations; (ii) peripheral access operations; (iii) operations of one or more processors of the bastion platform(s) including at least execution of processor instructions; and (iv) operations involving access to and manipulation of a state of the one or more processors ("processor state"), a state of storage media of the bastion platform(s) ("memory state"), and/or a state of a peripheral of the bastion platform(s) ("peripheral state"). In some embodiments, a first subset of the set of PEEs are implemented in a low-level programming language; a second subset of the set of PEEs are implemented in a high-level programming language; the PEEs in the first subset enforce the trusted path security mechanism; and the PEEs in the second subset enforce the trusted path security mechanism.

In some embodiments of the storage medium, each of the PEEs in the set of PEEs comprise one or more of the group consisting of a source code file, a binary executable file, and a script executable file. In some embodiments, a PEE in the set of PEEs further includes one or more of a configuration file and a platform-specific configuration file.

In some embodiments of the storage medium, the computer-executable instructions, when executed by the one or more processors, provide a bastion platform among the set of computer platforms; the trusted network security mechanism is adapted for the set of computer platforms to further include a set of trusted computer platforms, a set of untrusted computer platforms, and a set of other bastion platforms; and the computer-executable instructions, when executed by the one or more processors, provide a set of ports for the bastion platform, the set of ports including (i) a set of management ports for managing a state of the bastion platform including network policies, (ii) a set of trusted-device ports for connecting to the set of trusted computer platforms, (iii) a set of untrusted-device ports for connecting to the set of untrusted computer platforms, and (iv) a set of bastion-platform ports for connecting to the set of other bastion platforms. In some embodiments, the set of ports is monitored and acted upon by the set of PEEs with one to one or one to many mapping.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures may be represented by a numeral. For purposes of clarity, not every component may be labeled in every drawing. In the drawings.

DETAILED DESCRIPTION

Figure 1:
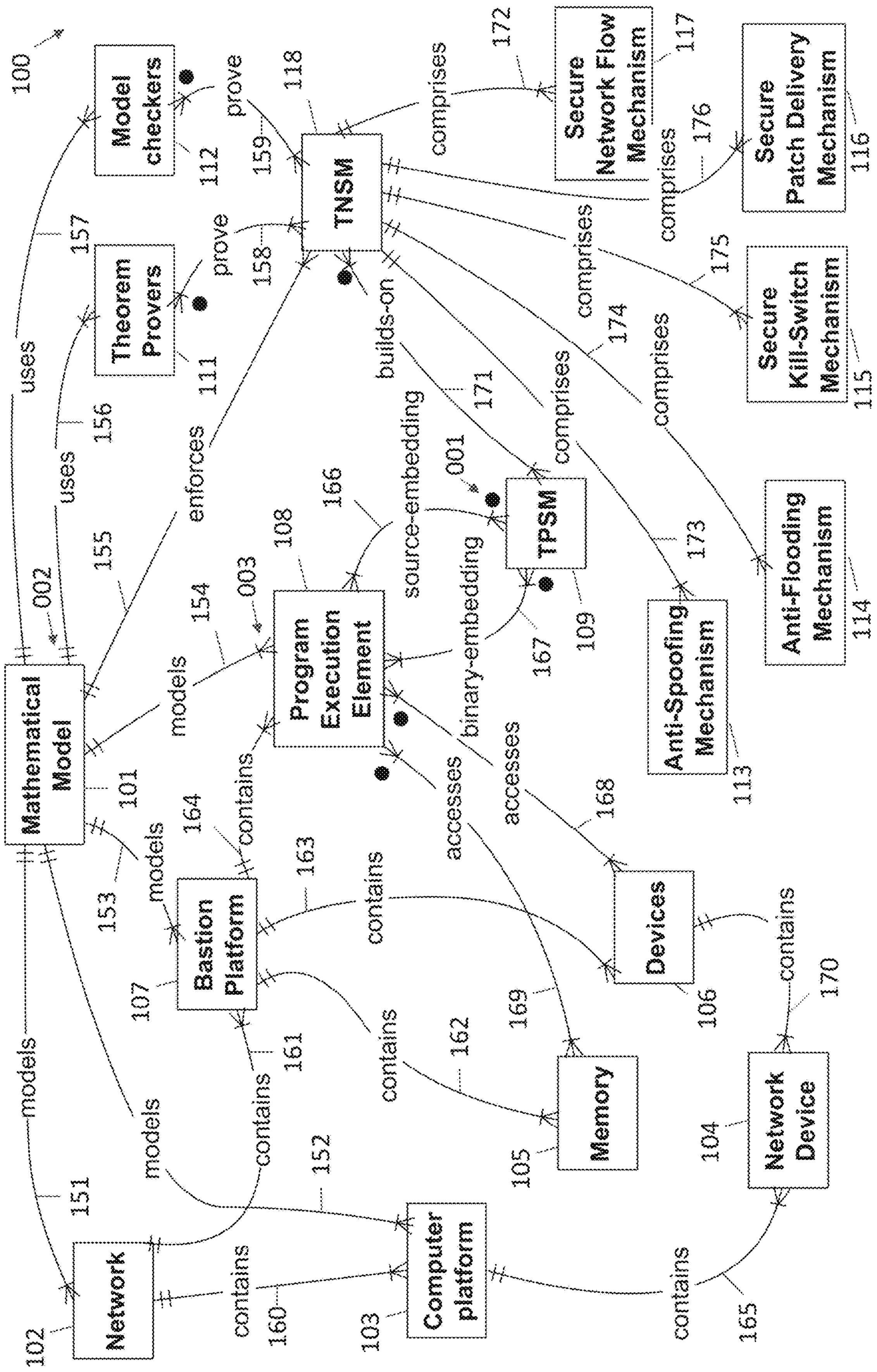
FIG. 1 shows a system 100 for provably secure network operations ensuring integrity and availability of Distributed Network Resources (DNR), according to some embodiments.

The inventors have recognized and appreciated the need to provide a system and method for mathematically-backed, and therefore provably secure, network operations that ensures the integrity and availability of Distributed Network Resources (DNRs) across both IT and OT networks. Some embodiments address the existing vulnerabilities in DNRs by providing a mathematically-backed secure network operation framework that can detect and prevent cyber threats by design on an end-to-end basis, while ensuring the isolation, attribution, and secure communication of DNR traffic. Secure network operation mechanisms (SNOM) are defined and proven in a mathematical model of the network at design time, and enforced at runtime on individual DNRs that encompass various computer platforms and special-purpose bastion platforms (BP) that enforce the secure network operations.

The systems and methods may include a trusted network security mechanism (TNSM) that enforces permitted patterns of operations of the network without adversarial influence. Such network operations can be one or more of: (i) point-to-point network operations, (ii) broadcast network operations, (iii) multi-cast network operations, and (iv) operations involving access to and manipulation of the state of the bastion platform ("bastion platform network state"). TNSM therefore establishes end-to-end integrity and availability of DNRs within a given network.

In some embodiments, TNSM encompasses five key mechanisms—an anti-spoofing mechanism, which ensures authenticity of DNR network addresses; an anti-flooding mechanism, that ensures that a network throughput of a given DNR is limited to a predefined threshold; a secure kill-switch mechanism, that blocks network traffic to and from a given DNR on-demand; a secure patch delivery mechanism that permits a source DNR to send a tamper-proof patch to a destination DNR within the network; and a secure network flow mechanism that ensures that network communication between DNRs follow a pre-defined network flow policies. Other embodiments of TNSM may include a subset of these mechanisms. These mechanisms may be implemented, for example, in any suitable combination of hardware and software.

TNSM may be implemented in various embodiments, including combinations of hardware and software components, to secure DNR platforms. For example, a TNSM may be established between two network devices (e.g., Router A and Router B) that communicate via unicast or multicast protocols. Alternatively, a network device may invoke a set of network protocols provided by the networking stack to establish a TNSM. Additionally, a network device may transmit data over a point-to-point link or a shared network medium, with the network interface being one example of a component that can be used to establish a TNSM. Other network components, such as switches, hubs, or other networking devices, may also be used to establish a TNSM.

Furthermore, a TNSM may be applied to virtual networks communicating via a network hypervisor, virtual private networks (VPNs) communicating with each other or the underlying network infrastructure, or other network configurations. In general, a TNSM can include either pure software components or a combination of hardware and software components, such as network processors, encryption accelerators, or other hardware elements. The TNSM is established on the Bastion platform, providing a secure foundation for approved network operations, including secure routing, switching, and transmission of data over various network topologies. This enables secure and trusted communication between different network devices and ensures the integrity and availability of DNRs across the network.

In some embodiments, TNSM regulates interactions between potentially malicious DNR computer platforms and bastion platforms within the network. TNSM achieves this by designating Bastion Platforms (BP), to act as gatekeepers and enforce strict boundaries (called "bastion network ports") among the DNRs in the network. Bastion network ports prevent unauthorized access to the network state by potentially malicious DNRs. A key aspect of TNSM is the use of mathematical adversary modeling, which involves creating detailed models of potential attackers and their possible actions, allowing for the anticipation and mitigation of all possible non-deterministic adversarial inputs that could be directed at each bastion network port. By tying each bastion network port to a comprehensive set of potential adversarial scenarios known in the art, the TNSM can ensure that the system is resilient to even the most sophisticated and unpredictable attacks including spoofing and flooding attacks. BPs operate at a higher level of privilege than the potentially malicious DNRs, ensuring that they can effectively control and monitor network interactions. The overall security of the system is formally proven using a rigorous mathematical model that takes into account the complex interplay between the network's components and the potential adversaries.

TNSM can be embodied in various forms to protect different layers of a network. For example, in a network embodiment, the TNSM can be implemented as a module within a network device, such as a router or switch, allowing it to regulate interactions between unicast, multicast, or point-to-point communications and the underlying network infrastructure. In another embodiment, the TNSM can be integrated into the firmware of a network interface card (NIC), providing an additional layer of security against malicious attacks targeting the NIC's low-level interfaces. (The term 'network interface card' or 'NIC' refers to any hardware network interface, including but not limited to discrete adapter cards, embedded controllers, and integrated network interface circuitry.) Additionally, the TNSM can be implemented as a module within a DNR platform, enabling it to enforce strict boundaries around network resources and prevent malicious network traffic from compromising the network.

In other embodiments, a TNSM can be applied to network virtualization and segmentation technologies to enhance their security. For instance, in some software-defined networking (SDN) embodiments, the TNSM can be used to regulate interactions between virtual networks and the underlying physical network, preventing malicious network traffic from escaping one virtual network and compromising another. Similarly, in a network function virtualization (NFV) embodiment, the TNSM can be used to enforce strict boundaries around virtual network functions (VNFs), preventing malicious VNFs from accessing sensitive network data or disrupting other VNFs within the same network. By applying the TNSM to these various networking technologies, it is possible to create a robust and comprehensive security framework that protects DNR platforms against a wide range of network-based threats.

The Bastion Platform (BP) is a secure computing environment that comprises a set of Program Execution Elements (PEE) designed to enforce a TNSM. In some embodiments, the BP includes at least one processor, a network peripheral, and at least one non-transitory computer-readable storage medium that stores the PEEs. Each PEE is a self-contained executable entity that runs on the processor, operates within its own memory address space, and has a defined privilege level. The PEEs are designed to work together to provide a robust security framework, ensuring that all network operations and communications are trusted and secure. Though, some embodiments may utilize a single PEE. By executing the PEEs, the BP enforces a strict set of security policies and protocols, preventing unauthorized access to the network and protecting against malicious attacks. The use of multiple PEEs with different privilege levels and memory address spaces allows the BP to implement a hierarchical security architecture, providing an additional layer of protection and flexibility in securing DNRs.

The Bastion Platform (BP) may include a trusted path security mechanism (TPSM) that enforces intended patterns of computer platform operations without adversarial influence. Such computer platform operations can be one or more of memory access operations, peripheral access operations, CPU operations including execution of CPU instructions, and operations involving access and manipulation of CPU, memory or peripheral state. TPSM therefore establishes secure code execution and reliable data communication pathways between PEEs and computer platform hardware within each BP.

A subset of the set of PEEs may be implemented in low-level programming languages, such as C, C++ and Assembly, that offer fine-grained control over hardware resources and performance optimization capabilities, suited for systems programming, embedded systems and high-performance applications. A subset of the set of PEEs may be implemented in a high-level programming language, such as Python, Rust and Java, that have designed-in features of memory safety guarantees and type systems that help prevent common vulnerabilities and ensure integrity of code execution.

In some embodiments, the subset of the set of PEEs that are implemented in low-level programming languages enforce one or more TNSMs and TPSMs. In some embodiments, the subset of the set of PEEs that are implemented in high-level programming languages enforce a subset of the TNSM such as anti-spoofing and anti-flooding. In some embodiments, the subset of the set of PEEs that are implemented in high-level programming languages enforce one or more TNSMs and TPSMs. In some embodiments, a combination of the subset of PEEs implemented in low-level programming language and the subset of PEEs implemented in high-level programming language enforce one or more TNSMs and TPSMs.

In some embodiments, the system comprises a bastion platform including a processor, peripherals, memory, and PEEs modeled mathematically. The SNOMs comprise the TNSM. The SNOMs further comprises anti-spoofing mechanism, anti-flooding mechanism, secure kill-switch mechanism, secure patch delivery mechanism and secure network flow mechanism.

In some embodiments, the PEEs in a subset of PEEs that are implemented in low-level programming languages are generated utilizing a mathematical model of the computer network and/or computer platform to define and prove the enforcement of one or more TNSMs and TPSMs. In some embodiments, the PEEs in the subset of PEEs that are implemented in high-level programming languages are generated utilizing a mathematical model of the computer network and/or computer platform to define and prove the enforcement of one or more TNSMs and TPSMs. In some embodiments, a combination of the subset of PEEs implemented in low-level programming language and the subset of PEEs implemented in high-level programming language are generated utilizing a mathematical model of the computer network and/or computer platform to define and prove the enforcement of a one or more TNSMs and TPSMs.

The mathematical model specification of a bastion platform may define operational aspects of the platform's hardware elements and software stack elements via PEEs running on one or more computing processors of the computer platform. The PEEs may be composed of functions and instructions within functions as the atomic execution units. Additionally, the mathematical model further specifies the composition of the subset of PEEs implemented in low-level programming language and the subset of PEEs implemented in high-level programming language to collectively enforce one or more TNSMs and one or more TPSMs.

The mathematical model specification may further define a network with a set of DNR computer platforms, a set of Bastion Platforms (BP), a set of Bastion network ports and defines and proves the TNSM for the set of DNR computer platforms and BP. The mathematical model specification further includes operational aspects of the network including at least one of: (i) point-to-point network operations, (ii) broadcast network operations, (iii) multi-cast network operations, and (iv) operations involving access to and manipulation of the bastion platform network state. Additionally, the mathematical model further specifies the composition of the subset of DNR computer platforms and BP to collectively enforce one or more TNSMs.

Proving the SNOMs comprises analyzing the mathematical invariants to determine whether the SNOMs for the DNR computing platforms and BP within the network are satisfied, and upon a determination that the SNOMs are not satisfied, analyzing the mathematical invariants to generate a counter-example that shows that the SNOMs do not hold for the network of DNR computing platforms and BP. In cases where the SNOMs do not hold for the network, the counter-example may be used to correct the mathematical model specification such that the SNOMs hold for the network. Analyzing the mathematical invariants to determine whether the SNOMs of the network are satisfied can be achieved by encoding the SNOMs into a computer-assisted theorem proving system and using the computer-assisted theorem proving system to analyze the mathematical invariants to determine if the SNOMs are satisfied.

The BP system can encompass a plurality of software stack entities such as firmware, hypervisor, operating system kernel, application, libraries, and extensions thereof. The SNOMs can be realized on the PEEs'implementation via hardware capabilities or modifications to the program element source code which is eventually compiled to the program element binary instructions. The BP system can also store platform and network configuration data, network policies, and PEE on a non-volatile medium as system packages, which may further comprise one or more PEE source code files, one or more PEE binary executable files ("PEE binaries"), one or more PEE script executable files ("PEE scripts"), one or more configuration files that provide data for PEE and/or platform functionality, and other platform-specific configuration files. Violation of an SNOM at runtime can be logged in a secure memory region and transmitted periodically using a platform signing agent to a local or remote machine.

Some embodiments provide a robust and secure way to achieve the anti-spoofing mechanism, anti-flooding mechanism, secure kill-switch mechanism, secure patch delivery mechanism and secure network flow mechanism within the network by leveraging one or more TNSM thereby ensuring the integrity, availability and confidentiality of network operations. The defined SNOMs provide a clear set of guidelines for implementing secure network operations, and the use of mathematical invariants ensures that these SNOMs are satisfied at runtime in the presence of a sophisticated adversary.

The system and methods described herein may be implemented on various DNR platforms, including but not limited to, software-defined networking (SDN) environments, network function virtualization (NFV) infrastructures, and other network operating system environments. The system may also be used to protect sensitive network traffic and data transmitted over cloud-based network services or other distributed network environments, such as wide area networks (WANs), local area networks (LANs), or wireless networks.

In addition to the technical benefits, this framework may be used to ensure that network designs and configurations have built in security from the start. This reduces the risk of vulnerabilities and improves the overall trustworthiness of their network infrastructure, including routers, switches, firewalls, and other network devices. By following this framework, network administrators can ensure that their networks are resilient to various types of attacks, including denial-of-service (DoS) attacks, man-in-the-middle (MitM) attacks, and other types of cyber threats.

The system can be used in various industries where network security is paramount, such as finance, healthcare, energy, and government, where sensitive data is transmitted over networks and requires robust protection. The use of this technology will provide an added layer of protection for the integrity of critical network infrastructure and sensitive data transmitted over networks, ensuring that it remains confidential and secure at all times, even in the presence of sophisticated cyber threats. This includes protecting against attacks on network protocols such as TCP/IP, DNS, and DHCP, as well as ensuring the security of network services such as virtual private networks (VPNs) and secure socket layer/transport layer security (SSL/TLS).

The following nomenclature is used herein:

Formal Representation: In the context of mathematical modeling, a formal representation refers to a mathematical or logical description of a network, system, process, or concept that is expressed using a rigorous, unambiguous, and well-defined syntax and semantics, allowing for automated analysis, verification, and validation. A formal representation typically involves the use of mathematical logic such as propositional logic, first-order logic or temporal logic, or other mathematical structures like graphs, automata, or algebraic equations, to describe the behavior, properties, or relationships within a system. This representation is "formal" in the sense that it adheres to a set of predefined rules, axioms, and inference mechanisms, enabling machine-based processing, reasoning, and verification, thereby ensuring accuracy, consistency, and reliability in the modeling and analysis of complex systems.

Predicate: In the context of mathematical modeling, a predicate refers to a propositional or first-order logical statement that assigns a property or attribute to an object, system, or state. Predicates are used to express conditions, relations, or constraints that must hold true for a particular situation or set of circumstances, and are often used in formal specifications, models, and proofs to reason about the behavior and properties of systems.

Proof obligations: In the context of mathematical modeling, proof obligations refer to the set of conditions or properties that must be formally proven or verified to ensure the correctness, consistency, and validity of a mathematical model or specification. These obligations typically arise from the axioms, definitions, and inference rules used in the model, and are often discharged using formal proof techniques, such as deductive reasoning, model checking, or theorem proving Theorem prover: In the context of mathematical modeling, a theorem prover refers to a software tool or system that assists in the formal proof and verification of mathematical statements or theorems. Theorem provers use logical and mathematical rules to check the validity of a proof, ensuring that it is correct and rigorous, and providing a high degree of confidence in the results. They are often used to verify the correctness of mathematical models, specifications, and algorithms, and to establish the soundness and completeness of formal systems. Theorem provers can be completely automated (i.e., require no user intervention) or interactive (i.e., require some amount of user intervention).

Model Checker: In the context of mathematical modeling, a model checker refers to a software tool or system that automatically verifies whether a given mathematical model or system specification satisfies certain properties or requirements. Model checkers use algorithms to exhaustively explore all possible states or behaviors of the system, checking if the desired properties hold true in every case. They are often used to detect errors, inconsistencies, or flaws in system designs, protocols, or software code, and to ensure that the system behaves as intended under various operating conditions. Like theorem provers, model checkers can also be completely automated or interactive.

Assume-guarantee interface confined mathematical reasoning: A way of mathematical reasoning about a network of Distributed Network Resources (DNR) computing platforms and Bastion Platforms (BP) by: (a) defining what each DNR platform expects from other DNR platforms and BP in terms of network operations and network state (assumptions); (b) defining what each DNR platform and BP promises to deliver in terms of network operation performance, throughput, latency, and security (guarantees); and (c) ensuring these assumptions and guarantees are clearly defined at the interfaces between DNR platforms and BP to ensure reliable and secure network operations.

Invariant: In the context of mathematical modeling, an invariant refers to a property or quantity that remains unchanged or constant despite transformations, changes, or perturbations to the computer platform (an "immutable property"). Invariants are used to describe and analyze the behavior of complex systems, and can include quantities such as security, liveness, energy, time or symmetry, which remain preserved over time or under different conditions.

Trace: A trace refers to a record or log of the sequence of events, such as function executions, that occur during the execution of a computer program, allowing for the observation and analysis of the program's behavior. Traces are useful in testing and verification, as it enables comparison of the actual program behavior with a mathematical model, helping to ensure that the implementation conforms to the permitted functionality.

Security Mechanism: In the context of cybersecurity, a security mechanism refers to a specific technique, protocol, or control implemented to enforce or ensure a particular security attribute or characteristic of a system, network, or asset, such as encryption for confidentiality, access controls for integrity, or firewalls for availability. Security mechanisms are designed to protect against threats or vulnerabilities and are often evaluated based on their ability to enforce desired security behavior or constraints, which may be codified in a mathematical model or specification.

Memory address: refers to a unique identifier for a specific location in memory where data can be stored or retrieved, essentially representing a single point of storage.

Memory region: is a contiguous range of memory addresses that are allocated for a particular purpose or set of data, effectively grouping multiple individual memory locations together.

Memory address space: the entire collection of memory regions available to a program or process, encompassing all the possible memory addresses it can access, thereby defining its operational boundary.

Memory: the overarching concept that encompasses all memory address spaces, representing the total capacity for storing and retrieving data across an entire system or device, including all virtual and physical storage areas.

Operational aspects: The fundamental capabilities for each of the hardware elements and the software stack elements. The operational aspects of a network may include: point-to-point communications, unicast and multi-cast communications. The operational aspects of a memory may include, for example, read, write, and execute. The operational aspects of a processor may include executing instructions and manipulating hardware registers, The operational aspects of a peripheral may include input from a keyboard, mouse, camera etc. and output to a printer, disk or other forms of storage media. The operational aspects of a program execution element may include reading file, writing to a file and read/write from/to memory and peripherals.

Program Code or Code: Program code or simply code refers to the set of instructions written in a programming language that a computer executes to perform a specific task or achieve a desired outcome. Code can either be in binary format (encoded instructions in the computer platform) or source format (encoded in a specific programming language such as C, Assembly, Java, Python or Shell scripts)

Program Execution Element (PEE): A Program Execution Element (PEE) refers to a self-contained unit of execution on the computer platform that represents a discrete environment for running code and managing computer platform resources, and enforcing security policies. A PEE can comprise a range of components, including applications, libraries, or other executable entities such as functions and objects, and may be implemented in various forms, such as a process, thread, container, virtual machine, or other isolated environment. PEEs can be composed of other PEEs, allowing for hierarchical organization and nested execution environments. Each PEE operates within its own defined boundaries, with its own set of resources, permissions, and security attributes.

PEE code region: A PEE code region or simple code region refers to a specific section or module within a PEE where certain functionality is implemented, such as data processing, authentication, or encryption, and can be defined by boundaries like functions, classes, objects, or namespaces.

Domain PEE (DPEE): A Domain PEE refers to a program execution element that operates within a contained environment, potentially executing code that is not entirely trustworthy. Domain PEEs may execute a wide range of code, including applications, services, or other programs, and are designed to be isolated from sensitive system components to prevent potential security breaches.

Bastion PEE (BPEE): A Bastion PEE (BPEE) refers to a program execution element that is designed to be highly secure and trustworthy, responsible for enforcing system security mechanisms and protecting against adversarial tampering. A BPEE acts as a robust guardian of the system, ensuring the integrity and confidentiality of sensitive data and computations. BPEEs are typically responsible for managing and overseeing other program execution elements, including Domain PEEs.

Keystone PEE (KPEE): A Keystone PEE refers to a specialized program execution element within the set of Bastion PEEs that is responsible for establishing the fundamental security mechanisms of the system. KPEEs perform critical functions such as setting up memory protections, configuring CPU state, and initializing other essential security mechanisms. These PEEs provide the base layer of security upon which the rest of the system relies, ensuring the integrity and trustworthiness of the environment.

Bastion Platform (BP): A Bastion Platform (BP) refers to a special-purpose computing platform within the network that is designed to be highly secure and trustworthy, responsible for enforcing network and system security mechanisms and protecting against adversarial tampering. A BP acts as a robust guardian of the network, ensuring the integrity, availability and confidentiality of sensitive network operations and network state. BPs are typically responsible for managing and overseeing other Distributed Network Resource (DNR) computing platforms.

Distributed Network Resource (DNR): DNR refers to a networked computing platform that provides a shared pool of network resources, such as processing power, memory, and storage, which can be dynamically allocated and managed to support various network operations and applications. Examples of DNR computing platforms include Internet of Things (IoT) devices, endpoint workstations, Supervisory Control and Data Acquisition (SCADA) devices in Operational Technology (OT) networks, as well as other specialized devices such as industrial control systems, medical devices, and even connected autonomous vehicles. DNR platforms are typically overseen and protected by one or more Bastion Platforms (BPs), which ensure the security, integrity, and availability of the network resources and operations.

Trusted Network Security Mechanism (TNSM): A security mechanism that enforces permitted patterns of operations of the network without adversarial influence. Such network operations can be one or more of: (i) point-to-point network operations, (ii) broadcast network operations, (iii) multi-cast network operations, and (iv) operations involving access to and manipulation of the state of the Bastion Platform ("bastion platform network state"). TNSM therefore establishes end-to-end integrity and availability of DNRs within a given network. TNSM achieves this by designating a set of Bastion Platforms within the network, to act as gatekeepers and enforce strict boundaries (called "bastion network ports") among the DNRs in the network. A key aspect of TNSM is the use of mathematical adversary modeling, which involves creating detailed models of potential attackers and their possible actions, allowing for the anticipation and mitigation of all possible non-deterministic adversarial inputs that could be directed at the each bastion network port.

Trusted Path Security Mechanism (TPSM): A security mechanism that enforces intended patterns of computer platform operations without adversarial influence. Such computer platform operations can be one or more of memory access operations, peripheral access operations, CPU operations including execution of CPU instructions, and operations involving access and manipulation of CPU, memory or peripheral state. TPSM therefore establishes secure code execution and reliable data communication pathways between PEEs and computer platform hardware, ensuring adversary-free, reliable and trustworthy interaction within a Bastion Platform (BP).

Low-level programming language: Low-level programming languages, such as C, C++, and Assembly, offer fine-grained control over hardware resources and performance optimization capabilities, making them well-suited for systems programming, embedded systems, and high-performance applications. However, this level of control also comes with inherent security risks due to the lack of built-in memory safety features, type checking, and error handling mechanisms, making them more susceptible to vulnerabilities like buffer overflows, data corruption, and exploitation by malicious code.

High-level programming language: High-level programming languages such as Rust, Python and Java provide a foundation for building secure software systems by offering features such as memory safety guarantees, type systems, and formal verification mechanisms that help prevent common vulnerabilities and ensure the integrity of code execution. Additionally, many high-level programming languages also incorporate low-level programming language runtime components, such as C or Assembly code, to optimize performance, interact with hardware resources, or leverage existing libraries and frameworks, which can introduce potential security risks if not properly managed and isolated.

System Package: System packages refer to collections of PEEs, including executables, libraries, scripts, and configuration files, that are necessary for the execution of a program or application on a computer platform. These PEEs may include operating system components, device drivers, firmware, and other software elements that enable the execution of a program or application. System packages provide a structured way to manage and distribute these PEEs, ensuring that all necessary elements are present and correctly configured for PEE execution.

Some embodiments provide advantages over traditional systems and methods of securing networks. These advantages may include:

1. Elimination of single point of failure: Some embodiments eliminate the single point of failure for network operations by introducing mathematically-backed secure network operations. By enforcing SNOMs at runtime, the technology ensures that only authorized DNRs are part of the network, malicious DNRs cannot flood the network and only permitted network flows are part of the network. This provides immunity against spoofing, flooding and network data ex-filteration-based attacks by design.
2. Mathematical Modeling and Provable Security: The use of mathematical modeling incorporating adversarial modeling and computer-assisted theorem proving enables formal verification and validation of the SNOMs, ensuring that they are satisfied at runtime in the presence of a sophisticated adversary. This provides a high level of confidence in the correctness and security of the network, reducing the risk of vulnerabilities and improving overall trustworthiness.
3. Guaranteed network isolation and attribution: Communication to and from a DNR is isolated, attributable, and passed through a BP on the network, ensuring that malicious DNRs cannot bypass their network traffic analysis/enforcement.
4. Accurate visualization and integration of DNRs: The secure network monitoring approach accurately visualizes and integrates DNRs within a complex operational technology environment, enabling better management and control.
5. Tamper-proof assets with secure kill-switch functionality: Some embodiments of the system log information about tamper-proof assets and enable secure kill-switch functionality, ensuring that critical systems are protected from unauthorized DNRs at all times.
6. Secure patch management: The system may perform secure and reliable network-based patch management, reducing the risk of vulnerabilities and ensuring that DNRs remain up-to-date and secure.

FIGS. 1-20 show diagrams for some embodiments of the systems and methods described herein. For purposes of discussion each of the diagrams is referred to as a system, however, it should be appreciated that discussed systems may also be implemented through corresponding methods. Some embodiments of the disclosed diagrams (whether through systems or methods) may not include all of the blocks shown in the corresponding diagram, or may include other blocks/steps not represented in the diagrams.

Each of the diagrams include blocks (e.g., blocks 101 and 102 in FIG. 1) and connecting lines (e.g., connecting line 153 in FIG. 1). Each block may represent, for example, stored information (e.g., a definition for a peripheral), an aspect of a method (e.g., a method step), or a module of the corresponding system. A module comprises the hardware and/or software, to implement a defined capability (e.g., the corresponding method step). For example, such a capability may be implemented through a module having one or more processors executing computer code stored on one or more non-transitory computer-readable storage medium. In some embodiments, a capability is implemented at least in part through a module having dedicated hardware (e.g., an ASIC, an FPGA). In some embodiments modules may share components. For example, a first function module and a second function module may both utilize a common processor (e.g., through time-share or multithreading) or have computer executable code stored on a common computer storage medium (e.g., at different memory locations). In some instances, a module may be identified as a hardware module or a software module. A hardware module includes or shares the hardware for implementing the capability of the module. A hardware module may include software, that is, it may include a software module. A software module comprises information that may be stored, for example, on a non-transitory computer-readable storage medium. In some embodiments, the information may comprise instructions executable by one or more processors. Such instructions, when executed, may utilize additional general purpose or special purpose hardware directly or indirectly accessible by the one or more processors. In some embodiments, the information may be used at least in part to configure hardware such as an FPGA. The capability of a software module may be implemented, for example, by reading the software module from a storage medium and executing it with one or more processors, or by reading the software module from a storage medium and using the information to configure hardware. "Mechanism" is used herein synonymously with module.

The relationship between blocks is illustrated by connecting lines. The termination of a connecting line indicates whether there may be multiple instances of a block present in the illustrated embodiment. Specifically, the symbol 002 (FIG. 1) indicates that the connection is to a single functional block while the symbol 003 indicates that the connection may be to multiple functional blocks. For example, connecting line 154 connects a single mathematical model 101 to one or more program execution elements 108. Unless explicitly stated otherwise, a connection with the symbol 002 is the starting point of the flow while the symbol 003 is the ending point of the flow for a given connecting line. For example, the flow of connecting line 154 is from the mathematical model 101 to program execution elements 108. For some connecting lines, the starting point of the flow is indicated via a shaded circle symbol 001. For example, connecting line 166 connects TPSM 109 to program execution elements 108 and is read as one or more TPSM 109 has source-embedding within one or more program execution elements 108. Solid connecting lines such as connection line 154 represent flow, interaction and dependency between various functional blocks. The symbol 004 (FIG. 2) indicates that the connection is to zero or more of a nested functional block. For example, connecting line 262 connects Domain PEE 205 to Domain PEE 205 and is read as one or more Domain PEE 205 comprises zero or more nested Domain PEE 205.

There are several types of connection lines. A "builds-on" connecting line (e.g., connecting line 171, FIG. 1) indicates that one component (e.g., a software module or cryptographic primitive) utilizes, extends, or relies on the functionality, security guarantees, or trust assumptions provided by another component, establishing a dependency or inheritance relationship between them. An "enforces" connecting line (e.g., connecting line 155, FIG. 1) indicates that one component (e.g., a security policy or access control mechanism) imposes restrictions, constraints, or rules on another component, ensuring compliance with specific security requirements or regulations. A "models" connecting line (e.g., connecting line 154, FIG. 1) indicates that one component (e.g., a formal specification or mathematical representation) provides an abstract or conceptual representation of another component, capturing its behavior, properties, or characteristics. A "contains" connecting line (e.g., connecting line 161, FIG. 1) indicates that one component (e.g., a data structure or container) holds, includes, or comprises another component, establishing a hierarchical or compositional relationship between them. An "accesses" connecting line (e.g., connecting line 169, FIG. 1) indicates that one component (e.g., a software process or thread) interacts with, retrieves data from, or manipulates another component, establishing a communication or data exchange relationship between them. A "uses" connecting line (e.g., connecting line 157, FIG. 1) indicates that one component (e.g., an application or service) utilizes, invokes, or depends on the functionality, services, or resources provided by another component, establishing a dependency or utilization relationship. A "prove" connecting line (e.g., connecting line 158, FIG. 1) indicates that one component (e.g., a formal proof or verification tool) demonstrates, validates, or establishes the correctness, soundness, or security of another component, providing a guarantee or assurance about its properties or behavior. A "source-embedding" connecting line (e.g., connecting line 166, FIG. 1) indicates that one component (e.g., a software library, capability or framework) is integrated, embedded, or incorporated into the source code of another component, establishing a tight coupling or integration relationship between them. A "binary-embedding" connecting line (e.g., connecting line 167, FIG. 1) indicates that one component (e.g., a cryptographic key, watermark or capability) is embedded, inserted, or encoded into the binary representation of another component, establishing a binding or tamper-evidence relationship between them. A "comprises" connecting line (e.g., connecting line 173, FIG. 1) indicates that one component (e.g., a system, module, or framework) is composed of, consists of, or is made up of another component, establishing a whole-part or aggregation relationship between them, where the comprising component is the container or aggregate and the comprised component is the contained part.

A "derives" connecting line (e.g., connecting line 352, FIG. 3) indicates that one component (e.g., a cryptographic key or security parameter) is logically or mathematically derived from another component, establishing a causal or dependency relationship between them. A "parameterizes" connecting line (e.g., connecting line 353, FIG. 3) indicates that one component (e.g., an algorithm or function) is configured or customized using parameters or inputs provided by another component, allowing for flexibility and adaptability in its behavior or operation. An "implement" connecting line (e.g., connecting line 361, FIG. 3) indicates that one component (e.g., a software module or system) provides a concrete realization or implementation of the functionality, interface, or specification defined by another component, establishing a relationship between design and implementation. A "confine" connecting line (e.g., connecting line 360, FIG. 3) indicates that one component (e.g., a security mechanism or access control policy) restricts or limits the behavior, access, or operation of another component, ensuring that it operates within established boundaries or constraints. A "map-to" connecting line (e.g., connecting line 362, FIG. 3) indicates that one component (e.g., a data structure or format) is associated with or corresponds to another component (e.g., a different data structure or format), establishing a relationship between the two components that enables translation, transformation, or equivalence between them.

A "validates" connecting line (e.g., connecting line 1061, FIG. 10) indicates that one component (e.g., a verification tool or testing framework) checks, verifies, or confirms the correctness, accuracy, or consistency of another component, ensuring that it meets specific requirements or standards. A "specifies" connecting line (e.g., connecting line 1068, FIG. 10) indicates that one component (e.g., a formal specification or interface definition) provides a precise and detailed description of the behavior, functionality, or properties of another component, serving as a reference or contract for its implementation or use. An "outputs" connecting line (e.g., connecting line 1071, FIG. 10) indicates that one component (e.g., a software module or function) produces or generates data, results, or effects that are used, consumed, or relied upon by another component, establishing a flow of information or dependency between them. An "invokes" connecting line (e.g., connecting line 1059, FIG. 10) indicates that one component (e.g., a software process or thread) calls, executes, or activates the functionality or services provided by another component, establishing a control or request-response relationship between them. A "constrains" connecting line (e.g., connecting line 1070, FIG. 10) indicates that one component (e.g., a security policy or access control mechanism) imposes limitations, restrictions, or boundaries on the behavior, operation, or access of another component, ensuring that it operates within established guidelines or constraints. A "generates" connecting line (e.g., connecting line 1057, FIG. 10) indicates that one component (e.g., a software tool or algorithm) creates, produces, or synthesizes another component (e.g., data, code, or configuration), establishing a creative or productive relationship between them. A "performed-on" connecting line (e.g., connecting line 1063, FIG. 10) indicates that one component (e.g., an operation or action) is executed, applied, or carried out on or with respect to another component (e.g., data, system, or resource), establishing a subject-verb-object relationship between them. A "run-on" connecting line (e.g., connecting line 1065, FIG. 10) indicates that one component (e.g., a software application or service) is deployed, executed, or operated on or using the resources, infrastructure, or environment provided by another component (e.g., hardware platform, operating system, or cloud service), establishing a hosting or execution relationship between them.

FIG. 1 shows a system 100 for provably secure network operations ensuring integrity and availability of distributed network resources (DNR).

In system 100 network 102 contains (see connecting line 160) one or more computer platforms 103 and one or more Bastion Platforms 107 (see connecting line 161). Bastion Platforms 107 contains one or more Program Execution Elements (PEE) 108 (see connecting line 164). Bastion Platforms 107 contains one or more Memory 105 and one or more Devices 106 (see connecting lines 162 and 163 respectively). The network 102 is modeled in a mathematical model 101 (see connecting line 151). Mathematical model 101 enforces one or more Trusted Network Security Mechanisms (TNSM) 118 (see connecting line 155) and uses one or more theorem provers 111 (see connecting line 156) or one or more model checkers 112 (see connecting line 157) to prove TNSM 118 (see connecting lines 158 and 159 respectively). Mathematical model 101 also models one or more Program Execution Elements (PEE) 108 (see connecting line 154) and one or more Bastion Platform 107 (see connecting line 153). PEE 108 accesses both memory 105 (see connecting line 169) and devices 106 (see connecting line 168). Devices 106 contains (see connecting line 170) one or more Network devices 104. Computer platform 103 contains (see connecting line 165) one or more Network devices 104. Trusted Path Security Mechanism (TPSM) 109 may be embedded in source into PEE 108 (see connecting line 166) or embedded in binary into PEE 108 (see connecting line 167). TNSM 118 builds-on (see connecting line 171) one or more TPSM 109. TNSM 118 comprises one or more Anti-spoofing Mechanism 113, Anti-flooding Mechanism 114, Secure Kill-switch Mechanism 115, Secure Patch Delivery Mechanism 116 and Secure Network Flow Mechanism 117 (see connecting lines 173, 174, 175, 176 and 172, respectively)

Computer platforms 103 represent Distributed Network Resources (DNR) that are interconnected within the network via Bastion platforms 107. In some embodiments of the system 100, the computer platforms 103 and bastion platforms 107 can be organized in multiple sections of the network 102. In one embodiment the computer platforms 103 and bastion platforms 107 can be organized as in a hierarchical fashion within the network 102. The computer platforms 103 and bastion platforms 107 communicate with each other via: (i) point-to-point communication; (ii) multicast communication; (iii) uni-cast communication; and (iv) broadcast communication.

The computer platform 103 and Bastion Platform 107 have one or more network devices 104 for communication purposes. In some embodiments of system 100, the network devices can be an ethernet device, a fiber optic device, or a wireless device. This allows for various network 102 topologies and domain specific network 102 organization.

Bastion platforms 107 contain PEEs 108 which are self-contained units of code that execute independently within their own memory address space, providing a sandboxed environment to isolate application code from firmware, hypervisors, and other PEEs within a Bastion platform 107. This separation of concerns enables robust security, fine-grained control over code execution, and efficient management of program execution, making it an ideal solution for developing secure by design Bastion platforms 107.

Anti-spoofing mechanism 113 ensures authenticity of the respective network addresses of the one or more computer platforms 103 within the network 102. This ensures that no two computer platforms 103 can share the same network address at the same time. This eliminates a wide class of spoofing attacks on the network by design.

Anti-flooding mechanism 114 ensures that a network throughput of a computer platform 103 is limited to a predefined threshold. This ensures that no computer platform 103 can actively saturate the network and eliminates a wide class of flooding attacks on the network by design. This guarantees network availability even in the presence of malicious computer platforms 103.

Secure kill-switch mechanism 115 ensures that a compromised computer platform 103 can be immediately disconnected from the network 102 in case of a security breach or malfunction. This is achieved through a remote shutdown or isolation of the computer platform 103 by the Bastion Platform (BP) 107, preventing the compromised platform from causing further harm to the network. By design, this mechanism guarantees that a malicious computer platform 103 can be quickly neutralized, minimizing the attack surface and preventing lateral movement.

Secure patch delivery mechanism 116 ensures that software updates and security patches are delivered to computer platforms 103 in a trusted and authenticated manner. This mechanism verifies the integrity and authenticity of the patches, ensuring that they have not been tampered with or altered during transmission. The secure patch delivery mechanism also ensures that patches are applied correctly and consistently across all computer platforms 103, preventing potential vulnerabilities and weaknesses that could be exploited by attackers. By design, this mechanism guarantees that the network 102 remains up-to-date and secure, reducing the risk of exploitation by known vulnerabilities.

Secure network flow mechanism 117 ensures that network traffic is properly regulated and controlled within the network 102. This mechanism monitors and manages network flows, preventing unauthorized or malicious traffic from traversing the network. By design, this mechanism prevents a wide class of attacks that rely on network traffic manipulation, such as traffic injection or modification, data exfiltration and ensures a safe and robust network 102.

The system 100 may include a formal mathematical model 101 of the network 102, computer platforms 103, and Bastion Platforms (BPs) 107 that provides a rigorous foundation for proving the correctness and effectiveness of the Trusted Network Security Mechanisms (TNSM). This mathematical model encodes the network operations, including packet transmission and routing, as well as the operations of the Bastion Platforms enforcing the TNSM, in a formal specification language. The TNSM, comprising anti-spoofing, anti-flooding, secure kill-switch, secure patch delivery, and secure network flow mechanisms, is then formally verified against this mathematical model using theorem provers 111 or mathematical model checkers 112. By leveraging the power of mathematical proof, the correctness of the TNSM is established, guaranteeing that the network 102 is secure against a wide range of attacks and vulnerabilities, including spoofing, flooding, and unauthorized access. The mathematical model provides a high degree of assurance that the network security mechanisms are functioning as intended, and that the network 102 is protected against known and unknown threats, providing a robust and trustworthy foundation for critical applications and services.

These aspects may make some embodiments an attractive solution for use in a wide range of applications involving networks, including but not limited to financial services, healthcare, education, government, industrial control and e-commerce.

Bastion Platforms (BP)

The Bastion Platform (BP) is a secure computing platform that enforces the Trusted Network Security Mechanisms (TNSM) to protect a network from various types of attacks. The BP comprises Program Execution Elements (PEE) that work together to provide a robust and trustworthy environment for executing critical applications and services.

Figure 2:
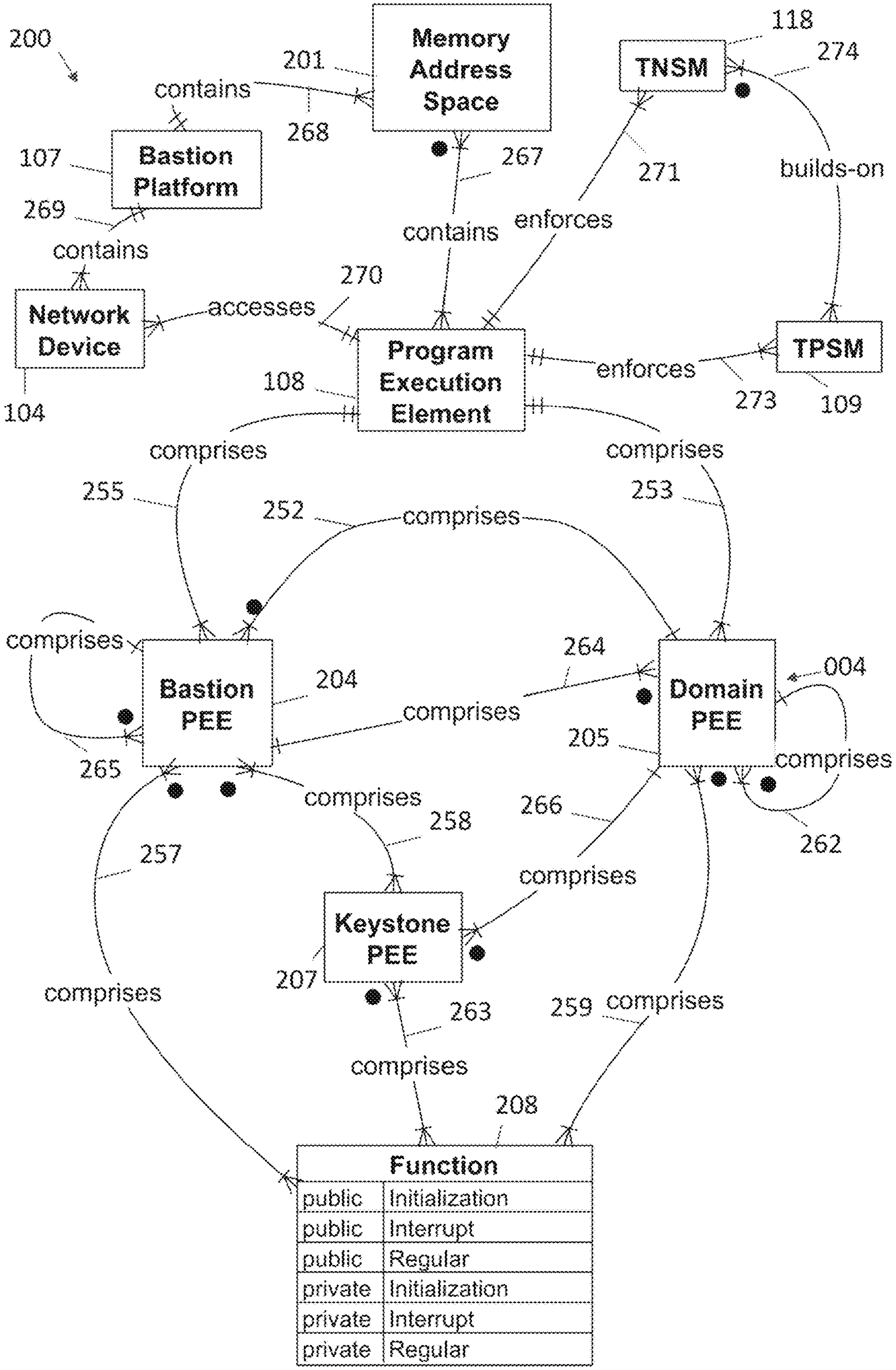
FIG. 2 shows a system 200 for bastion platform that enforces trusted network security mechanism, according to some embodiments.

FIG. 2 shows a system 200 comprising PEEs 108 that executes on a Bastion Platform (BP). In system 200 a BP 107 contains one or more Memory Address Spaces 201 and one or more Network Devices 104 (see connecting lines 268 and 269 respectively). In system 200 one or more Memory Address Spaces 201 contains (see connecting line 267) one or more PEEs 108. Each PEE 108 accesses (see connecting line 270) one or more Network Devices 104. Each PEE 108 enforces one or more Trusted Path Security Mechanism (TPSM) 109, and one or more Trusted Network Security Mechanism (TNSM) 118 (see connecting lines 273 and 271 respectively). One or more TNSM 118 builds on (see connecting line 274) one or more TPSM 109. PEE 108 may comprise one or more of Bastion PEE (BPEE) 204 (see connecting line 255) and one or more of Domain PEE (DPEE) 205 (see connecting line 253). One or more BPEEs 204 comprises one or more Keystone PEE (KPEE) 207 (see connecting line 258). One or more BPEEs 204, DPEEs 205 and KPEEs 207 may further comprise (see connecting lines 257, 259 and 263 respectively) one or more functions 208. PEE functions 208 comprise public and private functions that perform initialization, service interrupts and handle regular processing. One or more DPEEs may comprise zero or more nested DPEEs (see connecting line 262) and may comprise zero or more nested BPEEs (see connecting line 264). One or more BPEE may comprise zero or more nested BPEEs (see connecting line 265) and may comprise zero or more nested DPEEs (see connecting line 252). Similarly, one or more KPEE may comprise zero or more nested DPEEs (see connecting line 266).

Program Execution Elements (PEE)

In modern computing systems, multiple software components coexist and interact with one another to provide a seamless user experience. At the lowest level, firmware is responsible for initializing and configuring hardware components, such as memory management, I/O operations, and clocking. Firmware executes directly on the hardware, providing a bridge between the physical components and the operating system.

The next layer up is the hypervisor, also known as a virtual machine monitor, which creates and manages multiple virtual machines that run isolated OS instances. A hypervisor can be thought of as a "host" for multiple OS guests, allowing them to share the same physical hardware resources while maintaining separate execution environments. Above the hypervisor, one or more operating systems are installed, which provide a runtime environment for applications and system services. Within these operating systems, additional isolation mechanisms such as containers and namespaces can be used to further segregate applications and services, providing an extra layer of security and resource management.

However, current computing systems have several limitations and vulnerabilities due to their layered architecture. For instance, firmware and hypervisors can be vulnerable to attacks, as they often rely on outdated code and lack robust security features. Moreover, the complexity of modern operating systems makes it challenging to develop secure and efficient software applications.

The system 200 as depicted in FIG. 2 presents a novel solution to develop robust and secure software applications on a BP 107 thereby setting an ironclad foundation to implement TNSM.

In system 200, DPEEs 205 are PEEs that operate within a memory address space 201 potentially executing code that is not entirely trustworthy. BPEEs 204 are PEEs that are designed to be highly secure and trustworthy, responsible for enforcing system security mechanisms and protecting against adversarial tampering. BPEEs act as a robust guardian of the system, ensuring the integrity and confidentiality of sensitive data and computations. BPEEs are typically responsible for managing and overseeing other program execution elements, including DPEEs 205.

DPEEs 205 are typically managed and overseen by Bastion PEEs 204, which provide protection and oversight to prevent malicious behavior. Domain PEEs may execute a wide range of code, including applications, services, or other programs, and are designed to be isolated from sensitive system components to prevent potential security breaches.

KPEEs 207 are PEEs that ensure fundamental security mechanisms of the system. KPEEs perform critical functions such as setting up memory protections, configuring CPU state, and initializing other essential security mechanisms. KPEEs provide the base layer of security upon which the rest of the system relies, and establish and maintain the constrained environment of DPEEs 205, ensuring the integrity and trustworthiness of the environment.

In addition to containing functions 208, program execution elements (PEEs) 108 can also be composed of other nested PEEs, allowing for a hierarchical organization of execution environments. One or more DPEEs may comprise zero or more nested DPEEs (see connecting line 262) and may comprise zero or more nested BPEEs (see connecting line 264). One or more BPEE may comprise zero or more nested BPEEs (see connecting line 265) and may comprise zero or more nested DPEEs (see connecting line 252). Similarly, one or more KPEE may comprise zero or more nested DPEEs (see connecting line 266). This nested structure enables complex scenarios where a PEE acts as a host or container for other PEEs, each potentially executing its own set of functions or further nested PEEs. An exemplary embodiment of such an organization is a PEE that represents a host kernel executing another PEE, which in turn is a container under the Linux operating system. This container PEE can then host a set of process PEEs that execute within the confines of the container, illustrating a layered approach to program execution where each layer is a distinct PEE. This capability to embed PEEs within one another facilitates flexible and efficient management of computational resources, enabling the present invention to support a wide range of application scenarios, from simple function executions to complex, distributed computing environments.

In system 200, each PEE 108 provides a sandboxed environment that isolates application code from firmware, hypervisors, and other PEEs. This separation of concerns enables robust security.

KPEEs 207 have the highest privilege in a given memory address space 201. BPEE 204 has a lower privilege than a KPEE 207 and may house operating kernels or hypervisors as well as dependent libraries in a given memory address space. Finally, DPEE 205 has a lower privilege level than both KPEE and BPEE and may house applications and supporting libraries. KPEEs 207 are responsible for loading other PEEs in a given memory address space.

PEEs 108 may further comprise one or more functions 208, which form the atomic unit of functionality of the PEE. Each function can be a standalone entity that performs specific tasks or operations within the PEE. PEE functions 208 further comprises one or more initialization functions that are responsible for initializing the PEE, one or more interrupt functions to handle platform device interrupts, providing a way to interact with hardware elements and a set of regular functions that together accomplish PEE functionality. Public functions can be called from functions of other PEEs, enabling inter-PEE communication and collaboration. Private functions are only callable from functions within the said PEE, ensuring secure access control.

In one embodiment of system 200, the BP may be implemented as a hypervisor that runs on top of the physical hardware. In another embodiment of system 200, the BP may be implemented as a regular operating system that runs on top of the physical hardware. The operating system provides a set of APIs and services that allow the BP to enforce TNSM. In an embodiment of system 200, the BP may be implemented as firmware that runs on specialized hardware, such as network interface cards or Field Programmable Grid Arrays (FPGA). The firmware provides a low-level implementation and enforcement of TNSM. The system 200 may also be implemented in an hybrid embodiment where in the BP is implemented as a combination of two or more of the above embodiments. For example, the BP may be implemented as a hypervisor that runs on top of a regular operating system, which in turn runs on top of firmware.

PEE functions 208 can be embodied in various forms depending on the type of PEE. For example, if the PEE is a container, the public initialization function may be the container's first process main function, the public interrupt function may be the namespace interrupt handler, and the public regular functions may be container sockets providing services or named pipes or shared memory for inter-container communication. Similarly, if the PEE is a virtual machine (VM), the public initialization function can be the VM entry point, the public interrupt function can be the VM interrupt handler stubs, and the public regular functions can be VM downcalls or socket endpoints or shared memory. If the PEE is an operating system (OS) kernel, the public initialization function may be the kernel init function, the public interrupt functions may be kernel interrupt handlers, and the public regular functions may be kernel-provided system calls. If the PEE is a hypervisor, then the public initialization function may be the hypervisor init function, the public interrupt functions may be hypervisor interrupt handlers, and the public regular functions may be hypervisor-provided hypercalls. Finally, if the PEE is firmware, the public initialization function may be the firmware init function, the public interrupt functions may be firmware machine interrupt handlers, and the public regular functions may be firmware support calls (e.g., BIOS calls). In all cases, the PEE's private functions are isolated to be only invoked within the PEE and may be a single monolithic function or a group of functions spanning applications, libraries, etc.

PEE memory regions in a given memory address space 201 comprises one or more code regions that contain PEE functions. PEE global data variables can be accessed by all parts of the PEE, retaining their values even after function execution has completed. Heaps provide dynamic memory areas for allocating memory to store variables whose size may vary. Stacks store temporary data that may be quickly used and discarded such as function parameters, local variables, and return addresses.

Procedure linkage table (PLT) entries and GOT entries are critical components of a PEE's memory regions. PLT entries contain addresses to functions, allowing for dynamic function resolution at runtime by looking up the correct address in the PLT. GOT entries keep track of the memory locations of global variables and other initialized data symbols within an element program.

The operational semantics of a PEE functions further comprise reading and/or writing to global variables, reading and/or writing to stack, reading and/or writing to heap, allocating and freeing heaps, calling other PEE functions within the PEE or across PEEs within a memory address space and across memory address spaces, and returning to parent PEE function.

The randomized PEE memory map in a given address space ensures that the layout of PEE components is randomized each time the PEE loads into memory. This randomization mitigates various types of attacks and vulnerabilities by making it challenging for attackers to predict and exploit specific memory locations.

The system architecture may be implemented on various computer platforms, including x86, ARM, and RISC-V architectures running various operating systems such as Windows, Linux, FreeBSD etc. For example, on an x86 platform running Windows, the KPEE 207 can provide a secure boot-strapping environment for the Windows operating system and the BPEE 204 can house the Windows kernel, while the KPEE ensures that other applications are loaded and executed in respective DPEEs.

In some embodiments, the DPEE comprises a banking application that requires secure data storage and retrieval mechanisms. The BPEE provides the secure base operating environment and provides additional security features for the banking application, such as encryption and decryption services. The KPEE can ensure that only authorized DPEEs are loaded into memory to prevent unauthorized access to sensitive data.

In a further embodiment of the invention, the system architecture can be used to develop distributed applications. For example, a DPEE can comprise a web browser application that requires secure communication mechanisms with a server-side DPEE to retrieve and display web content. The BPEE provides the secure base operating environment on both server and client and provides additional security features for the web browser application, such as encryption and decryption services.

The system architecture may provide a more secure, efficient, and flexible way to develop secure by design software applications. By separating program execution into different PEEs, mathematically modeling their operational semantics, and ensuring each component's isolation, the proposed system addresses several limitations and vulnerabilities inherent in traditional computing systems and helps build ironclad and robust Bastion Platform 107 to enforce TNSM 118.

Trusted Path Security Mechanism (TPSM)

The systems and methods may include a Trusted Path Security Mechanism (TPSM) that enforces permitted patterns of computer platform operations without adversarial influence. Such computer platform operations can be one or more of memory access operations, peripheral access operations, CPU operations including execution of CPU instructions, and operations involving access and manipulation of CPU, memory or peripheral state. TPSM therefore establishes secure code execution and reliable data communication pathways between PEEs and between PEEs and computer platform hardware.

TPSM may be embodied in various configurations involving PEEs 108, offering a flexible and robust security solution. In different embodiments, TPSM can span multiple PEEs, both within and across individual PEEs, as well as between PEEs and computer platform hardware. For instance, TPSM can be established between public and private functions 208 of Keystone PEEs (KPEEs) 207 or Bastion PEEs (BPEEs) 204, enabling secure communication within these trusted environments. Additionally, TPSM can facilitate secure interactions between public functions 208 of KPEEs 207, BPEEs 204, and Domain PEEs (DPEEs) 205, allowing for protected data exchange across different types of PEEs. Furthermore, TPSM can be implemented between DPEEs 205 themselves, ensuring secure communication among these elements. The scope of TPSM is not limited to interactions between PEEs, as it can also be established between PEE functions 208 and computer platform devices 106, providing an end-to-end security solution that bridges the gap between software and hardware components. By supporting various configurations and spanning multiple PEEs and hardware components, TPSM provides a comprehensive security mechanism that can be tailored to meet the specific needs of different applications and systems.

TPSM encompasses four key mechanisms-temporal memory safety, which ensures that memory accesses are valid and do not compromise the integrity of the system, handled via heap safety mechanisms; spatial memory safety, which ensures that data is accessed and manipulated in a secure and controlled manner, handled via data safety mechanisms; control flow integrity, which ensures that the execution of code follows a predictable and authorized path, handled via code safety and stack safety mechanisms; and privilege separation, which ensures that different components of the system operate with the appropriate level of privilege and access control. These mechanisms may be implemented, for example, in any suitable combination of hardware and software.

TPSM may be implemented in various embodiments, including combinations of hardware and software components. For example, TPSM may be established between two PEEs (e.g., PEE A and PEE B) that communicate via shared memory regions. Alternatively, a PEE at a lower privilege level may invoke a set of functions provided by a PEE executing at a higher privilege level to establish a TPSM. Additionally, a PEE may write data to a storage device (such as a disk) and read from it, with the storage device being one example of a peripheral that can be used to establish a TPSM. Other peripherals, such as networks, keyboards, or other input/output devices, may also be used.

In one embodiment, TPSM may involve virtual machines communicating via a hypervisor and containers communicating with each other or the host kernel.

In a preferred embodiment, TPSM 109 may be implemented by incorporating approved code execution mechanisms, such as those discussed in the U.S. patent application Ser. No. 19/345,409 filed on Sep. 30, 2025, to enforce permitted patterns of computer platform operations without adversarial influence.

A subset of the set of PEEs may be implemented in low-level programming languages such as C, C++ and Assembly that offer fine-grained control over hardware resources and performance optimization capabilities, suited for systems programming, embedded systems and high-performance applications. A subset of the set of PEEs may be implemented in a high-level programming language such as Python, Rust and Java that have designed-in features of memory safety guarantees and type systems that help prevent common vulnerabilities and ensure integrity of code execution.

In some embodiments, the subset of the set of PEEs that are implemented in low-level programming languages may enforce one or more TPSM.

In other embodiments, the subset of the set of PEEs that are implemented in high-level programming languages may enforce one or more TPSM.

In some embodiments, the subset of the set of PEEs that are implemented in high-level programming languages may enforce a subset of the TPSM such as temporal memory safety and spatial memory safety.

In one embodiment, a combination of the subset of PEEs implemented in low-level programming language and the subset of PEEs implemented in high-level programming language may enforce one or more TPSM.

Trusted Network Security Mechanism

The system and methods may include a "Trusted Network Security Mechanism (TNSM)" that regulates interactions between potentially malicious components and the rest of the network. TNSM achieves this by designating a subset of the union of the set of Computer Platforms in the network to act as gatekeepers and enforce strict boundaries around network resources. These boundaries are essentially a subset of the union of the set of network functions which prevent unauthorized access to network resources by other potentially malicious Computer Platforms. A key aspect of TNSM is the use of mathematical adversary modeling, which involves creating detailed models of potential attackers and their possible actions, allowing for the anticipation and mitigation of all possible non-deterministic adversarial inputs that could be directed at each boundary. By tying each boundary to a comprehensive set of potential adversarial scenarios, the TNSM can ensure that the network is resilient to even the most sophisticated and unpredictable attacks including zero-day attacks. The Bastion Platform operates at a higher level of privilege than the potentially malicious Computer Platforms, ensuring that it can effectively control and monitor interactions. The overall security of the network is formally proven using a rigorous mathematical model that takes into account the complex interplay between the network's components and the potential adversaries.

TNSM can be embodied in various forms to protect different layers of a network, with each layer represented as a Computer Platform or a subset of Computer Platforms. For example, in a network-based embodiment, a router or switch can be implemented as a Bastion Platform, serving as a trusted environment for regulating interactions between different subnets or networks. The TNSM can be integrated into the Bastion Platform, allowing it to enforce strict boundaries around network resources and prevent malicious Computer Platforms from compromising the network.

In another embodiment, the firmware of a network device can be represented as a Bastion Platform, providing an additional layer of security against malicious attacks targeting the device's low-level interfaces. The TNSM can be integrated into the Bastion Platform, enabling it to regulate interactions between the firmware and other components of the network, such as Computer Platforms representing servers or clients.

Additionally, the TNSM can be implemented as a Bastion Platform within a cloud computing environment, which is represented as a set of Computer Platforms. The Bastion Platform operates at a higher level of privilege than the Computer Platforms, ensuring that it can effectively control and monitor interactions. In this embodiment, the TNSM can be used to enforce strict boundaries around network resources and prevent malicious Computer Platforms from compromising the cloud.

The strict boundaries enforced by the TNSM are referred to as Bastion Network Ports. These ports are essentially logical ports or interfaces on the Bastion Platform that connect various Computer Platforms via the Bastion Platform. The Bastion Network Ports are present on the Bastion Platform and provide a secure way for trusted and untrusted Computer Platforms to interact with each other.

The Bastion Network Ports can be categorized into different types based on their functionality. For example, there are management ports for managing the state of the Bastion Platform, including network policies. There are also trusted-device ports for connecting to trusted Computer Platforms, untrusted-device ports for connecting to untrusted Computer Platforms, and bastion-platform ports for connecting to other Bastion Platforms. Each type of port has its own set of access controls and security mechanisms to ensure that only authorized traffic is allowed to pass through.

In one embodiment, the Bastion Network Ports can be implemented as multiple logical ports mapping to a single physical port on the Bastion Platform. For example, a multiport network card can have each network interface assigned to a dedicated PEE within the Bastion Platform. This allows for multiple Computer Platforms to connect to the Bastion Platform via a single physical port, while still maintaining separate logical connections and access controls.

In another embodiment, the Bastion Network Ports can be implemented as a 1:1 mapping between logical ports and physical ports on the Bastion Platform. For example, each trusted-device port can be mapped to a dedicated physical port on the network card, providing a direct and secure connection between the trusted Computer Platforms and the Bastion Platform.

In yet another embodiment, multiple network interfaces can be assigned to a single PEE within the Bastion Platform, allowing for multiple logical ports to share the same physical resources. This can provide a flexible and scalable way to manage the Bastion Network Ports, while still maintaining the security and access controls required by the TNSM.

In other embodiments, the Trusted Network Security Mechanism (TNSM) can be applied to software-defined networking (SDN) and network function virtualization (NFV) technologies to enhance their security. For instance, in an SDN-based embodiment, the controller can be represented as a Bastion Platform, and the switches or routers can be represented as Computer Platforms. The TNSM can be used to regulate interactions between the Computer Platforms and the Bastion Platform, preventing malicious code from escaping the network and compromising the controller.

Similarly, in an NFV-based embodiment, each virtual network function (VNF) can be represented as a Computer Platform, and the network functions virtualization infrastructure (NFVI) can be represented as a Bastion Platform. The TNSM can be used to enforce strict boundaries around VNF interfaces, preventing malicious Computer Platforms from accessing sensitive data or disrupting other VNFs within the same NFVI. By applying the TNSM to these various technologies, it is possible to create a robust and comprehensive security framework that protects networks against a wide range of threats.

Figure 3:
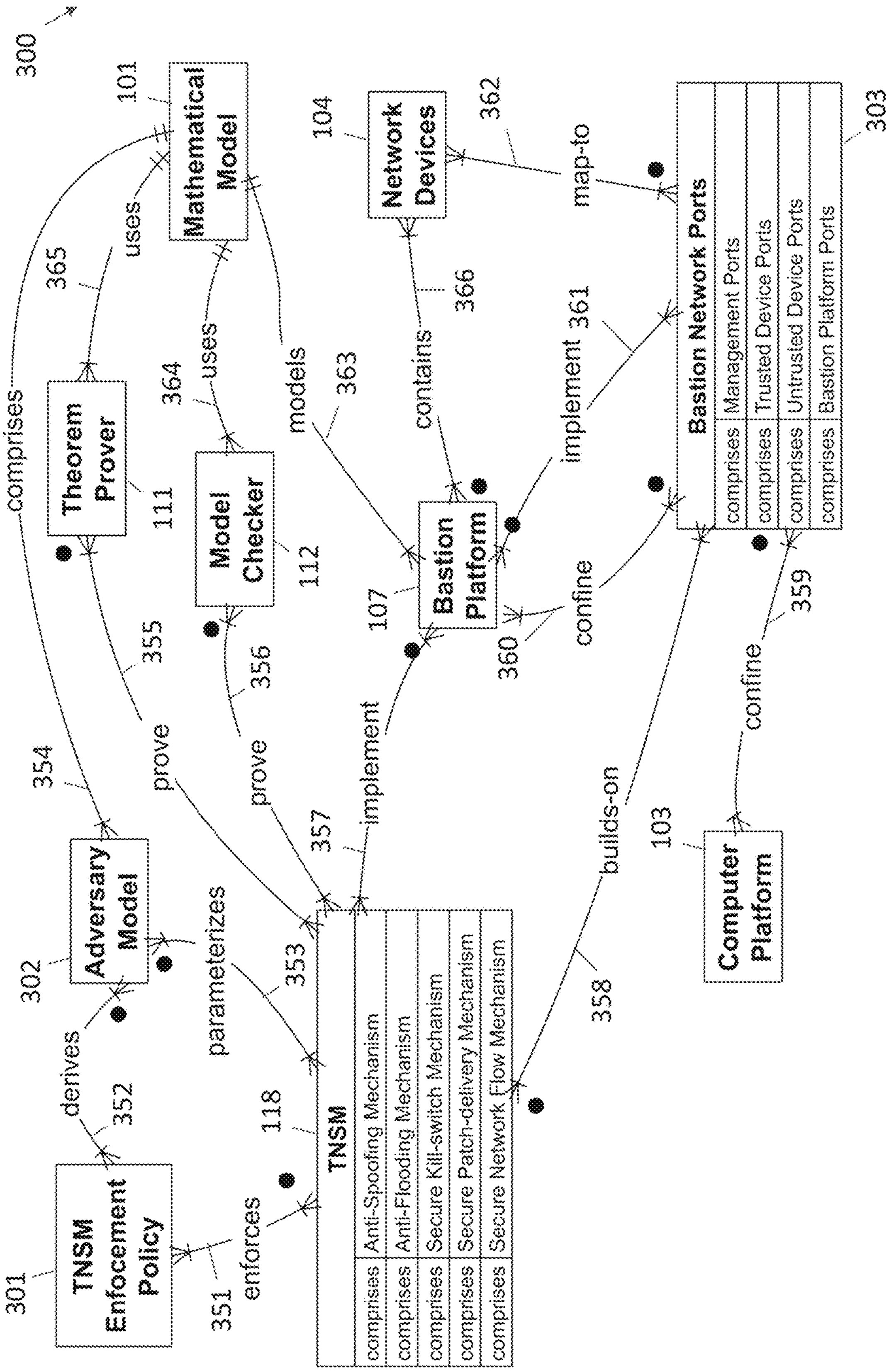
FIG. 3 shows a system 300 for Trusted Network Security Mechanism (TNSM) and network interface confinement via Bastion Network Ports, according to some embodiments.

FIG. 3 shows a system 300 for Trusted Network Security Mechanism (TNSM) 118. In system 300 a mathematical model 101 models one or more Bastion Platforms 107 (see connecting line 363). The mathematical model 101 uses one or more theorem provers 111 and one or more model checkers 112 (see connecting lines 365 and 364 respectively) to prove TNSM 118 (see connecting lines 355 and 356 respectively). One or more Bastion Platforms 107 implement one or more bastion network ports 303 (see connecting line 361). One or more Bastion Platforms 107 contains one or more Network Devices 104 (see connecting line 366). One or more Bastion Network Ports 303 map to one or more Network Devices 104 (see connecting line 362). One or more Bastion Platforms 107 implement one or more Trusted Network Security Mechanism (TNSM) 118 (see connecting line 357). One or more TNSM 1183 build on one or more Bastion Network Ports 303 (see connecting line 358). One or more Bastion Network Ports 303 confine one or more Computer Platforms 103 and one or more Bastion Platforms 107 on the network (see connecting lines 359 and 360 respectively). The mathematical model 101 comprises one or more Adversary Model 302 (see connecting line 354). One or more Adversary Model 302 parameterizes one or more TNSM 118 (see connecting line 353). One or more Adversary Model 203 derives from one or more TNSM Enforcement Policy 201 (see connecting line 352). One or more TNSM 118 enforces one or more TNSM Enforcement Policy 301 (see connecting line 351).

TNSM provides several embodiments for sending, receiving, and forwarding packets within the network and using the Bastion Platforms. In one embodiment, packets are sent using Ethernet peripherals, such as network interface cards (NICs) or switches, received using wireless peripherals, such as Wi-Fi adapters or access points, and forwarded using Layer 2 (L2) forwarding, where the packets are forwarded based on their MAC addresses. In another embodiment, packets are sent using fiber optic peripherals, such as optical transceivers or fiber optic switches, received using Ethernet peripherals, and forwarded using Layer 3 (L3) forwarding, where the packets are forwarded based on their IP addresses. Additionally, packets can be sent using wireless peripherals, received using fiber optic peripherals, and forwarded using a combination of L2 and L3 forwarding, where the packets are forwarded based on both their MAC and IP addresses. Other embodiments include sending packets using Ethernet peripherals, receiving using Ethernet peripherals, and forwarding using L2 forwarding; sending using wireless peripherals, receiving using wireless peripherals, and forwarding using L3 forwarding; or sending using fiber optic peripherals, receiving using fiber optic peripherals, and forwarding using a combination of L2 and L3 forwarding. These various embodiments provide a range of options for sending, receiving, and forwarding packets, allowing TNSM to be tailored to specific network environments and requirements, such as data center networks, cloud computing environments, or wide area networks (WANs), and ensuring secure, reliable and efficient packet transmission over different types of networks, including local area networks (LANs) and wireless networks.

The descriptions of the following TNSM are presented below: TNSM Provisioning Mechanism, Anti-Spoofing Mechanism (ASM), Anti-Flooding Mechanism (AFM), Secure Kill-switch Mechanism (SKM), Secure Patch-delivery Mechanism (SPM) and Secure Network Flow Mechanism (SNFM)

TNSM Provisioning Mechanism

The need for a robust provisioning mechanism is critical in ensuring the security and integrity of network systems. Traditional provisioning methods often rely on manual configuration and lack the necessary checks and balances to prevent unauthorized network configuration updates. As a result, networks can be vulnerable to attacks stemming from malicious configuration, compromising sensitive information and disrupting operations.

Some embodiments of the present invention provide a novel approach to achieving TNSM provisioning. The TNSM Provisioning Mechanism introduces a systematic and automated process for provisioning bastion network ports and enforcing authorized network configuration tuples. By leveraging mathematical adversary modeling and rigorous security protocols, the TNSM Provisioning Mechanism ensures that only authorized network operations are allowed, and unauthorized configuration is prevented.

Figure 4:
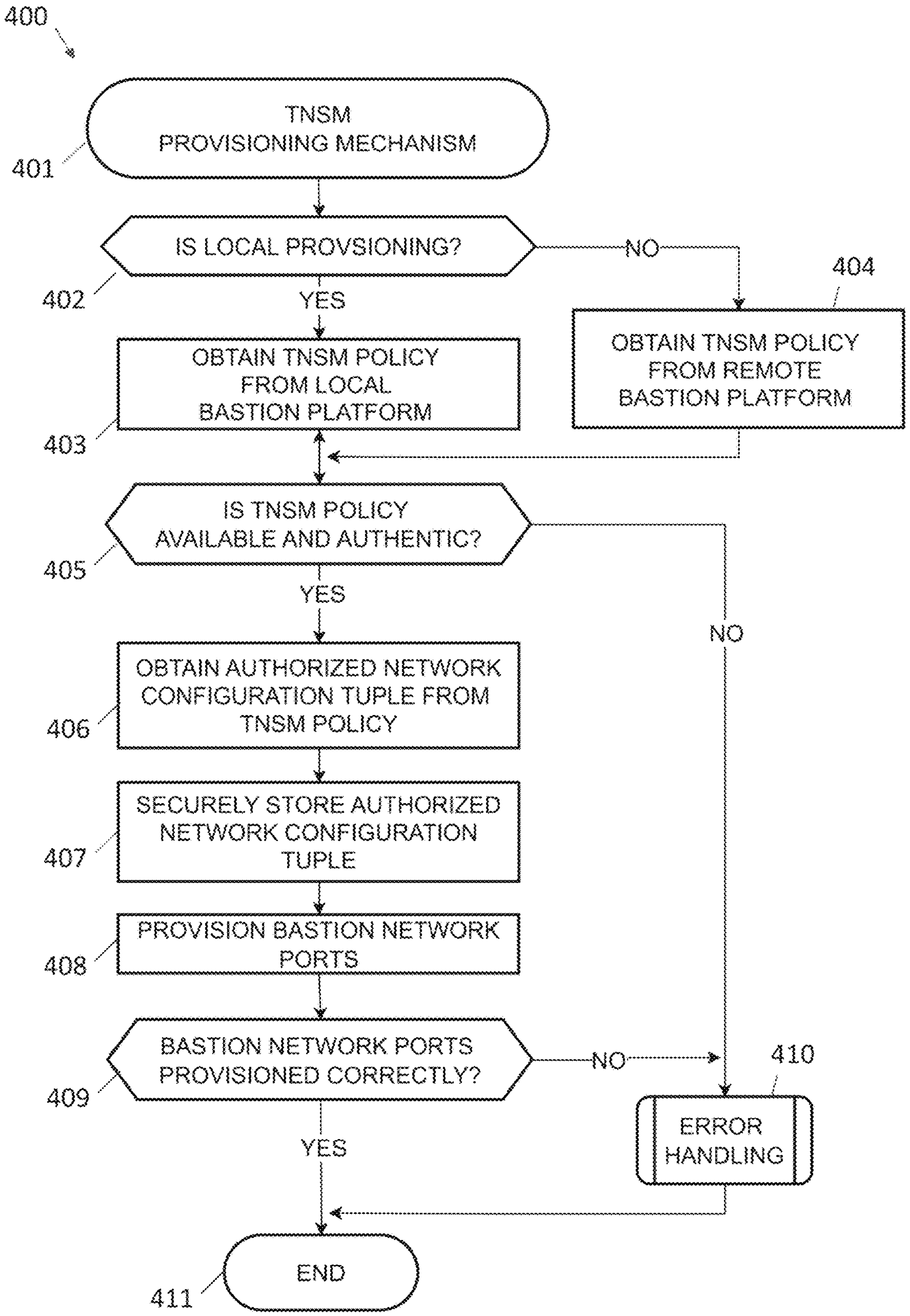
FIG. 4 shows a system 400 for Trusted Network Security Mechanism (TNSM) Provisioning Mechanism, according to some embodiments.

FIG. 4 shows a system 400 for TNSM Provisioning Mechanism 401 according to some embodiments. In system 400, the TNSM provisioning mechanism 401 performs a series of steps and checks. As a first step, it performs a check to see if the provisioning is from the local bastion platform 402. If the check at step 402 is a "YES", the TNSM provisioning mechanism 401 obtains the TNSM policy from the local bastion platform 403. If the check at step 402 is a "NO", the TNSM provisioning mechanism 401 obtains the TNSM policy from the remote bastion platform 404. The TNSM provisioning mechanism 401 then performs another check to see if an TNSM policy is available either in a local or remote bastion platform and if it is authentic 405. If the check in step 405 is a "NO" then the TNSM provisioning mechanism 401, performs error handling 410 and ends 411. If the check in step 405 is a "YES" then the TNSM provisioning mechanism 401 obtains the authorized network configuration tuple from the TNSM policy 406, securely stores the authorized network configuration tuple 407, and provisions the corresponding bastion network ports 408. The TNSM provisioning mechanism 401 then checks if the bastion network ports were provisioned correctly 409. If the check in step 409 is a "NO" then the TNSM provisioning mechanism 401, performs error handling 410 and ends 411. If the check in step 409 is a "YES" then the TNSM provisioning mechanism ends 411 without any errors.

In one embodiment of the TNSM provisioning mechanism, obtaining the TNSM policy from the local bastion platform involves querying a local database or configuration file that stores the TNSM policies. The TNSM provisioning mechanism can utilize non-volatile storage media for this purpose to access and retrieve the TNSM policy from the local bastion platform. For instance, in a containerized environment, the TNSM provisioning mechanism can leverage the container volume mounting feature to access the host's file system and retrieve the TNSM policy from a designated location.

In another embodiment of the TNSM provisioning mechanism, obtaining the TNSM policy from a remote bastion platform involves establishing a secure communication channel with the remote bastion platform using protocols such as HTTPS or SSH via the designated bastion platform bastion network port. The TNSM provisioning mechanism can utilize APIs or command-line tools to query the remote bastion platform's configuration management system, such as a firewall configuration database or Kubernetes cluster, to retrieve the TNSM policy. For example, in a cloud-based environment, the TNSM provisioning mechanism can use AWS's Elastic Kubernetes Services (EKS) or Azures Kubernetes Services (AKS) to fetch the TNSM policy from a centralized repository. The retrieved policy is then transmitted back to the local bastion platform, where it is processed and used for provisioning.

In one embodiment of the TNSM provisioning mechanism, checking the authenticity of the TNSM policy involves verifying its digital signature or checksum against a trusted source. The TNSM provisioning mechanism can utilize cryptographic operations to validate the policy's signature and ensure that it has not been tampered with during transmission or storage. Additionally, the mechanism can check the policy's version number and timestamp to ensure that it is up-to-date and not revoked.

In one embodiment of the TNSM provisioning mechanism, obtaining authorized network configuration tuple from the TNSM policy 406 may have the network tuple consist of: DNR end-point network addresses, authorized network operations and network peripherals and authorized network policies. In this embodiment the TNSM policy is parsed and processed to extract relevant information. The TNSM provisioning mechanism can utilize configuration parsing libraries, such as JSON, YAML or XML parsers, to extract the network tuple information and access tokens.

In some embodiments, the network addresses can be IPv4, IPv6, Modbus, DNP3 and other forms of network addresses; the authorized network operations may be send, receive and configure operations; and the authorized network policies can be iptables or nftables rules for incoming and outgoing network packets within the Linux operating system. For instance, in a cloud-based environment, the TNSM provisioning mechanism can use AWS's IAM policies or Azure's Role-Based Access Control (RBAC) in addition to container management services such as AWS EKS and Azure AKS to obtain the authorized network tuple. In a local on-premise environment or an embedded platform, the TNSM provisioning mechanism can use a signed version of the TNSM policy that includes the network communications tuple and use cryptographic operation to decrypt the network tuple information.

In another embodiment of the TNSM provisioning mechanism, securely storing authorized network configuration tuple 407 may be done by designating a special memory region in a set of dedicated PEEs within the bastion platform. In this embodiment, the authorized network configuration tuple may be stored securely in a local or remote hardware security module (e.g., Trusted Platform Module). Alternatively, the authorized network configuration tuple may be stored in an encrypted fashion on the local computer platform non-volatile storage.

In one embodiment of the TNSM provisioning mechanism, provisioning bastion network ports involves modifying the sources or binaries of PEEs to establish a controlled environment for access to the bastion network ports. To achieve this, the TNSM provisioning mechanism can utilize eBPF (extended Berkeley Packet Filter) based hooks to inject custom logic into the PEEs, allowing for runtime enforcement of approved network operations policies for specific network ports and network peripherals on the bastion platform. For instance, the mechanism can use eBPF programs to attach to specific networking peripheral and networking operations function calls for packet send, receive and network interface configuration operations within a kernel or hypervisor environment and enforce policies specified in the authorized network configuration. In another embodiment, provisioning bastion network ports involves employing library-based hooks to intercept and modify PEE calls to network libraries (e.g., network socket) ensuring that only authorized network operations are allowed with authorized network addresses on the specified bastion network ports.

In one embodiment of the TNSM provisioning mechanism, error handling involves logging and reporting any errors or exceptions that occur during the provisioning process. The TNSM provisioning mechanism can utilize logging frameworks, such as Logstash, to record error messages, PEE identification and policy details including error traces. Additionally, the mechanism can send notifications to system administrators or security teams via email, SMS, or other notification channels. Further, the TNSM provisioning mechanism can forward error logs to a centralized logging service, such as ELK Stack or Splunk.

Anti-Spoofing Mechanism

The need for a robust anti-spoofing mechanism is critical in preventing malicious entities from impersonating legitimate devices or platforms within a network. Traditional anti-spoofing methods often rely on static authentication mechanisms and lack the necessary adaptability to prevent sophisticated spoofing attacks. As a result, networks can be vulnerable to attacks stemming from spoofed identities, compromising sensitive information and disrupting operations.

Some embodiments of the present invention provide a novel approach to achieving anti-spoofing. The Anti-Spoofing Mechanism introduces a systematic and automated process for detecting and preventing spoofing attempts within the network. By leveraging mathematical adversary modeling and rigorous security protocols, the Anti-Spoofing Mechanism ensures that only authentic devices or platforms are allowed to communicate with the Bastion Platforms, and spoofed entities are prevented from accessing the network by ensuring that every DNR has a unique network address for each Bastion Network Port, preventing spoofing attempts and ensuring the security of the network.

To ensure that every DNR has a unique network address, the Bastion Platforms exchange information about the bound DNRs'network addresses among all the Bastion Platforms using the bastion-platform ports Bastion Network Port category. This information is used to update the binding table on each Bastion Platform, ensuring that no two DNRs can share the same network address on the network. When a new DNR is bound to a Bastion Network Port, the Anti-Spoofing Mechanism checks the binding table to ensure that the assigned network address is not already in use by another DNR.

Figure 5:
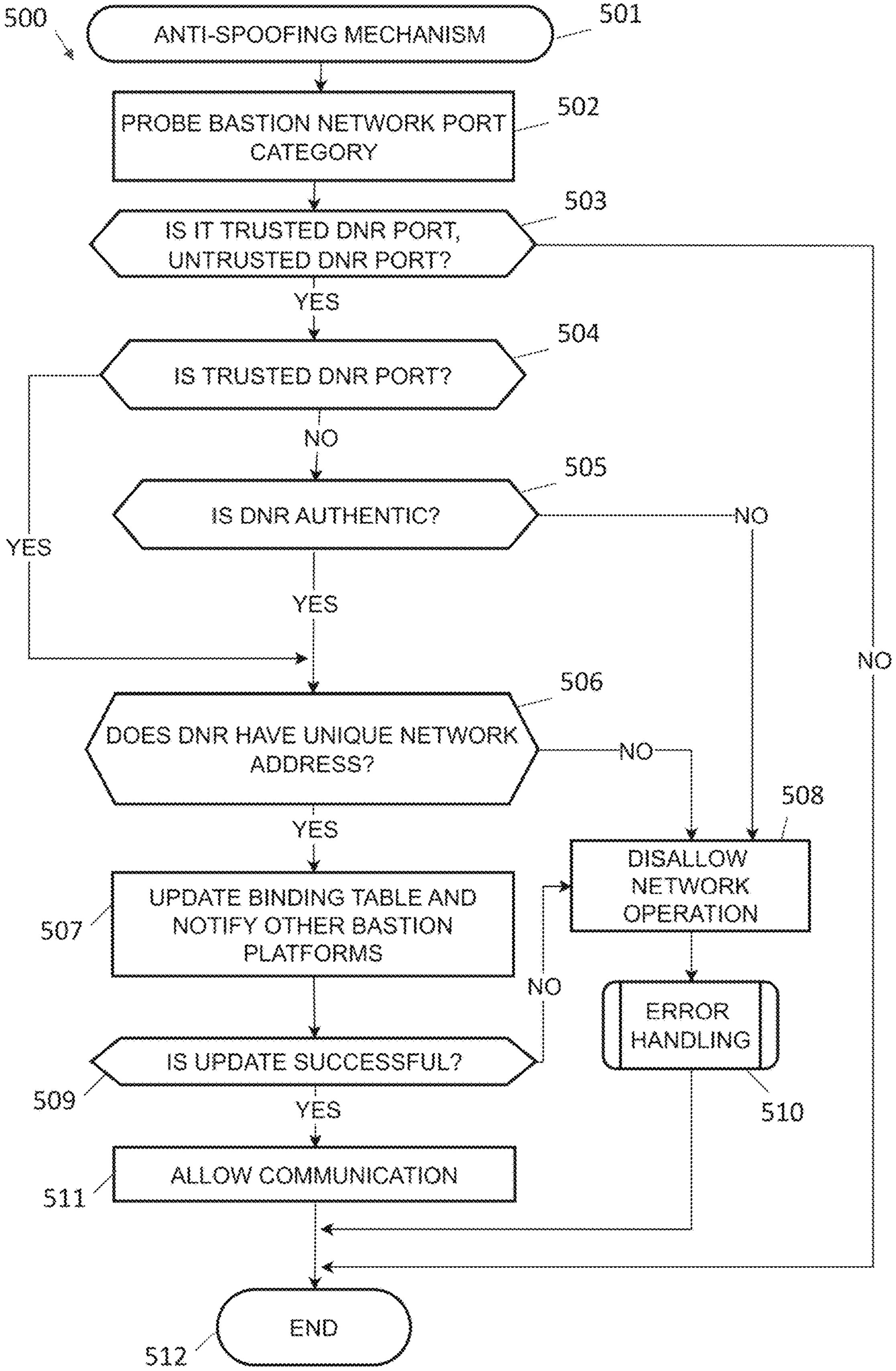
FIG. 5 shows a system 500 for Anti-spoofing mechanism (ASM) ensuring authenticity of DNR network addresses, according to some embodiments.

FIG. 5 shows a system 500 for Anti-Spoofing Mechanism (ASM), according to some embodiments. In system 500, the ASM 501 performs a series of steps and checks. As a first step, it performs a probe of the bastion network port categories 502. It then checks if the bastion network port is one of trusted DNR port or untrusted DNR port 503. If the check at step 503 is a "NO", then the ASM 501 ends 512. If the check at step 503 is a "YES", then another check is performed to see if it is a trusted DNR port 504. If the check at step 504 is a "NO" then step 505 is performed. If the check at step 504 is a "YES" then step 506 is performed. The ASM 501 step 505 checks if the DNR is authentic. If the check at step 505 is a "YES" then step 506 is performed. If the check at step 505 is a "NO" then the network operation is disallowed 508, error handling is performed 510 and ASM 501 ends 512. The ASM step 506 checks if a DNR has a unique network address. If the check in step 506 is a "NO" then the network operation is disallowed 508, error handling is performed 510 and ASM 501 ends 512. If the check in step 506 is a "YES" then ASM 501 updates the binding table and notifies other bastion platforms 507. ASM 501 then checks if the binding table update is successful 509. If the check in step 509 is a "NO" then the network operation is disallowed 508, error handling is performed 510 and ASM 501 ends 512. If the check in step 509 is a "YES", then network communication is allowed on the specified port by the DNR 511 and ASM 501 ends 512.

In some embodiments of the system 500 a probe of the bastion network port categories 502 can be implemented using techniques such as extended Berkeley Packet Filter (eBPF) with different types of eBPF probes, via changes to PEE source or binary code performing the bastion interface functionality such as libraries and applications as well as by using callback functions or signal handling within PEEs. Such probing techniques help identify the type of bastion network port categories (trusted and untrusted DNR ports, bastion platform ports and management ports) for which functionality needs to be handled.

In one embodiment of the Anti-Spoofing Mechanism, error handling ensures: If any step fails or generates an alert, the Anti-Spoofing Mechanism will block traffic from the device or Bastion Platform and generate an alert to system administrators or security teams. If multiple alerts are generated within a short period, the Anti-Spoofing Mechanism may trigger additional security measures, such as rate limiting or IP blocking, to prevent brute-force attacks or denial-of-service (DoS) attacks on the Bastion Network Ports.

In another embodiment of the Anti-Spoofing Mechanism, alerts are generated for the following events: (i) Potential spoofing attempt detected; (ii) Failure to update binding table; (iii) Communication failure between device and Bastion Platform; (iv) Multiple alerts generated within a short period In one embodiment of the Anti-Spoofing Mechanism, the binding table is implemented as a distributed database that is synchronized across all Bastion Platforms using the bastion-platform ports. This allows each Bastion Platform to have a consistent view of the bound DNRs and their assigned network addresses, ensuring that spoofing attempts are prevented.

In another embodiment of the Anti-Spoofing Mechanism, the Anti-Spoofing Mechanism utilizes a network address allocation protocol to assign unique network addresses to each DNR. This protocol ensures that no two DNRs can have the same network address on the network, preventing spoofing attempts.

In one embodiment of the Anti-Spoofing Mechanism, when a DNR is bound to a Bastion Network Port, the Anti-Spoofing Mechanism generates a unique network address for the DNR and updates the binding table accordingly. The Anti-Spoofing Mechanism also notifies other Bastion Platforms of the new binding using the bastion-platform ports, ensuring that all Bastion Platforms have a consistent view of the bound DNRs and their assigned network addresses.

In another embodiment of the Anti-Spoofing Mechanism, the Anti-Spoofing Mechanism performs periodic audits of the binding table to detect any potential spoofing attempts. If a duplicate network address is detected, the Anti-Spoofing Mechanism takes corrective action to prevent the spoofing attempt, such as blocking traffic from the spoofed DNR or notifying system administrators of the security incident.

In one embodiment, the Anti-Spoofing Mechanism (ASM) checks if the DNR is authentic by verifying its digital certificate or signature. The ASM may use a trusted certificate authority or a public key infrastructure to validate the DNR's identity and ensure that it has not been tampered with or spoofed. In another embodiment, the ASM uses a challenge-response protocol to authenticate the DNR, where the DNR is required to respond to a random challenge with a valid response that demonstrates its authenticity. The ASM may also use machine learning-based algorithms to analyze the DNR's behavior and determine whether it is authentic or not. For example, the ASM may monitor the DNR's network traffic patterns, system calls, or other behavioral characteristics to identify potential anomalies or indicators of spoofing.

In one embodiment, the Anti-Spoofing Mechanism (ASM) checks if the DNR has a unique network address by verifying its IP address or MAC address against a database of known addresses. The ASM may use a network address translation (NAT) table or a dynamic host configuration protocol (DHCP) server to determine whether the DNR's address is unique and has not been assigned to another device on the network. In another embodiment, the ASM uses a cryptographic hash function to generate a unique identifier for the DNR based on its network address and other attributes, such as its hardware or software characteristics. The ASM may then compare this identifier with a database of known identifiers to determine whether the DNR has a unique network address. For example, the ASM may use a Bloom filter or a hash table to efficiently store and lookup the identifiers, allowing it to quickly determine whether a given DNR has a unique network address or not.

In some embodiments, the Anti-Spoofing Mechanism can also utilize additional security measures, such as rate limiting or IP blocking, to prevent brute-force attacks or denial-of-service (DoS) attacks on the Bastion Network Ports. The mechanism can also generate alerts or notifications to system administrators or security teams in case of suspected spoofing attempts or other security incidents.

Anti-flooding Mechanism

The Anti-Flooding Mechanism is designed to prevent Denial-of-Service (DoS) attacks by limiting the throughput of a given DNR connected to a Bastion Network Port. This mechanism ensures that the network remains stable and secure by preventing any single device from overwhelming the network with excessive traffic.

In some embodiments, the Anti-Flooding Mechanism monitors the traffic flowing through each Bastion Network Port and compares it to a predefined threshold. If the throughput exceeds this threshold, the mechanism takes corrective action to prevent the network from being flooded.

Figure 6A:
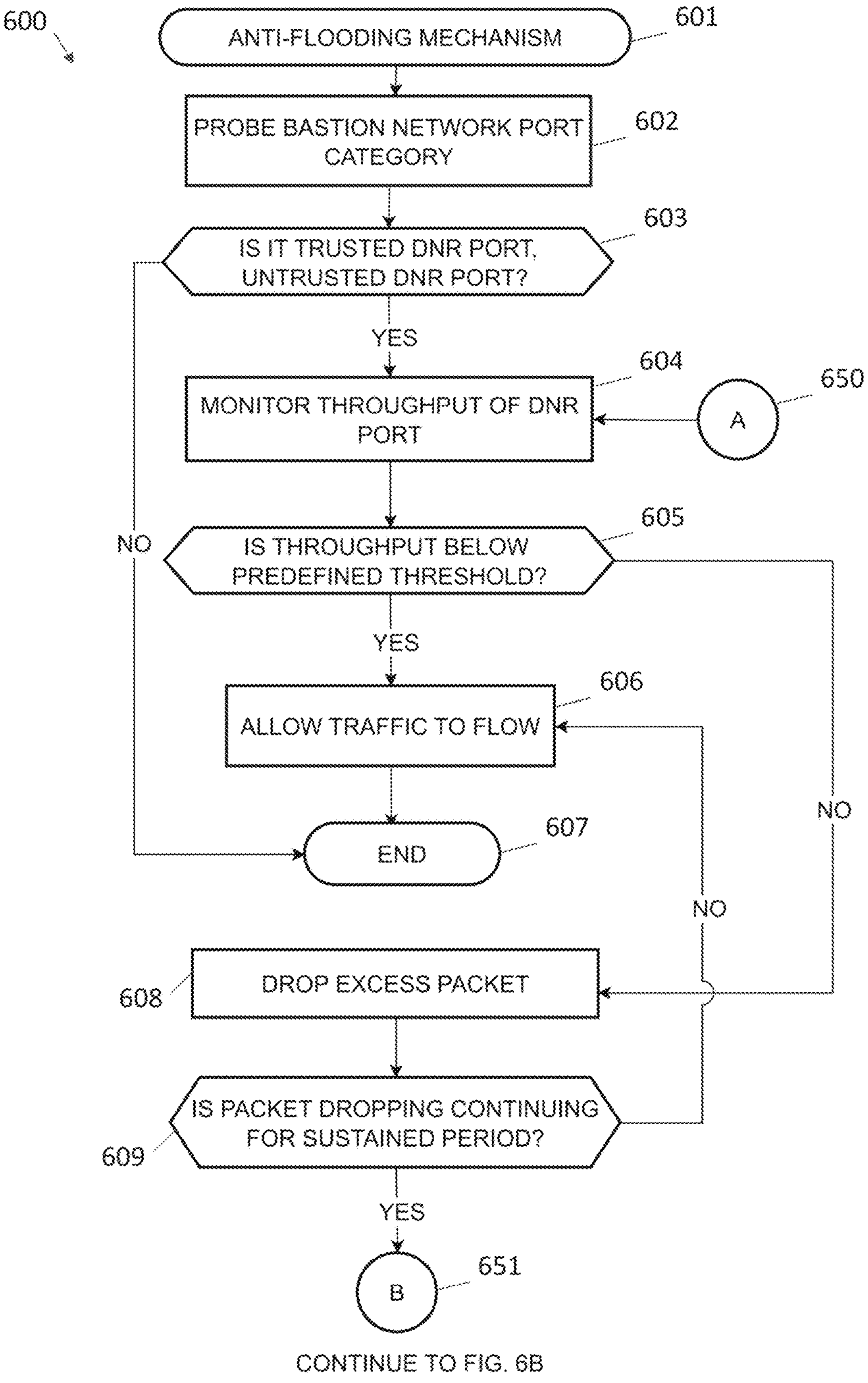
FIG. 6A-6B shows a system 600 for Anti-flooding mechanism (AFM) ensuring network throughput of a DNR is limited to predefined threshold, according to some embodiments.
Figure 6B:
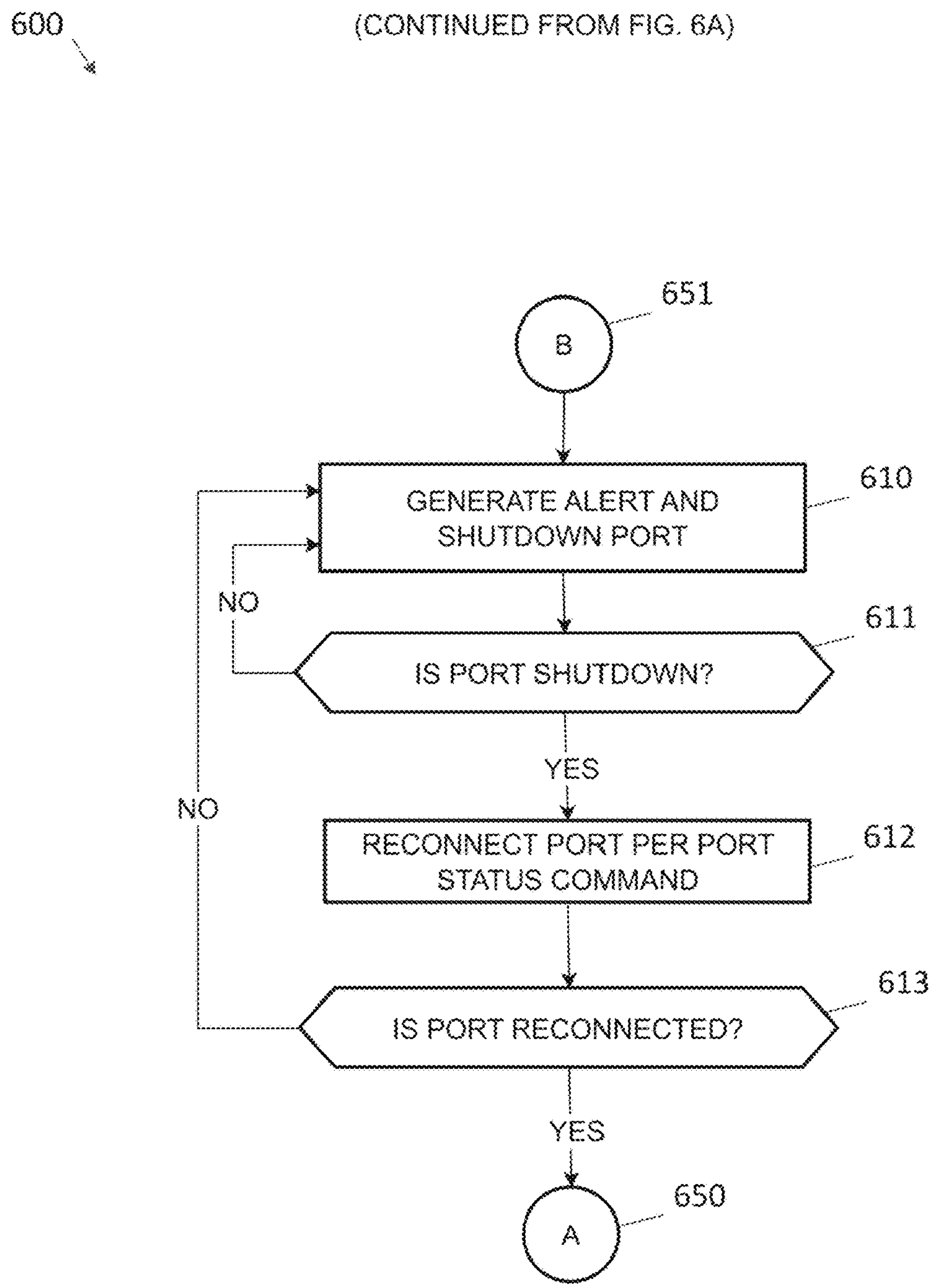

FIGS. 6A-6B are flowcharts that show a system 600 for Anti-Flooding Mechanism (AFM), according to some embodiments. FIG. 6A and FIG. 6B are linked by rounded off-page circular flow-chart connectors A 650 and B 651. Off-page connector A 650 in FIG. 6A connects the flow from step 613 in FIG. 6B to step 604 in FIG. 6A. Off-page connector B 651 in FIG. 6B connects the flow from step 609 in FIG. 6A to step 610 in FIG. 6B.

In system 600 (FIGS. 6A-6B), the AFM 601 performs a series of steps and checks. As a first step, it performs a probe of the bastion network port categories 602. It then checks if the bastion network port is one of trusted DNR port or untrusted DNR port 603. If the check at step 603 is a "NO", then the AFM 601 ends 607. If the check at step 603 is a "YES", then the AFM 601 monitors throughput of the DNR port 604. The AFM 601 then performs a check to see if the throughput is below predefined threshold 605. If the check in step 605 is a "YES", the AFM 601 allows traffic to flow 606 and ends 607. If the check in step 605 is a "NO" then the AFM 601 drops the excess packets 608 and performs another check to see if the packet dropping is continuing for sustained period 609. If the check in step 609 is a "NO", the AFM 601 allows traffic to flow 606 and ends 607. If the check in step 609 is a "YES", the AFM 601 generates an alert and shuts the port down 610. The AFM 601 then performs a check to see if the port is shut down 611. If the check in step 611 is a "NO", the AFM 601 continues to generate an alert and shutting down the port 610. If the check in step 611 is a "YES" the AFM 601 reconnects the port per the port status command 612 and performs another check to see if the port is reconnected 613. If the check in step 613 is a "NO", the AFM 601 continues to generate an alert and shutting down the port 610. If the check in step 613 is a "YES", the AFM 601 switches back to step 604 to monitor the throughput of the DNR port.

In some embodiments of the system 600 a probe of the bastion network port categories 502 can be implemented using techniques such as extended Berkeley Packet Filter (eBPF) with different types of eBPF probes, via changes to PEE source or binary code performing the bastion interface functionality such as libraries and applications as well as by using callback functions or signal handling within PEEs. Such probing techniques help identify the type of bastion network port categories (trusted and untrusted DNR ports, bastion platform ports and management ports) for which functionality needs to be handled.

In one embodiment of the Anti-Flooding Mechanism, the predefined threshold is set based on the type of device connected to the Bastion Network Port and the expected traffic patterns. The mechanism can also adjust the threshold dynamically based on changes in network conditions or traffic patterns.

In another embodiment of the Anti-Flooding Mechanism, the mechanism uses a token bucket algorithm to track the throughput of each DNR. The token bucket algorithm allows for bursts of traffic above the predefined threshold, but limits the average throughput over time.

In some embodiments, the Anti-Flooding Mechanism can also be integrated with other security mechanisms, such as intrusion detection systems or firewalls, to provide an additional layer of protection against DoS attacks.

In some embodiments, the Anti-Flooding Mechanism provides several benefits, including: (i) Prevention of Denial-of-Service (DoS) attacks; (ii) Protection of network stability and security; (iii) Limitation of throughput to prevent flooding; (iv) Generation of alerts for potential security incidents; (v) Shutdown of ports in case of sustained packet dropping In one embodiment of the Anti-Flooding Mechanism, the mechanism can also provide detailed reporting and analytics on network traffic patterns, allowing administrators to identify potential security threats and optimize network performance.

In one embodiment, the Anti-Flooding Mechanism (AFM) drops excess packets by implementing a packet filtering technique that discards packets that exceed a predefined threshold. The AFM may use a rate-limiting algorithm, such as a token bucket or leaky bucket algorithm, to regulate the packet flow and prevent flooding attacks. In another embodiment, the AFM uses a deep packet inspection (DPI) technique to analyze the contents of each packet and identify potential flood patterns, such as repetitive or malformed packets. The AFM may then drop these packets to prevent them from overwhelming the network. For example, the AFM may use a packet dropping strategy that prioritizes packets based on their type, size, or source IP address, ensuring that critical traffic is not affected by the flooding attack.

In another embodiment, the Anti-Flooding Mechanism (AFM) determines whether packet dropping is continuing for a sustained period by maintaining a timer or counter that tracks the duration of packet drops. If the timer or counter exceeds a predefined threshold, the AFM may trigger additional actions, such as generating an alert or shutting down the port. In another embodiment, the AFM uses a statistical analysis technique to monitor the packet drop rate and detect patterns that indicate sustained flooding activity. The AFM may then adjust its packet dropping strategy based on these patterns to minimize the impact of flooding attacks on the network. For example, the AFM may implement a gradual rate-limiting approach or a dynamic threshold adjustment mechanism to balance flood prevention with legitimate traffic flow. Additionally, the AFM may use machine learning algorithms to learn from past flooding attacks and improve its detection and mitigation capabilities over time.

In yet another embodiment of the Anti-Flooding Mechanism, the mechanism can be configured to allow for exceptions to the throughput threshold, such as during periods of high demand or for specific types of traffic. This allows for flexibility in managing network traffic while still maintaining security and stability.

Secure Kill-Switch Mechanism

The Secure Kill-Switch Mechanism is designed to provide an additional layer of security by allowing administrators to shutdown a given DNR on a specified Bastion Network Port on-demand. This mechanism ensures that the port can be quickly disconnected in case of a security incident or when a device is no longer trusted.

In some embodiments, the Secure Kill-Switch Mechanism receives a special request through the management port to shutdown a specific Bastion Network Port. The mechanism then probes the Bastion Network Port category to determine if it is a trusted device port or an untrusted device port.

Figure 7:
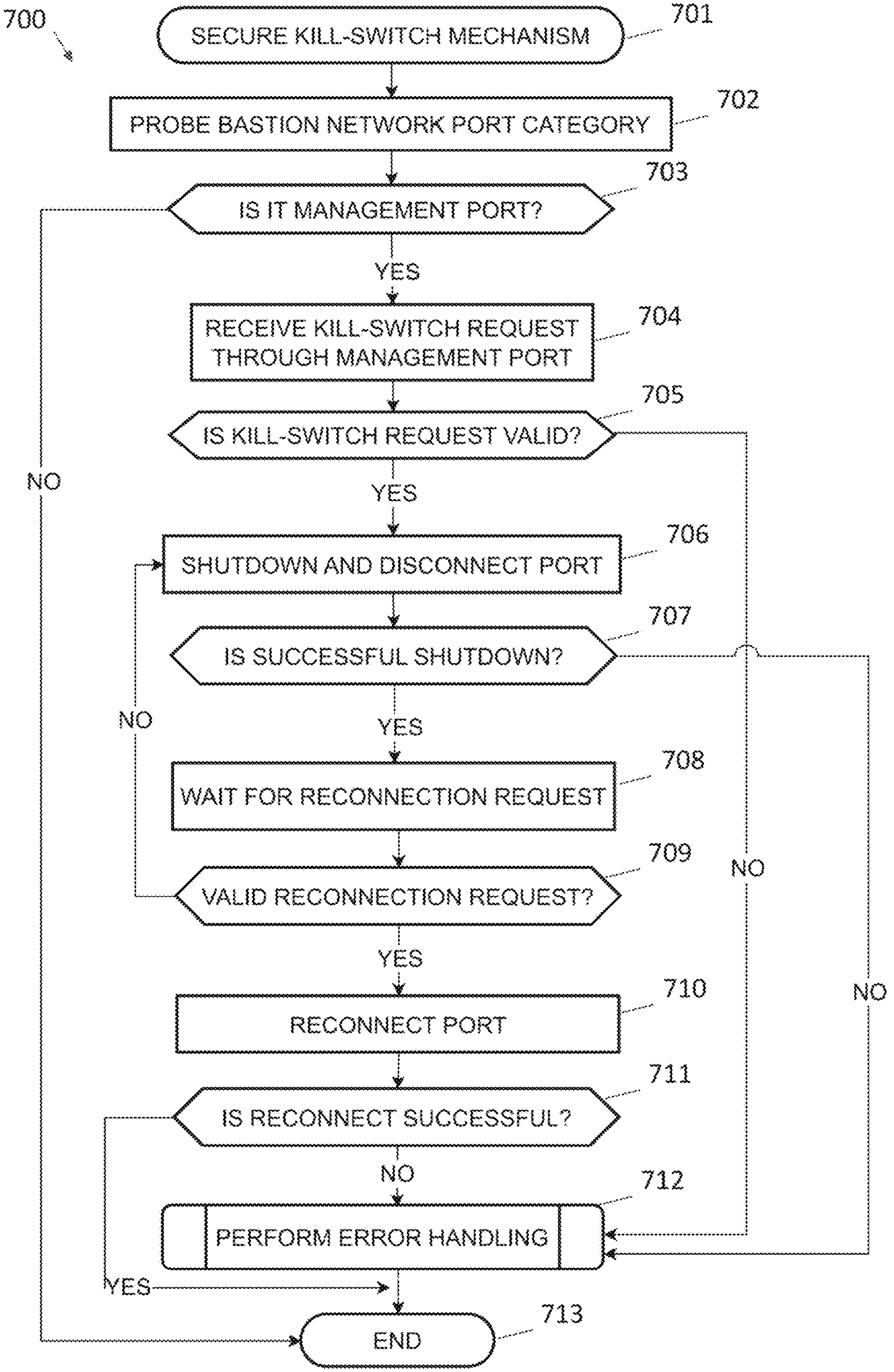
FIG. 7 shows a system 700 for Secure Kill-switch Mechanism (SKM) that blocks network communications to/from a DNR, according to some embodiments.

FIG. 7 shows a system 700 for Secure Kill-switch Mechanism (SKM), according to some embodiments. In system 700, the SKM 701 performs a series of steps and checks. As a first step, it performs a probe of the bastion network port categories 702. It then checks if the bastion network port is a management port 703. If the check at step 703 is a "NO", then the SKM 701 ends 713. If the check at step 703 is a "YES", then the SKM 701 receives the kill-switch request through the management port 704. The SKM 701 then performs a check to see if the kill-switch command is valid 705. If the check at step 705 is a "NO" the SKM 701 performs error handling 712 and ends 713. If the check at step 705 is a "YES" the SKM 701 shuts down and disconnects the port 706. The SKM 701 then checks to see if the shutdown was successful 707. If the check in step 707 is a "NO" the SKM 701 performs error handling 712 and ends 713. If the check in step 707 is a "YES" the SKM 701 waits for a reconnection request 708. The SKM 701 then checks to see if a valid reconnection request was received 709. If the check in step 709 is a "NO" the SKM 701 maintains the port in a shutdown and disconnected state 706. If the check in step 709 is a "YES" the SKM 701 reconnects the port and makes it active again 710 and then checks to see if the reconnect was successful 711. If the check in step 711 is a "NO" the SKM 701 performs error handling 712 and ends 713. If the check in step 711 is a "YES" the SKM 701 ends without error 713.

In some embodiments of the system 700 a probe of the bastion network port categories 502 can be implemented using techniques such as extended Berkeley Packet Filter (eBPF) with different types of eBPF probes, via changes to PEE source or binary code performing the bastion interface functionality such as libraries and applications as well as by using callback functions or signal handling within PEEs. Such probing techniques help identify the type of bastion network port categories (trusted and untrusted DNR ports, bastion platform ports and management ports) for which functionality needs to be handled.

In some embodiments, the secure kill-switch mechanism performs error handling by generating an alert to system administrators or security teams indicating the nature of the error. The mechanism also logs the error for future reference and analysis.

In another embodiment, the secure kill-switch mechanism generates alerts for the following events: (i) Successful shutdown of a Bastion Network Port; (ii) Successful reconnection of a Bastion Network Port; (iii) Failed reconnection of a Bastion Network Port; (iv) Invalid special request through the management port In one embodiment of the Secure Kill-Switch Mechanism, the mechanism uses a secure authentication protocol to verify the identity and authorization of the administrator sending the special request through the management port.

In another embodiment of the Secure Kill-Switch Mechanism, the mechanism can be configured to automatically shutdown a Bastion Network Port after a specified period of inactivity or when a security incident is detected.

In one embodiment, the Secure Kill-switch Mechanism (SKM) receives a kill-switch request through a management port using a secure communication protocol, such as SSH or HTTPS. The SKM may use a cryptographic technique, such as encryption or digital signatures, to authenticate and verify the integrity of the kill-switch request. For example, the SKM may use a public key infrastructure (PKI) to validate the identity of the entity sending the kill-switch request and ensure that it is authorized to initiate the shutdown process. In another embodiment, the SKM uses a proprietary protocol or API to receive the kill-switch request, which may include additional metadata or parameters to facilitate the shutdown process.

In another embodiment, the Secure Kill-switch Mechanism (SKM) checks if the kill-switch request is valid by verifying its syntax, semantics, and authentication credentials. The SKM may use a set of predefined rules or policies to determine whether the kill-switch request is legitimate and authorized. For example, the SKM may check if the request includes a valid token or signature, or if it conforms to a specific format or protocol. In another embodiment, the SKM uses machine learning algorithms to analyze the kill-switch request and detect potential anomalies or malicious activity. The SKM may also use a reputation-based system to evaluate the trustworthiness of the entity sending the kill-switch request.

In yet another embodiment, the Secure Kill-switch Mechanism (SKM) shuts down and disconnects the port by issuing a command to the network device or interface. The SKM may use a proprietary protocol or API to communicate with the network device, or it may use standard protocols such as SNMP or NetConf. For example, the SKM may send a shutdown command to the network device, which may include additional parameters or options to control the shutdown process. In another embodiment, the SKM uses a physical mechanism, such as a relay or a switch, to disconnect the port and prevent any further communication.

In some embodiments, the Secure Kill-switch Mechanism (SKM) waits for a reconnection request by monitoring the management port for incoming requests. The SKM may use a timer or a counter to track the elapsed time since the shutdown, and it may use this information to determine when to reconnect the port. For example, the SKM may wait for a predetermined period of time before reconnecting the port, or it may use a dynamic algorithm to adjust the waiting period based on network conditions or other factors. In another embodiment, the SKM uses a notification mechanism, such as an alert or a message, to inform the administrator or operator that the port is shutdown and waiting for reconnection.

In another embodiment, the Secure Kill-switch Mechanism (SKM) reconnects the port by issuing a command to the network device or network peripheral interface. The SKM may use a proprietary protocol or API to communicate with the network device, or it may use standard protocols such as SNMP or NetConf. For example, the SKM may send a connect command to the network device, which may include additional parameters or options to control the reconnection process. In another embodiment, the SKM uses a physical mechanism, such as a relay or a switch, to reconnect the port and restore communication. The SKM may also perform additional checks or tests to verify that the port is functioning correctly and securely before considering the reconnection process complete.

In some embodiments, the Secure Kill-Switch Mechanism can be integrated with other security mechanisms, such as intrusion detection systems or firewalls, to provide an additional layer of protection against security threats.

Secure Patch-Delivery Mechanism

The Secure Patch-Delivery Mechanism is designed to provide a secure way to deliver patches or packets from a source DNR connected to a trusted device port or a Bastion Platform to a destination DNR connected to a trusted or untrusted device port or a Bastion Platform via the management port. This mechanism ensures that the patch or packet is delivered securely and prevents man-in-the-middle attacks.

In some embodiments, the Secure Patch-Delivery Mechanism uses a specific key bound to each port that a DNR binds to. The patch or packet is signed with the same key on the source and the Bastion Platform checks the signature of the packet with the key bound to the destination port.

Figure 8A:
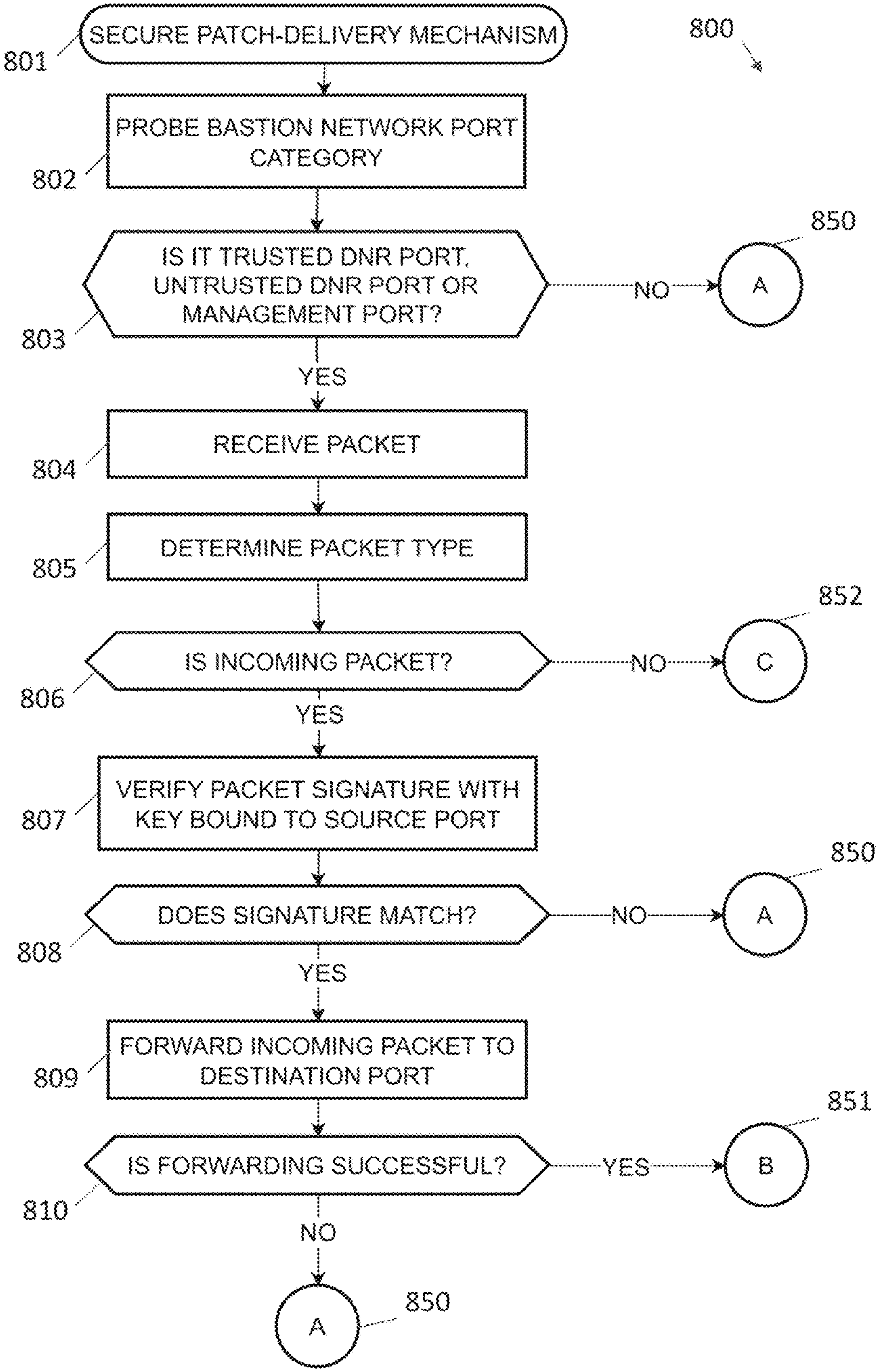
FIG. 8A-8B shows a system 800 for Secure Patch-delivery mechanism (SPM) that permits source DNR to send tamper-proof patch to destination DNR, according to some embodiments.
Figure 8B:
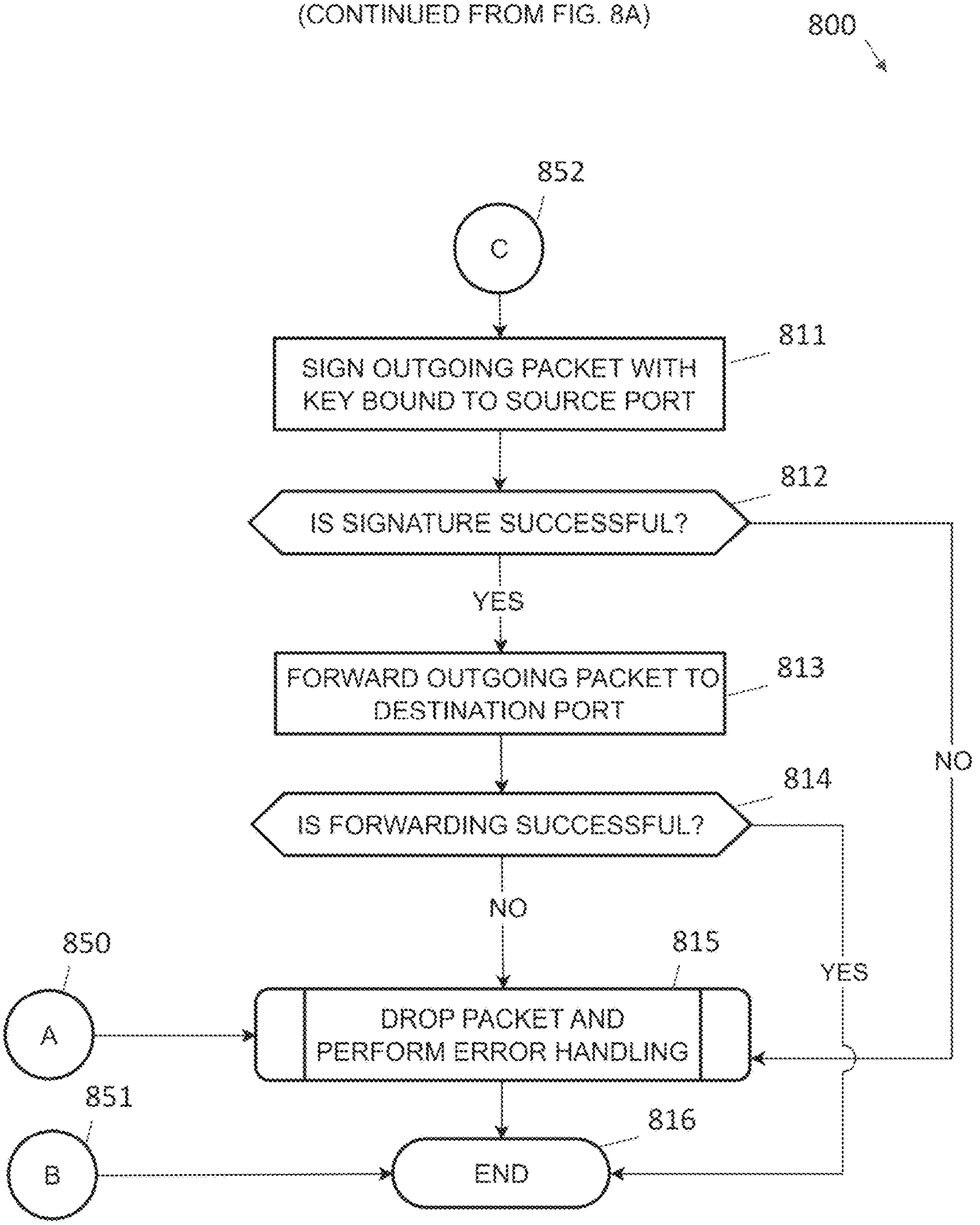

FIGS. 8A-8B are flowcharts that show a system 800 for Secure Patch-delivery Mechanism (SPM), according to some embodiments. FIG. 8A and FIG. 8B are linked by rounded off-page circular flow-chart connectors A 850, B 851 and C 852. Off-page connector A 850 in FIG. 8A connects the flow from steps 803, 808 and 810 in FIG. 8A to step 815 in FIG. 8B. Off-page connector B 851 in FIG. 8A connects the flow from step 810 in FIG. 8A to step 816 in FIG. 8B. Off-page connector C 852 in FIG. 8A connects the flow from step 806 in FIG. 8A to step 811 in FIG. 8B.

In system 800 (FIGS. 8A-8B), the SPM 801 performs a series of steps and checks. As a first step, it performs a probe of the bastion network port categories 802. It then checks if the bastion network port is one of trusted DNR port, untrusted DNR port or management port 803. If the check at step 803 is a "NO", then the SPM 801 drops the packet and performs error handling 815 and ends 816. If the check at step 803 is a "YES", then the SPM 801 receives the packet 804, determines the packet type 805 and then performs another check to see if its an incoming patch packet 806. If the check in step 806 is a "YES", the SPM 801 verifies the packet signature with a key bound to the source port 807. The SPM 801 then checks if the signatures match 808. If the check in step 808 is a "NO", then the SPM 801 drops the packet and performs error handling 815 and ends 816. If the check in step 808 is a "YES", the SPM 801 forwards the incoming packet to the destination port 809. The SPM 801 then checks if the forwarding is successful 810. If the check in step 810 is a "NO", then the SPM 801 drops the packet and performs error handling 815 and ends 816. If the check in step 810 is a "YES", then the SPM 801 ends 816. If the check in step 806 is a "NO", then SPM 801 signs the outgoing packet with the key bound to the source port 811. The SPM 801 then checks to see if the signature is successful 812. If the check in step 812 is a "NO", then the SPM 801 drops the packet and performs error handling 815 and ends 816. If the check in step 812 is a "YES" then the SPM 801 forwards the outgoing packet to the destination port 813. The SPM 801 then checks if the forwarding was successful 814. If the check in step 814 is a "YES" then SPM 801 ends 816 successfully. If the check in step 814 is a "NO", then the SPM 801 drops the packet and performs error handling 815 and ends 816.

In some embodiments of the system 800 a probe of the bastion network port categories 502 can be implemented using techniques such as extended Berkeley Packet Filter (eBPF) with different types of eBPF probes, via changes to PEE source or binary code performing the bastion interface functionality such as libraries and applications as well as by using callback functions or signal handling within PEEs. Such probing techniques help identify the type of bastion network port categories (trusted and untrusted DNR ports, bastion platform ports and management ports) for which functionality needs to be handled.

In some embodiments of the Secure Patch-delivery Mechanism, error handling is performed by generating an alert to system administrators or security teams indicating the nature of the error. The mechanism also logs the error for future reference and analysis.

In another embodiment of the Secure Patch-delivery Mechanism, alerts are generated for the following events: (i) Successful delivery of a patch or packet; (ii) Failed delivery of a patch or packet; (iii) Invalid patch or packet received from source DNR; (iv) Signature mismatch at destination port; (v) error signing patch or packet with key bound to source port In one embodiment of the Secure Patch-Delivery Mechanism, the mechanism uses a secure encryption protocol to encrypt the patch or packet in addition to signing it with the key bound to the source port.

In another embodiment of the Secure Patch-Delivery Mechanism, the mechanism can be configured to use a different key for each patch or packet delivery, adding an additional layer of security.

In yet another embodiment of the Secure Patch-Delivery Mechanism, the mechanism uses a Hash-based Message Authentication Code (HMAC) to authenticate the patch or packet. The HMAC is calculated using a shared secret key and a hash function, such as SHA-256 or SHA-512. The source DNR calculates the HMAC and includes it in the patch or packet, and the destination DNR verifies the HMAC by recalculating it using the same shared secret key and hash function. If the HMACs match, then the patch or packet is authenticated and delivered to the destination DNR.

In one embodiment, the Secure Patch-delivery Mechanism (SPM) determines the packet type by analyzing the packet's header or payload. The SPM may use a set of predefined rules or patterns to identify the packet type, such as TCP, UDP, ICMP, or HTTP. For example, the SPM may check the packet's protocol field to determine if it is a TCP or UDP packet, and then analyze the packet's payload to determine if it is an incoming patch packet. In another embodiment, the SPM uses machine learning algorithms to classify the packet type based on its characteristics, such as packet length, source IP address, or destination port.

In one embodiment, the Secure Patch-delivery Mechanism (SPM) checks if the packet is an incoming patch packet by verifying its contents against a set of predefined criteria. The SPM may check if the packet includes a specific header or flag that indicates it is a patch packet, or if it contains a digital signature that can be verified using a public key infrastructure (PKI). For example, the SPM may check if the packet includes a "patch" flag in its header, or if it contains a digital signature that can be verified using a trusted certificate authority. In another embodiment, the SPM uses a proprietary protocol or API to determine if the packet is an incoming patch packet.

In one embodiment, the Secure Patch-delivery Mechanism (SPM) checks if the signature matches by comparing the received signature with an expected signature that is stored in a secure database or key store. The SPM may use a cryptographic algorithm, such as RSA or ECDSA, to verify the signature and ensure that it was generated using a trusted private key. For example, the SPM may use a public key infrastructure (PKI) to verify the signature and ensure that it was generated by a trusted entity. In another embodiment, the SPM uses a proprietary protocol or API to verify the signature and ensure that it matches the expected value.

In one embodiment, the Secure Patch-delivery Mechanism (SPM) verifies the packet signature with a key bound to a source or destination port by using a cryptographic algorithm, such as RSA or ECDSA, to decrypt the signature and compare it with an expected value. The SPM may use a public key infrastructure (PKI) to manage the keys and ensure that they are securely stored and updated. For example, the SPM may use a trusted certificate authority to generate and distribute the public-private key pairs, and then use these keys to verify the packet signatures. In another embodiment, the SPM uses a proprietary protocol or API to verify the packet signature with a key bound to the source port.

In one embodiment, the Secure Patch-delivery Mechanism (SPM) forwards incoming and outgoing packets to ports by using a routing table or a forwarding database to determine the destination port. The SPM may use a set of predefined rules or policies to control the forwarding process, such as access control lists (ACLs) or firewall rules. For example, the SPM may check the packet's source IP address and destination port to determine if it should be forwarded to a specific port or dropped. In another embodiment, the SPM uses machine learning algorithms to optimize the forwarding process and improve network performance.

In some embodiments, the Secure Patch-Delivery Mechanism can be integrated with other security mechanisms, such as intrusion detection systems or firewalls, to provide an additional layer of protection against security threats.

Secure Network Flow Mechanism

The Secure Network Flow Mechanism is designed to ensure that only authorized network flows are part of the network as specified by a network configuration policy. This mechanism uses Software Defined Networking (SDN) principles, where a set of Bastion Platforms act as a control plane and a set of Bastion Platforms act as data planes.

Figure 9A:
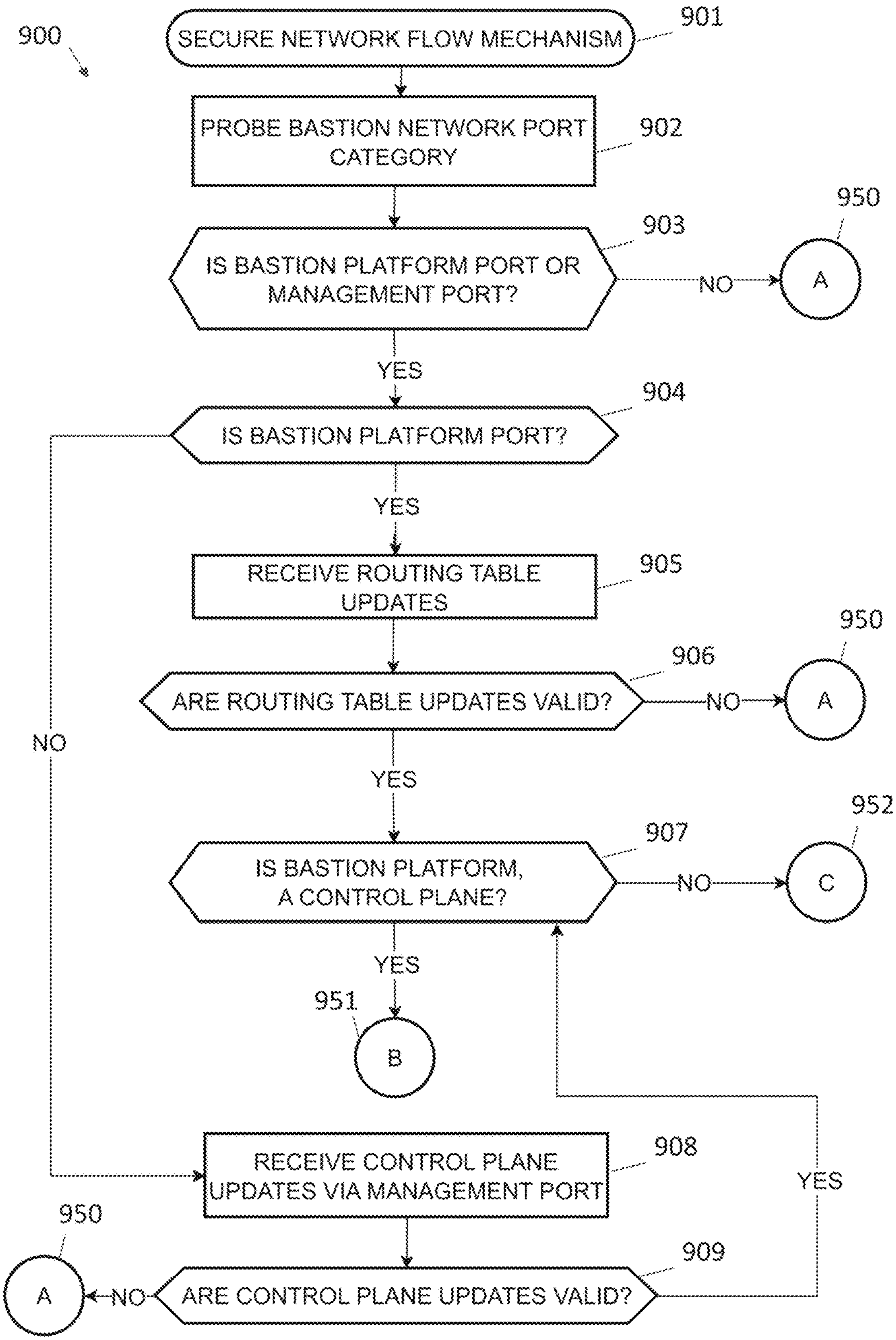
FIG. 9A-9B shows a system 900 for Secure Network Flow Mechanism (SNFM) permitting only pre-defined network packet flow between DNRs, according to some embodiments.
Figure 9B:
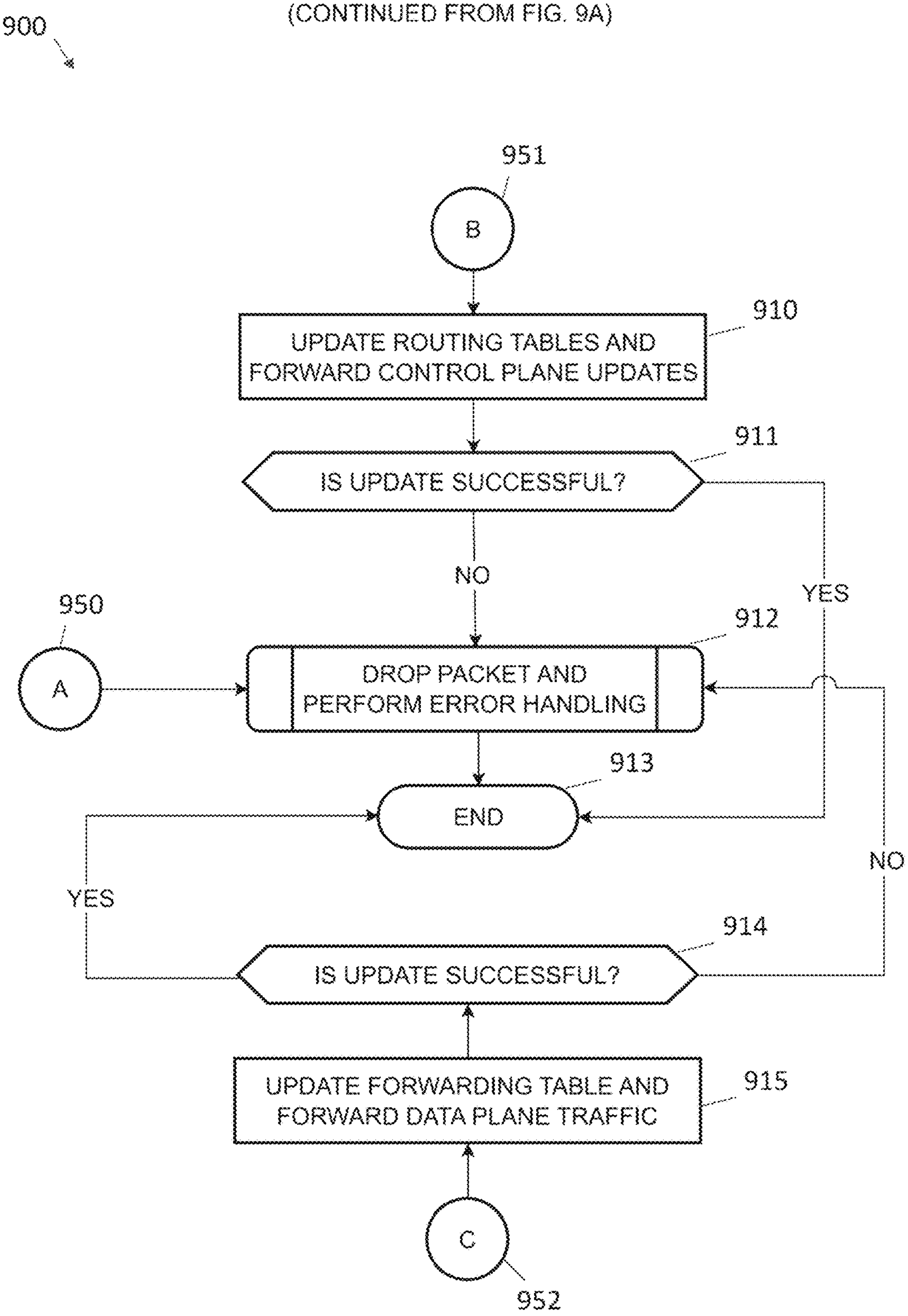

FIGS. 9A-9B are flowcharts that show a system 900 for Secure Network Flow Mechanism (SNFM), according to some embodiments. FIG. 9A and FIG. 9B are linked by rounded off-page circular flow-chart connectors A 950, B 951 and C 952. Off-page connector A 950 in FIG. 9A connects the flow from steps 903 and 906 in FIG. 9A to step 912 in FIG. 9B. Off-page connector B 951 in FIG. 9A connects the flow from step 907 in FIG. 8A to step 910 in FIG. 9B. Off-page connector C 952 in FIG. 9A connects the flow from step 907 in FIG. 9A to step 915 in FIG. 9B.

In system 900 (FIGS. 9A-9B), the SNFM 901 performs a series of steps and checks. As a first step, it performs a probe of the bastion network port categories 902. It then checks if the bastion network port is one of: bastion platform port or management port 903. If the check at step 903 is a "NO", then the SNFM 901 drops the packet and performs error handling 912 and ends 913. If the check at step 903 is a "YES", then SNFM 901 performs another check to see if its a bastion platform port 904. If the check at step 904 is a "NO" the SNFM receives control plane updates via the management port 908. The SNFM 901 then performs a check to see if the control plane updates are valid 909. If the check at step 909 is a "YES" then the SNFM moves to step 907. If the check at step 909 is a "NO", then the SNFM 901 drops the packet and performs error handling 912 and ends 913. If the check at step 904 is a "YES" then SNFM receives the routing table updates 905 and performs a check to see if the routing table updates as valid 906. If the check in step 906 is a "NO", then the SNFM 901 drops the packet and performs error handling 912 and ends 913. If the check in step 906 is a "YES" then the SNFM 901 performs a check to see if the bastion platform is acting as a control plane 907. If the check in step 907 is a "YES", the SNFM 901 moves to update the routing tables and forwards the control plane updates 910. The SNFM 901 then checks to see if the update is successful 911. If the check at step 911 is a "YES", then the SNFM 901 ends 913. If the check at step 911 is a "NO", then the SNFM 901 drops the packet and performs error handling 912 and ends 913. If the check in step 907 is a "NO", the SNFM 901 moves to step updates the forwarding table and forwards data plane traffic 915. The SNFM 901 then checks if the update is successful 914. If the check at step 914 is a "YES", the SNFM ends 913. If the check at step 914 is a "NO", then the SNFM 901 drops the packet and performs error handling 912 and ends 913.

In some embodiments of the system 900 a probe of the bastion network port categories 502 can be implemented using techniques such as extended Berkeley Packet Filter (eBPF) with different types of eBPF probes, via changes to PEE source or binary code performing the bastion interface functionality such as libraries and applications as well as by using callback functions or signal handling within PEEs. Such probing techniques help identify the type of bastion network port categories (trusted and untrusted DNR ports, bastion platform ports and management ports) for which functionality needs to be handled.

In one embodiment of the Secure Network Flow Mechanism, the routing tables are updated using a Link-State Protocol (LSP) such as Open Shortest Path First (OSPF) or Intermediate System to Intermediate System (IS-IS). The LSP provides a scalable and flexible way to manage network flows.

In another embodiment of the Secure Network Flow Mechanism, the routing tables are updated using a Distance-Vector Protocol (DVP) such as Routing Information Protocol (RIP) or Enhanced Interior Gateway Routing Protocol (EIGRP). The DVP provides a simple and efficient way to manage network flows.

In yet another embodiment of the Secure Network Flow Mechanism, the routing tables are updated using a Path- Vector Protocol (PVP) such as Border Gateway Protocol (BGP). The PVP provides a robust and scalable way to manage network flows.

In one embodiment of the Secure Network Flow Mechanism, the forwarding tables are updated using a flow-based approach, where each flow is assigned a unique identifier and the forwarding table is updated based on the flow identifier. The flow-based approach provides a fine-grained control over network flows.

In another embodiment of the Secure Network Flow Mechanism, the forwarding tables are updated using a packet-based approach, where each packet is examined and the forwarding table is updated based on the packet header. The packet-based approach provides a flexible and efficient way to manage network flows.

In yet another embodiment of the Secure Network Flow Mechanism, the forwarding tables are updated using a hybrid approach, which combines the flow-based and packet-based approaches. The hybrid approach provides a balanced trade-off between control and efficiency.

In one embodiment of the Secure Network Flow Mechanism, the routing tables are received using a standardized protocol such as OpenFlow or Netconf. The standardized protocol provides a scalable and flexible way to manage network flows.

In another embodiment of the Secure Network Flow Mechanism, the routing tables are received using a proprietary protocol such as Cisco's EIGRP or Juniper's OSPF. The proprietary protocol provides a simple and efficient way to manage network flows.

In yet another embodiment of the Secure Network Flow Mechanism, the routing tables are received using a combination of standardized and proprietary protocols. The combined approach provides a robust and scalable way to manage network flows.

In one embodiment, the Secure Network Flow Mechanism uses Open vSwitch (OvS) architecture to share routing tables via the Bastion Platform Port and control plane updates via the Management Port. The OvS architecture provides a scalable and flexible way to manage network flows.

In another embodiment, the Secure Network Flow Mechanism uses a distributed control plane approach, where multiple Bastion Platforms act as control planes and coordinate with each other to establish network flows. This approach provides improved scalability and fault tolerance.

In yet another embodiment, the Secure Network Flow Mechanism uses a centralized control plane approach, where a single Bastion Platform acts as a control plane and manages all network flows. This approach provides simplified management and improved security.

In one embodiment of the Secure Network Flow Mechanism, error handling is performed by generating an alert to system administrators or security teams indicating the nature of the error. The mechanism also logs the error for future reference and analysis.

In another embodiment of the Secure Network Flow Mechanism, alerts are generated for the following events: (i) Successful establishment of a network flow; (ii) Failed establishment of a network flow; (iii) Invalid routing table updates received from other Bastion Platforms; (iv) Invalid control plane updates received from other Bastion Platforms; (v) Error updating routing tables or forwarding tables In one embodiment of the Secure Network Flow Mechanism, a data center network comprises multiple Bastion Platforms acting as control planes and coordinating with each other to establish network flows between different servers. The Secure Network Flow Mechanism ensures that only authorized network flows are established and that the network is secure and reliable.

In another embodiment of the Secure Network Flow Mechanism, multiple Bastion Platforms in a cloud computing environment, can act as data planes and forward data plane traffic according to the routing tables updated by the control plane. The Secure Network Flow Mechanism ensures that the network flows are established correctly and that the data plane traffic is forwarded securely and efficiently.

In some embodiments, the Secure Network Flow Mechanism (SNFM) checks if the routing table and control plane updates are valid by verifying their digital signatures using a public key infrastructure (PKI). The SNFM may use a trusted certificate authority to generate and distribute the public-private key pairs, and then use these keys to verify the digital signatures of the updates. For example, the SNFM may check if the routing table updates include a digital signature that can be verified using a trusted public key, and if the control plane updates include a digital signature that can be verified using a trusted public key. In another embodiment, the SNFM uses a proprietary protocol or API to verify the validity of the routing table and control plane updates.

In one embodiment, the Secure Network Flow Mechanism (SNFM) receives routing table updates via a secure communication channel, such as a TLS-encrypted connection. The SNFM may use a routing protocol, such as OSPF or BGP, to receive the updates from a trusted source, such as a network controller or a neighboring router. For example, the SNFM may establish a secure connection with a network controller and receive routing table updates in the form of JSON-encoded data, which are then parsed and verified using a digital signature. In another embodiment, the SNFM uses a proprietary protocol or API to receive routing table updates from a trusted source.

In another embodiment, the Secure Network Flow Mechanism (SNFM) receives control plane updates via a management port, such as a SSH-encrypted connection. The SNFM may use a management protocol, such as NetConf or RESTCONF, to receive the updates from a trusted source, such as a network controller or a network management system. For example, the SNFM may establish a secure connection with a network controller and receive control plane updates in the form of XML-encoded data, which are then parsed and verified using a digital signature. In another embodiment, the SNFM uses a proprietary protocol or API to receive control plane updates from a trusted source. The SNFM may also use additional security measures, such as access control lists (ACLs) or firewall rules, to ensure that only authorized sources can send control plane updates.

In yet another embodiment, the Secure Network Flow Mechanism can be integrated with other security mechanisms, such as intrusion detection systems or firewalls, to provide an additional layer of protection against security threats.

Mathematical Modeling and Composition of Security Mechanisms

Some embodiments of the system include a mathematical model of the computer platforms and bastion platforms where processor, memory and network peripherals are modeled, demonstrating the composition of Trusted Network Security Mechanisms (TNSM) when multiple computer platforms and bastion platforms are used in a network.

Furthermore, each computer platform or bastion platform can be configured with different network protocols and still achieve the composition of the aforementioned security mechanisms. In one embodiment of the system, this allows composing computer platforms and bastion platforms with high-level network configurations that incorporate a subset of TNSM by design, such as those using secure socket layer/transport layer security (SSL/TLS) or internet protocol security (IPSec), along with computer platforms and bastion platforms with low-level network configurations that do not incorporate TNSM by design.

The mathematical model may be developed using existing assume-guarantee interface confined automated modeling mechanisms, such as those discussed in U.S. Pat. No. 12,367,328, allowing for computer-assisted modeling and proving of system security mechanisms. As discussed in U.S. Pat. No. 12,367,328, the assume-guarantee interface confined modeling may employ theorem provers and/or model checkers to prove system security mechanisms. In some embodiments, proving TNSM using theorem provers and/or model checkers may generate a counterexample in the event that TNSM does not hold for a given version of the mathematical model. In such cases, the counterexample provides details on what model specifications need changes so that TNSM can hold. The mathematical model specification is then revised using the output of the counterexample, and the system security mechanisms are proven again using theorem provers and model checkers. This allows for an iterative mathematical model specification workflow that ultimately proves that TNSM holds in the mathematical model.

The high-level mathematical model, according to some embodiments of a system of computer platforms and bastion platforms, their network operations (such as send packet, receive packet, update route tables, update bastion network port policies, send patch, and receive patch), and their network state are described. The syntax and semantics governing the concurrent execution of these network operations on multiple computer platforms and bastion platforms in a network are introduced.

Model Syntax

The syntactic constructions for defining a network system include a set of computer platforms and bastion platforms, N, that maps a unique identifier to a platform, which is a tuple consisting of: (1) a network protocol suite, proto, with which the platform communicates; (2) an exclusive network address space, NA, owned by the platform; (3) a set of network operation declarations, nod; (4) an initialization function, init_net, that sets up the initial network state of the platform.

Instead of modeling the detailed semantics of individual network protocols (e.g., TCP/IP or HTTP), it is assumed that each platform takes in, as a parameter, the intermediate network representation (proto) in which it operates. For example, this could be a standardized protocol suite such as Internet Protocol Suite (TCP/IP) or a more specialized protocol suite such as Secure Sockets Layer/Transport Layer Security (SSL/TLS).

Generalized network operations, gno, consist of commands in agreement with the syntax of the network protocol suite (proto) in which the platform operates. For example, in a platform pid with pid.proto=Internet Protocol Suite (TCP/IP), the network operations declared in pid.nod are implemented using commands in TCP/IP packet representation, such as send packet, receive packet, update route tables, or update bastion network port policies.

The network protocol suite (proto) can be thought of as an intermediate representation of network protocols, similar to how LLVM is an intermediate representation of programming languages. This allows for a more abstract and platform-agnostic modeling of network operations, without needing to delve into the specifics of individual network protocols or implementations.

Network Model

The layout of the network for N, with n distinct computer platforms and bastion platforms, includes the network address space which is compartmentalized into n separate network locations pid. NA for i≤n. Each network location pid. NA is a set of network addresses defined as pid.NA∈P (NetAddr), such that for all i≠j≤n, pid.NA∩pj.NA=Ø.

The syntax for defining the network is summarized below. The network Østate model also includes the regions preserved for the network buffers (i.e., packet queues):

Exclusive network address space NA∈P(NetAddr)

Packet queue stream Q:=Q, Q

Packet queue Q∈P^ω (NetAddr)

Network state ρ∈NetAddr↦val

A packet queue can be infinitely large and is used by the network operations to allocate its local buffer locations as needed. It is assumed that a stream of such infinite packet queues Q is available upon request. The stream of packet queues Q, is a coinductive definition and consists of packet queues of the type Q∈P^ω (NetAddr) (i.e., infinite sets of network addresses). It is assumed that all packet queues ∈Q in the stream Q are mutually disjoint from each other and from the network locations. Network state ρ is defined as a mapping from the network address space and the allocated parts of the network buffers to values.

Runtime Constructs

The runtime constructs consist of multiple computer platforms and bastion platforms with the following syntax:

network operation pool N::=·|nid↦⟨pid,init_net,proto, Q,ρ,a⟩,N single platform state p::=⟨pid,N⟩ multi-platform state P::=⟨Q;ρ;p;pid⟩

Each computer platform or bastion platform p, is a tuple of a unique platform identifier pid and a list of network operations N for executing external network requests. A single network operation, uniquely identified with nid, consists of: (1) the initialization function (init_net) that sets up the network state; (2) network protocol suite (proto) used by the network operation; (3)

the packet queue Q allocated to the network operation; (4) the current internal platform state ρ of the network operation storing key control flow state; and (5) the instance, a, that satisfied the precondition init_net when the network operation was initialized. Each multi-platform state P consists of a stream of packet queues Q, a mapping from network addresses to values, ρ, a list of computer platforms and bastion platforms p, and the active (running) platform pid. The active platform pid in a multi-platform state can switch non-deterministically.

Interface Specification

For each Bastion Platform pid∈dom(N) and every network operation nop∈pid.(nod), an interface {P(x)}pid.nop{Q(x)} is fixed and collected in the set Δ_p. P(x) and Q(x) are pre- and post-conditions of the network operation nop, respectively. These are also referred to as pid.nop.pre(x) and pid.nop.post(x). These pre- and post-conditions are essentially invariants for security mechanisms that hold at the starting and at the end of network operation nop respectively (e.g., packet filtering, access control, encryption etc.). The network footprint of the interface for the Bastion Platform pid is specified by (pid.NA).

In line with network operation specifications in mathematical separation logic, the precondition pid.nop.pre(x) is defined to be parametric in x of type NetMsg and has a type NetMsg→Prop. A universally quantified version of it, ∀x: NetMsg.pid.nop.pre(x), is a first-order predicate defined over a global network state ρ (a pair of network addresses and packet queues where the network addresses include other resources, e.g., routing tables). ρ ⊨ pid.nop.pre(a) specifies that the network message a satisfies pid.nop.pre(x) when x is instantiated with the instance a. Assume that the predicate is only defined over the network addresses owned by pid (i.e., ρ|_(pid.NA)). The same holds for pid.nop.post (x).

Moreover, for the sake of simplicity, assume that NetMsg has a simple base type (e.g., a list of packets or a network protocol header). For example, the specifications of the network operation forward owned by a Bastion Platform pid can be enforced:

forward:=pkt_in=*pkt_out

Where:

pid.NA={port_in, port_out};

pid.pre.forward(x):=port_in↪x; and pid.post.forward(x):=port_out↪x

Let MgmtPort be the set of management ports, TrustedDevPort be the set of trusted-device ports, UntrustedDevPort be the set of untrusted-device ports, and BastionPort be the set of bastion-platform ports. For a network operation nop owned by a Bastion Platform pid, the pre- and post-conditions can be defined as follows:

For management ports: pid.nop.pre(x):=(port∈MgmtPort)∧(x=pkt_mgt); and pid.nop.post(x):=(port∈MgmtPort)∧(x=resp_mgt)

For trusted-device ports: pid.nop.pre(x):=(port∈TrustedDevPort)∧(x=pkt_trust); and pid.nop.post(x):=(port∈TrustedDevPort)∧(x=resp_trust)

For untrusted-device ports: pid.nop.pre(x):=(port∈UntrustedDevPort)∧(x=pkt_untrust); and pid.nop.post(x):=(port∈UntrustedDevPort)∧(x=resp_untrust)

For bastion-platform ports: pid.nop.pre(x):=(port∈BastionPort)∧(x=pkt_bastion); and pid.nop.post(x):=(port∈BastionPort)∧(x=resp_bastion)

The network operation nop is then defined as:

For management ports: forward_mgt:=pkt_mgt=*resp_mgt where:

pid.NA={mgmt_port_in, mgmt_port_out};

pid.pre.forward_mgt(x):=mgmt_port_in↪x; and pid.post.forward_mgt(x):=mgmt_port_out↪x For trusted-device ports: forward_trust:=pkt_trust=*resp_trust where:

pid.NA={trust_port_in, trust_port_out};

pid.pre.forward_trust(x):=trust_port_in↪x; and pid.post.forward_trust(x):=trust_port_out↪x For untrusted-device ports: forward_untrust:=pkt_untrust=*resp_untrust where:

pid.NA={untrust_port_in, untrust_port_out};

pid.pre.forward_untrust(x):=untrust_port_in↪x; and pid.post.forward_untrust(x):=untrust_port_out↪x For bastion-platform ports: forward_bastion:=pkt_bastion=*resp_bastion where:

pid.NA={bastion_port_in, bastion_port_out};

pid.pre.forward_bastion(x):=bastion_port_in↪x; and pid.post.forward_bastion(x):=bastion_port_out↪x Each type of port has its own set of access controls and security mechanisms to ensure that only authorized traffic is allowed to pass through. The interface specification for each network operation nop takes into account the specific security requirements of the corresponding port type.

Local Syntax and Semantics

The language parameter, lang, of a Bastion Platform dictates the syntax of its internal network operations and the semantics by which those operations evaluate. The syntax defines a grammar for network commands, gcmd, and describes the internal states, ρ_net, that manage the local control flow inside a network operation and the internal packet queues (e.g., control packets).

A pair of a network state, σ_net, and an internal state, ρ_net, describes the Bastion Platform state. The semantics •••→defines a local transition migrating a network state of the form σ_net, ρ_net with respect to a given packet queue Q: Q|••σ_net, ρ_net→_ι^δσ_net^ι, ρ_net^ι. The label δ indicates the footprint (read and write set) of this step; when δ is empty, it is omitted. The label ι specifies the type of internal step: abt stands for a step that results in an abort, ret stands for function return, and τ stands for effectless internal steps.

The internal and external network operations are distinguished as follows:

Point-to-Point (P2P) Communication: A general command defining internal network operations ((nod)→) can make a P2P call to another computer platform or Bastion Platform, denoted by (p2p)→. The semantics of P2P communication is defined as: Q⊩ (p2p)→(fv→)=ρ_net^', which returns a new internal state ρ_net^' after sending a packet to the destination computer platform or Bastion Platform.

Multi-Cast Communication: A general command defining internal network operations ((nod)→) can make a multi-cast call to multiple computer platforms and Bastion Platforms, denoted by (mcast)→. The semantics of multi-cast communication is defined as: Q⊩ mcast)→ (fv→)={ρ_net^1, . . . , ρ_net^n}, which returns a set of new internal states {ρ_net^1, . . . , ρ_net^n} after sending packets to multiple destination computer platforms or Bastion Platforms.

Uni-Cast Communication: A general command defining internal network operations ((nod)→) can make a uni-cast call to a single computer platform or Bastion Platform, denoted by (ucast)→. The semantics of uni-cast communication is defined as: Q⊩ (ucast)→(fv→)=ρ_net^', which returns a new internal state ρ_net^' after sending a packet to the destination computer platform or Bastion Platform.

Broad-Cast Communication: A general command defining internal network operations ((nod)→) can make a broadcast call to all Bastion Platforms in the network, denoted by (bcast)→. The semantics of broad-cast communication is defined as: Q⊩ (bcast)→(fv→)={ρ_net^1, . . . , ρ_net^n}, which returns a set of new internal states {ρ_net^1, . . . , ρ_net^n} after sending packets to all destination computer platforms or Bastion Platforms.

Any-Cast Communication: A general command defining internal network operations ((nod)→) can make an any-cast call to any available Bastion Platform, denoted by (acast)→. The semantics of any-cast communication is defined as: Q⊩ (acast)→(fv→)=ρ_net^', which returns a new internal state ρ_net^' after sending a packet to an available destination computer platform or Bastion Platform.

The final element of lang, the set func_net includes four functions for initializing the internal state (initCoreNet) and governing transitions related to external network operations and returns (extCallNet, extRetNet, and haltNet). The function extCallNet is called when an external network operation is made, extRetNet is called when an external network operation returns, and haltNet is called when the current packet is ready to return to its sender. The semantics of a language specifies the behavior of these four functions as follows:

Q⊩ initCoreNet(fv$^{\rightarrow}$)=$\rho$_net initializes a core network function f on arguments v$^{\rightarrow}$ consulting the declarations in the Bastion Platform that owns them.

Q⊩ extCallNet($\rho$_net)=⟨fv$^{\rightarrow}$, $\rho$_net$^{\wedge\prime}$⟩ returns a pair ⟨fv$^{\rightarrow}$, $\rho$_net$^{\wedge\prime}$⟩ when $\rho$_net calls an external network operation f with arguments v$^{\rightarrow}$ and puts $\rho$_net to a waiting state $\rho$_net$^{\wedge\prime}$.

Q⊩ extRetNet($\rho$_net, v)=$\rho$_net$^{\wedge\prime}$ updates $\rho$_net, waiting for the return of an external network operation, to a new state $\rho$_net$^{\wedge\prime}$, with a return value v.

Q⊩ haltNet($\sigma$_net, $\rho$_net)=⟨v, p$^{\wedge\prime}$⟩ returns p$^{\wedge\prime}$ and a return value v iff Q⊩ $\sigma$_net, $\rho$_net→_ret $\sigma$_net, $\rho$_net$^{\wedge\prime}$ with the global network state $\sigma$_net.

Operational Semantics

The network operational semantic rules are of the form ⟨N; $\sigma$_net; k$^{\rightarrow}$;r⟩ ⇒_ι^δ ⟨N^+;$\sigma$_net$^{\wedge\prime}$;k$^{\rightarrow\wedge\prime}$;r$^{\wedge\prime}$⟩. The δ is inherited from the underlying network internal steps and refers to read/write footprints of the step. The label ι is still used to specify the type of network step.

The execution of a network system with an initial global network state $\sigma$_net_0, starts with a configuration, C, of the form (N_0)_($\sigma$_net_0), where $\sigma$_net_0 assigns initial values to the network locations. A configuration is well-defined iff for all nodes in N, their addresses (NA) are unique.

The rule SENDPKT models the sending of a packet from one node to another: ⟨N; $\sigma$_net; k$^{\rightarrow}$;r⟩ ⇒_SENDPKT^δ ⟨N; $\sigma$_net[dst_node:=dst_node ∪{pkt}];k$^{\rightarrow}$;r⟩ where δ represents the packet being sent, and $\sigma$_net[dst_node:=dst_node ∪ {pkt}] is the updated network state with the packet added to the destination node's queue. ∪

The rule RECVPKT models the receiving of a packet by a node: ⟨N; $\sigma$_net; k$^{\rightarrow}$;r⟩ ⇒_RECVPKT^δ ⟨N;$\sigma$_net [src_node:=src_node \ {pkt}];k$^{\rightarrow}$;r where δ represents the packet being received, and $\sigma$_net[src_node:=src_node\ {pkt}] is the updated network state with the packet removed from the source node's queue.

The rule ROUTEUPDT models the update of routing tables by a node: ⟨N;$\sigma$_net;k$^{\rightarrow}$;r⟩ ⇒_ROUTEUPDT^δ ⟨N;$\sigma$_net[node_id:=node_id ∪{new_route}];k$^{\rightarrow}$;r⟩ where δ represents the updated routing table, and $\sigma$_net[node_id:=node_id ∪{new_route}] is the updated network state with the new route added to the node's routing table.

The rule POLICYUPDT models the update of network policies by a node: ⟨N; $\sigma$_net;k$^{43}$;r⇒_POLICYUPDT^δ ⟨N;$\sigma$_net[node_id:=node_id ∪ {new_policy}];k$^{\rightarrow}$;r where δ represents the updated policy, and $\sigma$_net[node_id:=node_id ∪{new_policy}] is the updated network state with the new policy added to the node's policy set.

The rule SENDPATCH models the sending of patches from one node to another: ⟨N;$\sigma$_net;k$^{\rightarrow}$; r⇒_SENDPATCH^δ ⟨N;$\sigma$_net[dst_node:=dst_node ∪{patch}];k$^{\rightarrow}$;r where δ represents the patch being sent, and $\sigma$_net[dst_node:=dst_node ∪{patch}] is the updated network state with the patch added to the destination node's patch queue.

The rule RECV_PATCH models the receiving of patches by a node: ⟨N;$\sigma$_net;k$^{\rightarrow}$;r⟩ ⇒_RECV_PATCH^δ ⟨N;$\sigma$_net[src_node:=src_node\{patch}];k$^{\rightarrow}$;r where δ represents the patch being received, and $\sigma$_net[src_node:=src_node\{patch}] is the updated network state with the patch removed from the source node's patch queue.

These rules define the operational semantics of the network system, and provide a formal foundation for modeling and analyzing network behavior. The rules ensure that packets are delivered correctly, routing tables are updated correctly, policies are enforced correctly, and patches are sent and received correctly.

he notation used in these rules is based on the local syntax and semantics sections, where:

N represents the set of nodes in the network $\sigma$_net represents the global network state k$^{\rightarrow}$ represents the vector of node states r represents the routing table dst_node and src_node represent the destination and source nodes, respectively pkt represents a packet being sent or received new_route represents a new route being added to the routing table new_policy represents a new policy being added to the policy set patch represents a patch being sent or received Theory A set of theorems will now be presented that, when true, provide the result that the abstract compartmentalization disclosed herein yields sound composition of trusted network security mechanisms (TNSM) (e.g., anti-spoofing, anti-flooding, secure kill-switch, secure patch-delivery, and secure network flow) across multiple nodes in a network.

TNSM verified for each Bastion Platform (BP) in isolation hold on concurrent executions of the whole network. To support this, the property of respecting the interface (i.e., respecting routing protocols, network policies, and specified pre- and post-conditions invariants) is shown. A node respects the interface iff all of its functions respect the interface. A set of BP U respects the interface if all BPs in U respect the interface.

A guarantee condition of a BP when it evaluates its own code can be defined. The guarantee condition G(δ,$\sigma$_net,F, M) holds iff M is closed with respect to $\sigma$_net and the footprint δ only touches the network regions in F and M (i.e., closed(M,$\sigma$_net)∧dom($\sigma$_net)⊆F∪M). For this, each internal step of a node must satisfy the guarantee condition. Any step the BP takes asserts the guarantee condition: it does not leak any sensitive information and only changes its own network state and routing tables. Moreover, the step results in a new configuration that has the same property.

If each BP respects the interface in isolation, any concurrent run of the whole network respects the interface. In particular, in any concurrent run, when a packet is transmitted, the global network state satisfies the packet's post-condition. When all nodes respect the interface, a given network invariant is preserved in any concurrent execution.

Theorem 1 (Preservation of Interface Confined Invariants): If a system of BPs U respects the interface, then every step of the abstract operational semantics, discussed herein, preserves the invariants governing the interface.

Corollary 1 (Preservation of Trusted Network Security Mechanism): If a system of BPs U respects the interface, then every step of the abstract operational semantics, discussed herein, preserves the invariants corresponding to the TNSM.

Corollary 2 (Preservation of Anti-Spoofing Mechanism Invariant): If a system of BPs U respects the interface, then every step of the abstract operational semantics, discussed herein, preserves the invariants corresponding to the anti-spoofing mechanism, ensuring that no two nodes in the network have the same network address (NA).

Corollary 3 (Preservation of Anti-Flooding Mechanism Invariant): If a system of BPSs U respects the interface, then every step of the abstract operational semantics, discussed herein, preserves the invariants corresponding to the anti-flooding mechanism, ensuring that network traffic is regulated and flooding attacks are prevented.

Corollary 4 (Preservation of Secure Kill-Switch Mechanism Invariant): If a system of BPs U respects the interface, then every step of the abstract operational semantics, discussed herein, preserves the invariants corresponding to the secure kill-switch mechanism, ensuring that compromised nodes can be quickly isolated and removed from the network.

Corollary 5 (Preservation of Secure Patch-Delivery Mechanism Invariant): If a system of BPs U respects the interface, then every step of the abstract operational semantics, discussed herein, preserves the invariants corresponding to the secure patch-delivery mechanism ensuring that patches destined for a target node is only accessible by the target node in the network.

Corollary 6 (Preservation of Secure Network Flow Mechanism Invariant): If a system of BPS U respects the interface, then every step of the abstract operational semantics, discussed herein, preserves the invariants corresponding to the secure network flow mechanism, ensuring that network traffic respects a given network flow policy.

Theorem 2 (Progress). If a system of BPs U respects the interface and is valid with respect to a global network state σ_net, then the well-defined configuration (node_1.init|| . . . ||node_n.init)_(σ_net_0), can be successfully initialized and every node in the compositional concurrent run of the configuration enjoys progress, i.e. every node can either take a step other than IDLE or it terminates (with TERM, DONE, or ABORT).

In one embodiment of the present invention, the mathematical model includes modeling message queues in a First-In-First-Out (FIFO) sequence. The modeling method presented in the present invention is modular, and can support an arbitrary number of DNRs and Bastion Platforms in the network. In another embodiment of the present invention the modeling approach extends to one or more Bastion Platforms that can be daisy chained together.

In another embodiment the mathematical modeling method involves model scaling to support arbitrary number of DNRs and Bastion Platforms in the network. A mathematical logic in-situ dynamic partial order reduction (DPOR) is employed to allow model scaling. DPOR eliminates mathematical model variables and state space expansion that are not pertinent to the actions being modeled at any given instance using alternate views or universes allowing efficient interleaving of operations.

In some embodiments of the present invention, the mathematical modeling method involves mathematical logic with explicit state modeling (meaning that every possible state of the model specification is checked for).

In one embodiment of the present invention, mathematical modeling is carried out via temporal logic of actions (TLA+) model checking. Temporal logic model checking uses two phases. The first phase is a transpilation from the Pluscal language to the temporal logic representation. The second phase is using the TLC model checker to discharge TNSM invariants.

In one embodiment of the present invention, the Temporal Logic of Actions and model checker is used to generate the temporal logic specification corresponding to our Pluscal model and check the TNSM invariants with both profiling (to ensure path coverage) and without profiling (to collect any counter example trace that will signify the invariant check).

In another embodiment of the invention, data integrity and control logic invariants which are foundational security properties required to support the higher-level properties of anti-spoofing and anti-flooding are written in the temporal logic PlusCal specification language. For each of the TNSM invariants the temporal logic model checker is run two times: (a) during the first phase we model check with profiling included to ensure that model checker traverses all the possible state paths for the system; (b) during the second phase we run the model checker in check mode to collect any counter example traces that will signify the invariant check completion.

In a preferred embodiment, the mathematical modeling and validation approach such as those discussed in the U.S. patent application Ser. No. 19/345,409 filed on Sep. 30, 2025 (enforcing provably secure permitted patterns of computer platform operations without adversarial influence), may be used to model and prove Trusted Path Security Mechanism (TPSM), a foundational security mechanism required to support TNSM. In this embodiment TPSM is modeled and proven on the Bastion Platform implementation that enforces TNSM.

Mathematical Model Implementation Validation Mechanism

A system and methods to perform conformance testing of the mathematical model and the PEE implementations within the Bastion Platform in order to ensure that PEE implementation preserves the TNSM that are proven in the mathematical model is discussed herein. In one embodiment of this system the conformance testing between mathematical model and PEE implementation can be done in a Continuous Integration/Continuous Development (CI/CD) software development pipeline.

Figure 10:
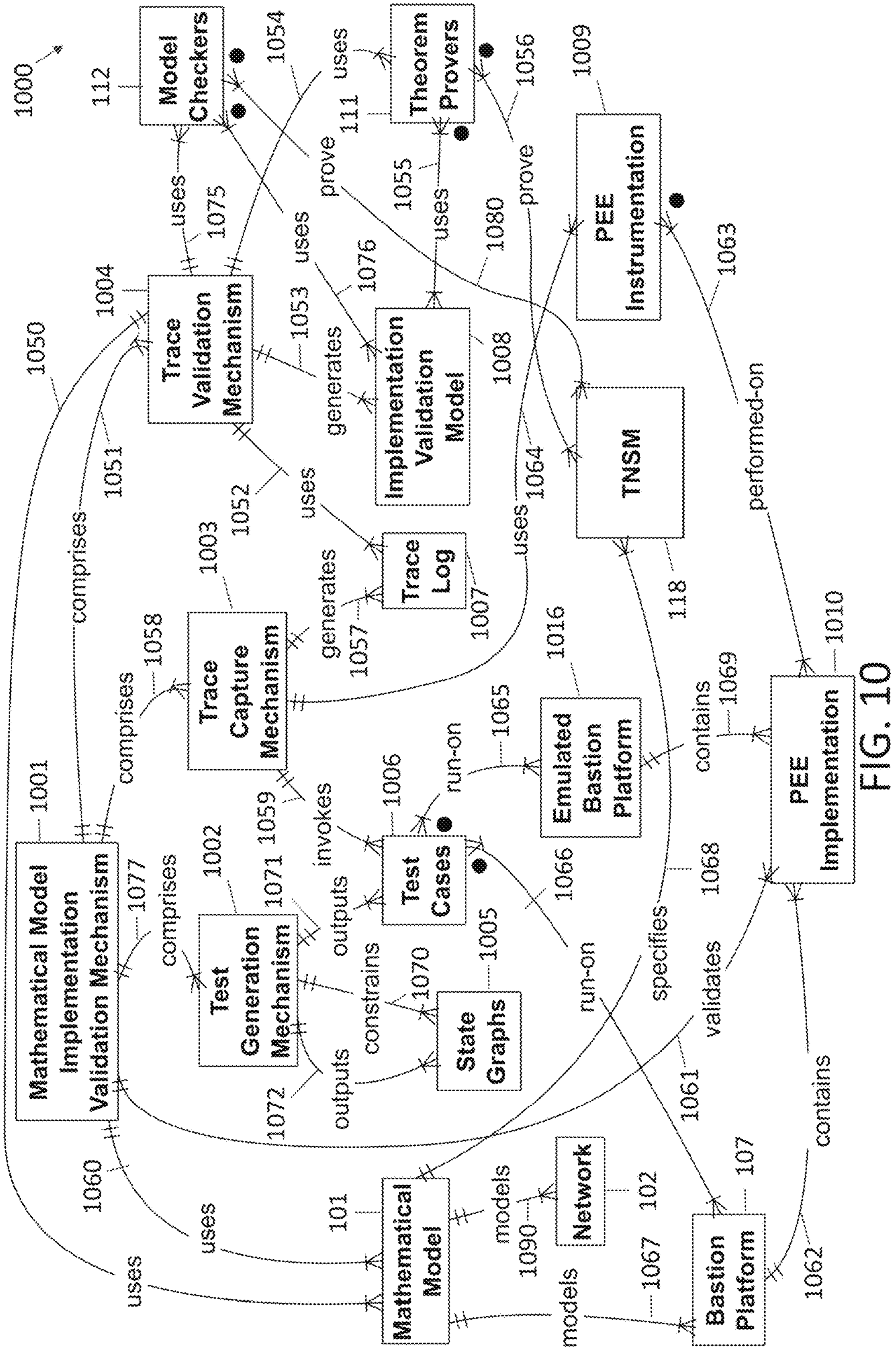
FIG. 10 shows a system 1000 for mathematical model implementation validation mechanism according to some embodiments.

FIG. 10 shows a system 1000 for mathematical model implementation validation mechanism 1001 according to some embodiments. In system 1000, mathematical model implementation validation mechanism 1001 comprises (see connecting lines 1077, 1058 and 1051) one or more test generation mechanism 1002, one or more trace capture mechanism 1003, and one or more trace validation mechanism 1004 respectively. The mathematical model implementation validation mechanism 1001 uses (see connecting line 1060) one or more mathematical model 101. Mathematical model 101 models one or more bastion platform 107 and one or more networks 102 (see connecting line 1067 and 1090 respectively) and specifies (see connecting line 1068) one or more TNSM 118.

In system 1000, test generation mechanism 1002 outputs (see connecting line 1072 and 1071) one or more state graphs 1005 and one or more test cases 1006 respectively. Test generation mechanism 1002 also constrains (see connecting line 1070) one or more state graphs 1005. One or more test cases 1006 run-on (see connecting lines 1065 and 1066) one or more emulated bastion platform 1016 and one or more bastion platform 107 respectively.

In system 1000, trace capture mechanism 1003 invokes (see connecting line 1059) one or more test cases 1006 and uses (see connecting line 1064) one or more PEE instrumentation 1009 and generates (see connecting line 1057) one or more trace log. Bastion platform 107 contains (see connecting line 1062) one or more PEE implementation 1010. Similarly, emulated bastion platform 1016 contains (see connecting line 1069) one or more PEE implementation 1010. Mathematical model implementation validation mechanism 1001 validates (see connecting line 1061) one or more PEE implementation 1010. PEE instrumentation is performed-on (see connecting line 1063) one or more PEE implementation 1010.

In system 1000, trace validation mechanism 1004 uses (see connecting line 1050 and 1052) one or more mathematical model 101 and one or more trace log 1007 respectively. Trace validation mechanism 1004 generates (see connecting line 1053) one or more implementation validation model 1008. Finally, trace validation mechanism 1004 uses (see connecting lines 1075 and 1054) one or more model checkers 112 and one or more theorem provers 111 respectively. One or more theorem provers 111 uses (see connecting line 1055) one or more implementation validation model and prove (see connecting line 1056) one or more TNSM 118. One or more model checkers 112 uses (see connecting line 1076) one or more implementation validation model and prove (see connecting line 1080) one or more TNSM 118.

In one embodiment of the system 1000 the mathematical model 101 models the bastion platform 107 and the network 102 as a state machine. The state machine has a set of variables, and each state is an assignment of specific values to those variables. The variable can represent memory state, network state, CPU state and/or peripheral state with the memory state including state of the PEE memory regions including PEE functions. The state machine also has a set of allowed actions, which are transitions from one state to the next state. State graphs 1005 can be constructed by drawing states as nodes and allowed actions as edges. A behavior is any path through the graph. The mathematical model 101 may be modeled with existing assume-guarantee interface confined automated modeling mechanisms as discussed in U.S. Pat. No. 12,367,328.

In some embodiments of the system 1000, the mathematical model 101 describes the bastion platform and PEE execution as a transition system. In this embodiment a so-called "transition predicate" describes how the system may change its state from one state to another. When the predicate says "true" for two states s1 and s2, the system is allowed to move from state s1 to s2. If the predicate then also says "true" for s2 and some s3, the system can move from s1 to s2 to s3, and so on. Given the transition predicate, and another, "initial" predicate that specifies which states are valid starting states, mathematical model checkers 112 can construct all valid sequences of states. Additionally, the mathematical model can specify a predicate that defines what the "good" and the "bad" states are, and the model checkers 112 can then raise an alarm if a bad state can be reached through some valid sequence of states.

In one embodiment of system 1000, the mathematical model 101 of the bastion platform 107 comprises one or more PEE implementation 1010 interfaces (formal representation of PEE functions) that change state when they execute. This state can be a memory state, network state, CPU state and/or peripheral state. For each PEE uid∈dom (U) and every function f∈uid.(fd), an interface {P(x)}uid.f{Q(x)} is fixed and collected in the set Δ_u. P(x) and Q(x) are pre- and post-conditions of the function f enforcing TNSM, respectively. The mathematical model 101 models functions by defining the transition predicate to be: the pre-condition P(x) holds and the post-condition Q(x) holds.

In some embodiments of the system 1000, the mathematical model 101 specification has a set of behaviors Bspec, and the PEE implementation 1010 has a set of behaviors Bimpl. Mathematical bisimulation is used to prove the PEE implementation 1010 refines the mathematical model 101 specification if Bimpl ⊂ Bspec and the converse is also true if Bspec ⊂ Bimpl. mathematical model implementation validation ⊂ mechanism 1001 checks if the PEE ⊂ implementation 1010 can produce all possible behaviors described in the mathematical model and vice versa, verifying that the PEE implementation 1010 has preserved all the TNSM 118 specified and proven in the mathematical model 101.

In system 1000, the test generation mechanism 1002 generates test cases 1006 that force a set of PEE implementation 1010 to follow a sequence of transitions specified in a mathematical model, thereby ensuring conformance between the implementation and the model. In particular, for every behavior in the specification (Bspec), the test generation mechanism generates a test case that exercises the implementation in a specific sequence of transitions, such that if there is a behavior in the specification that the implementation cannot follow, then Bspec ⊂ Bimpl. In one embodiment, mathematical model checkers 112 are used to output an entire state graph for the mathematical model specification, which may be constrained to interfaces for a set of PEE implementation 1010.

In one embodiment of system 1000, a Directed Acyclic Graph (DAG) with a finite number of behaviors, each representing a path from an initial state to a final state may be employed to output state graphs 1005. The model checker's 112 output is then parsed, and a unit test is automatically created for each behavior in the DAG. This parsing process may involve traversing the graph using a depth-first search (DFS) algorithm to identify all possible paths from an initial state to a final state, wherein each path is used to generate a test case that exercises the PEE implementation 1010 in a specific sequence of transitions.

In some embodiments of system 1000, fuzzing tools, such as AFL or LibFuzzer, may be employed to create unit tests for each behavior in the DAG. These fuzzing tools are configured to generate random inputs that exercise the implementation in a specific sequence of transitions, and the resulting test cases are then validated against the expected behavior. Alternatively, a Large Language Model (LLM), such as a neural network or a decision tree, may be used to generate fuzzed inputs for each behavior in the DAG, wherein the LLM is trained on a dataset of valid and invalid inputs.

In one embodiment of system 1000, the test generation mechanism 1002 may also utilize coverage-guided fuzzing tools to create unit tests for each behavior in the DAG. These tools are configured to generate random inputs that maximize code coverage, and the resulting test cases are then validated against the expected behavior. Furthermore, the test generation mechanism may be integrated with existing PEE unit tests in a Continuous Integration/Continuous Deployment (CI/CD) manner, using a test framework such as JUnit or PyUnit to run the automatically generated unit tests.

In other embodiments, the DAG parsing process involves constraining the state graph 1005 to interfaces for a set of PEEs or a single PEE, by applying interface-specific filters to the state graph 2005. The resulting filtered graph is then used to generate test cases 1006 that exercise the PEE implementation 1010 in a specific sequence of transitions.

In system 1000, the trace capture mechanism 1003 generates a trace log file that records a PEE implementation's 1010 state transitions, including all implementation variables that match mathematical model specification variables, for every behavior in Bimpl. If the behavior recorded in the trace is not allowed by the spec, then Bimpl ⊂ Bspec and the test fails. To achieve this, the mechanism involves PEE instrumentation 1009 which modifies PEE functions to detect pre- and post-conditions using two mechanisms: (i) instrumentation interspersed into the PEE functions; and (ii) instrumentation support functions kept in a separate PEE. The instrumentation that is interspersed into the PEE function records the appropriate state details for the pre- and post conditions which involve memory state (heap and stack), CPU state and associated network and peripheral state. Each collected state pair describes the PEE functions state for a set of PEE functions for a given behavior. The instrumentation support functions allow for obtaining relevant stack, heap and CPU traces and storing those traces in memory to be later stored to a non-volatile storage media such as the disk. Finally, the trace capture mechanism invokes the set of behaviours by executing the test cases 1006 and collects the corresponding state pairs for the PEE functions that are executed as part of the test case in one or more trace log 1007. The PEE instrumentation 1009 technique employed by the trace capture mechanism 1003 may vary depending on the specific requirements of the PEE implementation 1010.

In some embodiments of system 1000, PEE instrumentation 1009 may be performed using various techniques, including source-level instrumentation by modifying the PEE source code to add logging statements that record pre- and post-conditions, such as through aspect-oriented programming or programming language and compiler plugins. Alternatively, binary-level instrumentation may be employed using tools like binary rewriting or instrumentation frameworks, such as DynamoRIO, allowing for modification of PEE functions without changing the source code. Additionally, eBPF probes can be utilized to add instrumentation to PEE functions, leveraging extended Berkeley Packet Filter feature for tracing and debugging.

In certain embodiments of system 1000, instrumentation support functions may be implemented using eBPF to obtain stack, heap, and CPU traces, or utilizing CPU performance registers to collect CPU-state information. These support functions can store collected traces in memory and later stored to non-volatile storage media, such as disk. Furthermore, kernel or hypervisor APIs can be employed to access low-level system information for tracing and debugging purposes.

In one embodiment of system 1000, the trace capture mechanism 1003 may also involve running test cases within a regular bastion platform 107 or an emulated bastion platform 1016 including emulators like QEMU, Bochs or dynamic execution engines such as Valgrind or Pin, to collect traces. Moreover, parallel test cases 2006 execution and trace capture can be achieved using containerization technologies, like Docker or Kubernetes, where each test case is executed within its own container for efficient resource utilization.

In a preferred embodiment, the trace capture mechanism 1003 incorporates unforgeable telemetry mechanisms, such as those discussed in U.S. patent application Ser. No. 19/254,764 filed on Jun. 30, 2025, to collect trustworthy and tamper-proof traces that can be used to detect security vulnerabilities or performance issues. Furthermore, hardware-based tracing technologies, including Intel's Processor Trace (PT) or ARM's Embedded Trace Macrocell (ETM), may be utilized to collect detailed information about CPU execution and memory access patterns.

In all embodiments, the trace capture mechanism 1003 is designed to collect accurate and reliable traces that can be used to verify the preservation of TNSM 118 of a set of PEE implementation 1010 with respect to a mathematical model specification.

In system 1000, the trace validation mechanism 1004 ensures that PEE implementation 1010 traces comply with mathematical model specification. The trace validation mechanism 1004 summons the state transition predicate of the mathematical model, and checks if the state pairs that are obtained satisfy the predicate for the invariants corresponding to the security mechanism that is modeled. If it doesn't, then the implementation has done something that the mathematical model didn't account for and an alarm is raised (failing the trace validation process). If the state pairs satisfy the predicate for the invariants corresponding to the security mechanism that is modeled, then the implementation preserves all the security mechanism invariants that have been proven in the mathematical model and a success is reported.

In system 1000, the trace validation mechanism 1004 generates an implementation validation model 1008 for this purpose. The implementation validation model 1008 is another mathematical model that is derived from the original mathematical model but includes the state transition predicate and invariant relation and all the collected traces from the unified trace log 1007. The trace validation mechanism 1004 then uses a combination of theorem provers 111 and model checkers 112 in order to prove the invariant relation.

In one embodiment of system 1000, this mathematical model can be specified in temporal logic of actions (TLA+) with the transition relation 'Next(x, y)', and the recorded pre- and post-states s and s'. The implementation validation model is created with 'Init(x)==x=s' and 'Next2(x, y)==y=s'$\wedge$ Next(x, y)', and the validation check essentially is a mathematical model checking to see if the implementation validation model deadlocks or not. If it does, then the state doesn't conform to the transition relation and therefore the implementation does not meet the mathematical model specification an alarm is raised (failing the trace validation process).

In some embodiments of system 1000, the failure of the trace validation mechanism 1004 may produce a mathematical counter-example which shows the type and details of the failed relation and corresponding states associated with it. This information can be used to fix the PEE implementation 1010 accordingly in order to make it conformant to the mathematical model 101.

In an embodiment of system 1000, a method for validating the implementation of anti-flooding Trusted Network Security Mechanisms (TNSM) on the Bastion platform is provided. The embodiment includes four key functions: add_to_recv, del_from_recv, add_to_xmit, and do_xmit, wherein said functions are implemented within one or more Protected Execution Environments (PEEs) on the Bastion platform to enforce the anti-flooding TNSM.

In this embodiment, behavior specifications for each of the aforementioned functions are written in the ANSI C Specification Language (ACSL), which defines the expected behavior of each function in terms of preconditions, postconditions, and anti-flooding TNSM invariants. The ACSL behavior clause is used to define two high-level behaviors for each function: full_buffer—describes the behavior when the ring buffer is full and therefore transmission halts, preventing flooding; and successful_transmission—describes the behavior when there is enough space in the ring buffer to transmit the packet successfully through one or more Bastion network ports.

In this embodiment, the method further comprises using automated C verifiers, such as Frama-C, to discharge the invariants via back-end theorem provers and SAT solvers. In particular, Frama-C's deductive verification engine is used to solve behavior specifications and invariants using the weakest-precondition (WP) method, which provides a formal proof that the implementation of each function matches its abstract specification in mathematical logic. This approach allows for the validation of the TNSM implementation on the Bastion platform, ensuring that the security invariants proven for anti-flooding are preserved.

In a further aspect of this embodiment, the validation process involves analyzing the output of the Frama-C WP module and resulting back-end theorem prover 111 results to indicate the result (pass/fail) for each of the behavior specification invariants for the four functions. The security properties hold if all behavior specifications for the aforementioned four functions are successfully proven via Frama-C WP with "pass" for each behavior specification and associated invariant definitions.

In another aspect of this embodiment, the method may further comprise leveraging Frama-C's support for interactive theorem proving using Coq and Why3 to provide an additional layer of security and verification for the Bastion platform. By combining mathematical modeling, behavior specification, and automated verification techniques, this embodiment provides a comprehensive validation of the anti-flooding TNSM implementation on the Bastion platform This embodiment may be implemented in various ways, including but not limited to, using one or more computer processors, memory devices, and software modules. The method may be performed at design time, in real-time or near real-time, and may be used in conjunction with other TNSM.

Telemetry and User-Interface

In an embodiment of the present invention, the system comprises a user interface (UI) module that provides a comprehensive view of the network, enabling users to efficiently manage and secure Distributed Network Resources (DNRs). The UI module includes separate sections for displaying network device asset mapping, patch status of network device end-points, policy status of Bastion Platforms (BPs), providing an alert interface, and enabling or disabling DNRs in the network on UI configuration.

The asset mapping section of the UI module displays a hierarchical representation of all BPs at various layers of a given network site hierarchy, as well as all DNR endpoints and their associated network addresses. This feature enables users to visualize the network topology and understand how different devices are connected, thereby facilitating efficient management and troubleshooting of the network.

In addition to asset mapping, the system provides real-time information on patch status for DNR end-points, including the current patch level and unique hashes, which are displayed in a separate section of the UI module. This allows users to quickly identify any potential security vulnerabilities and take prompt action to mitigate them. Furthermore, the policy status of BPs is also displayed, including the current policy version, enabling users to ensure that their network devices are compliant with relevant policies.

The alert interface is another critical component of the system, providing real-time alerts for spoofing and flooding attacks detected and prevented by the BPs. The alert interface includes a table that displays the affected DNR end-points, allowing users to take prompt action to mitigate any potential security threats. Users can also enable or disable the associated DNRs based on the UI configuration, thereby providing flexibility in managing network security.

In an embodiment of the present invention, the BP automatically cuts-off the DNR end-point upon detecting spoofing or flooding attacks on the bastion network ports. However, the BP can be configured to allow the DNR end-point to continue operating until disabled via the UI, thereby enabling users to balance security requirements with operational needs.

The construction of the patch and policy interface is another key aspect of the system's design. This feature provides a comprehensive view of the current patch level of all DNR end-points and policy versions on the BPs, along with unique hashes. Users can configure patches and policies for a given DNR end-point or Bastion Platform, ensuring that these critical components are kept up-to-date and secure.

The UI module also includes a regulatory control visualization feature, which displays real-time information on regulatory controls that are violated and those that are preserved. This enables users to quickly identify any deviations from established regulations, such as NERC CIP, or other relevant guidelines. The system provides a clear and concise view of the network's compliance status, allowing users to take prompt action to mitigate any potential risks or non-compliance issues.

In an embodiment of the present invention, the UI module displays a list of regulatory controls that are currently being enforced by the BP, as well as those that have been violated or compromised in some way. This information is presented in an easy-to-understand format, making it simple for users to identify and address any compliance issues.

Overall, the system and method for provably secure network operation ensures integrity and availability of DNRs, providing a comprehensive solution for monitoring and securing IT and OT networks that utilize DNRs. The UI module is designed to provide a clear and concise view of the network, allowing users to easily identify and manage DNR endpoints, thereby facilitating efficient management and security of the network.

Embodiments

A couple of embodiments of the present invention are presented herein.

In one embodiment of the present invention, a system for creating a provably isolated network architecture via TNSM is provided, ensuring the secure operation and monitoring of Distributed Network Resources (DNRs) in the network. This embodiment involves the use of a software-defined virtual IO switch (vIOSwitch), which provides secure network flow Trusted Network Security Mechanisms (TNSM) using a network control flow policy. The vIOSwitch supports existing network stack communications such as TCP, UDP, and RAW, allowing for seamless integration with existing network protocols.

In this embodiment, a DNR packet processing library is augmented to leverage the vIOSwitch APIs to send and receive network packets both from a physical network port and to a Bastion Protected Execution Environment (BPEE) via the vIOSwitch virtual network interface. The use of a software-defined virtual IO switch provides several benefits, including improved network security and reduced latency. The provably isolated network architecture ensures that DNRs can be monitored securely, without compromising their integrity or availability.

This embodiment further involves the creation of failsafe sensing and orchestration BPEEs anchored via a Keystone PEE (KPEE) on OT network end-point automation system platforms (functioning as Bastion Platform) to control sensitive DNRs. The BPEEs and KPEEs within the Bastion Platform provide a secure and reliable way to monitor and control DNRs, even in the event of a security breach or system failure. Such DNRs can include Programmable Logic Controllers (PLCs) that are used to control critical plant operations (e.g., oil and gas network, smart-grid networks etc.).

In this embodiment, a BPEE provides secure kernel functionality, a capability-focused protected execution environment that can work in conjunction with a rich execution environment, typically an operating system such as Linux or FreeRTOS that is implemented as a DPEE. The BPEE ensures memory integrity and separation between the DPEEs, providing a secure way to execute critical safety functions within the Bastion Platform.

To create the failsafe sensing and orchestration BPEEs, the existing Programmable Logic Controller (PLC) runtime is split into a BPEE that houses the PLC runtime orchestrator component, responsible for scheduling various control logic execution blocks. The DPEE contains the remaining PLC logic. Additionally, a Linux OS pressure sensor device driver is split into its corresponding BPEE and DPEE, with the safe mode component protecting the I/O regions of the pressure sensor and providing a simple API for reading sensor values via the I/O regions.

This embodiment ensures that PLC functions as normal during regular operations but provides provable resiliency in terms of the pressure sensor control logic always working even if the rest of the system, including other portions of PLC and the host Linux operating environment, is compromised. The system as in this embodiment provably protects against entire classes of common cause and common access cyber-attacks over the network (as evidenced in real-world malware such as Stuxnet and Triton), thereby providing a secure and reliable way to monitor and control DNRs.

This embodiment may be implemented in various ways, including but not limited to, using one or more computer processors, memory devices, and software modules. The system may be used in conjunction with other TNSM to provide a robust and secure environment for DNRs on a network. The use of a software-defined virtual IO switch and failsafe sensing and orchestration BPEEs provides a comprehensive solution for securing DNRs and preventing network cyber-attacks, making it an attractive solution for industries that rely on critical infrastructure, such as oil and gas, smart-grid networks, and other industrial control systems.

In another embodiment of the present invention, a system for managing Distributed Network Resources (DNRs) is provided, comprising a secure runtime system anchored via a Bastion Platform. The Bastion Platform is used to send network data flow policy and patch updates to other Bastion Platforms and DNR end-points via a click-and-deploy approach, provide real-time telemetry from the Bastion Platform delivered to the application which in turn displays the asset maps along with any alerts (for flooding and spoofing), and orchestrate mathematically backed isolation for multiple DNR packet processing Protected Execution Environments (PEEs) on a given Bastion Platform that can exchange information between themselves (e.g., for packet offloading) via a First-in-First-Out message passing.

In this embodiment, the Bastion Platform may be running an ARM or RISC-V processor, and alternatively, the PEE within the Bastion Platform can be a hypervisor running on a x86 platform. The PEE can also be a hardened Linux kernel distribution with Trusted Path Security Mechanism (TPSM) and enforcing TNSM. The Bastion Platform can support 16 DNR bastion network ports and associated attribution PEEs, which are able to communicate with each other with FIFO messaging while being able to handle network data inputs through the physical ports.

This embodiment consists of DNR packet processing PEEs and a Keystone PEE (KPEE) orchestrator to schedule multiple PEEs on multiple processors. The system consists of the following PEE groups: (i) management PEEs; (ii) DNR packet processing PEEs; and (iii) link-layer routing PEEs. The management PEEs consist of three PEEs: patch, policy, and alert, which respond to DNR end-point patch delivery and Bastion Platform policy delivery events respectively. These agents store the signed hashes of the patches and policy being applied along with their timestamp before performing their functionality.

Each of the DNR processing PEEs consists of a DNR packet processing library and a vIOSwitch shim, which is responsible for processing packets in a FIFO manner and for detecting spoofing and flooding attacks. The link layer PEEs consist of the upstream, downstream, and in-level link routing implementation. A KPEE is used as a PEE orchestrator, which is essentially a scheduler that can schedule all the aforementioned PEEs efficiently on a x86 CPU using weighted fair-share scheduling, giving DNR packet processing PEEs that are intensive with network IO a priority boost allowing them to meet their network packet processing deadlines, while ensuring equitable distribution of total compute capacity.

In this embodiment, a fourth PEE runs the management console UI application, and another PEE is instantiated that houses the policy, patch, and alert data store (including alert logs and patch and policy configuration files). This ensures that the associated patch and policy files including alert logs cannot be tampered with except for use by the UI application as well as the policy, patch, or alert manager. The aforementioned enclaves use the vIOSwitch framebuffer and the disk framework for rendering and storage, that is mediated by the KPEE.

The management UI application uses the vIOSwitch network to communicate with the patch, alert, and policy managers which in turn apply the patch/policy or return the current alerts read from the Bastion Platform. The proposed invention can run the patch application provided by a vendor within the enclave to apply the patch and can therefore support any DNR vendor/device. The aforementioned scheme ensures that any network message sent or received from the OT network can only originate from the patch, policy, or alert manager enclaves and reach their corresponding PEEs operating within the Bastion Platform.

In this embodiment, the system contains support for: (a) patch applications that can be scripted and run as a command line tool; and (b) patch applications that use a UI, in which case the system employs a UI automation tool to script the vendor patch application UI to deliver the patch. The KPEE can be a hypervisor that runs the Linux and Windows operating-systems on x86 and ARM platforms within DPEEs with complete mediation and TPSM. Alternatively, the KPEE and DPEEs can execute on the same CPU of the platform or on different separate CPUs of the platform, ensuring optimal performance with minimal performance overhead since each CPU core is responsible for its own scheduling of tasks.

Furthermore, an add-on hardware card with multiple low power processing cores (e.g., RISC-V) can be embedded to increase the number of cores on existing OT network workstation and Bastion platforms. Most of the existing OT network workstation platforms have Peripheral Component Interconnect (PCIe) ports which can be used to add such capabilities, thereby providing a scalable and secure solution for managing DNRs.

Figure 11:
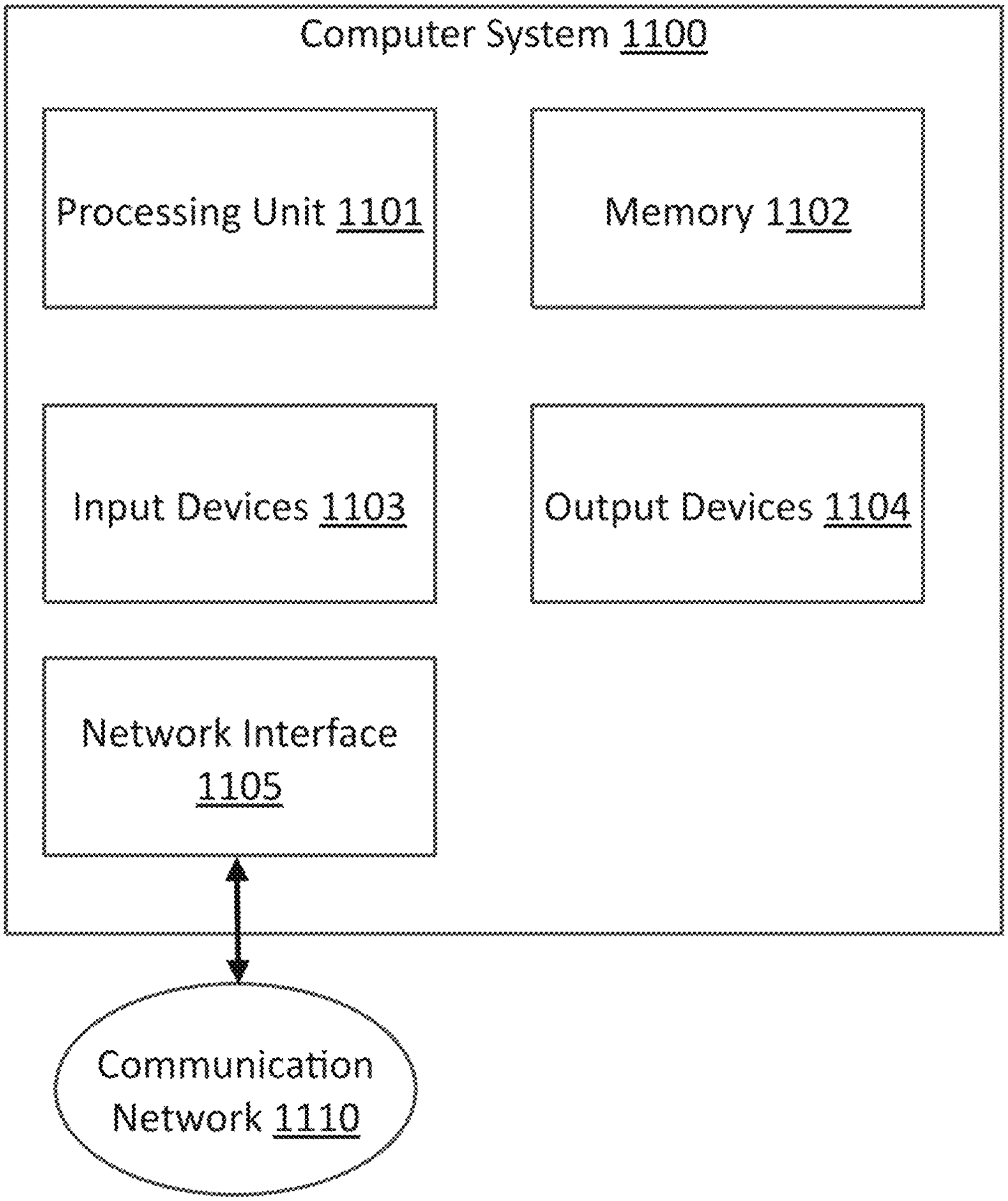
FIG. 11 shows, schematically, an illustrative computer system 1100 on which aspects of the present disclosure may be implemented.

FIG. 11 shows, schematically, an illustrative computer system 1100 on which aspects of the present disclosure may be implemented. For example, computer system 1100 may be used to implement system 100 and/or the subsystems discussed herein. In the example of FIG. 11, the computer system 1100 includes a processing unit 1101 having one or more computer hardware processors and one or more articles of manufacture that comprise at least one non-transitory computer-readable storage medium (e.g., a memory 1102) that may include, for example, volatile and/or non-volatile memory. Memory 1102 may store one or more instructions to program the processing unit 1101 to perform any of the functions described herein. Memory 2102 may also store one or more application programs and/or resources used by application programs (e.g., software libraries). Different portions of memory 1102 may be used for different storage purposes. For example, a non-volatile portion of memory 1102 may be used for long term storage, while volatile memory may be used to facilitate fast access for processing unit 1102. Though, memory 1102 may include any suitable type or combination of types of computer storage media that are able to store data. To perform any of the illustrative functionalities described herein, processing unit 1101 may execute one or more processor-executable instructions stored in memory 1102, which may serve as non-transitory computer-readable media storing processor-executable instructions for execution by the processing unit 1101.

The computer system 1100 may have one or more input devices and/or output devices, such as devices 1103 and 1104 illustrated in FIG. 11. These devices may be used, for instance, to present a user interface. Examples of output devices that may be used to provide a user interface include printers, display screens, and other devices for visual output, speakers and other devices for audible output, braille displays and other devices for haptic output, etc. Examples of input devices that may be used for a user interface include keyboards, pointing devices (e.g., mice, touch pads, and digitizing tablets), microphones, etc. For instance, the input devices 2103 may include a microphone for capturing audio signals, and the output devices 2104 may include a display screen for visually rendering, and/or a speaker for audibly rendering, recognized text.

In the example of FIG. 11, computer system 1100 also includes one or more network interfaces (e.g., a network interface 1105) to enable communication via various networks (e.g., a network 1110). Computer networks include, for example and not limitation, local area networks (e.g., an enterprise network) and wide area networks (e.g., the Internet). Such networks may be based on any suitable technology operating according to any suitable protocol, and may include wireless networks and/or wired networks (e.g., fiber optic networks). It should be appreciated that components of computer system 1100 may be distributed across a computer network; this may be done, for example, to facilitate distributed processing, to achieve connectivity with (e.g., remote) input devices and/or output devices, or for any other suitable reason.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

In this respect, it should be appreciated that one implementation of the above-described embodiments comprises at least one computer-readable medium encoded with a computer program (e.g., a plurality of instructions), which, when executed on a processor, performs some or all of the above-discussed functions of these embodiments. As used herein, the term "computer-readable medium" encompasses only a computer-readable medium that can be considered to be a machine or a manufacture (i.e., article of manufacture). A computer-readable medium may be, for example, a tangible medium on which computer-readable information may be encoded or stored, a storage medium on which computer-readable information may be encoded or stored, and/or a non-transitory medium on which computer-readable information may be encoded or stored. Other non-exhaustive examples of computer-readable media include a computer memory (e.g., a ROM, a RAM, a flash memory, or other type of computer memory), a magnetic disc or tape, an optical disc, and/or other types of computer-readable media that can be considered to be a machine or a manufacture.

As used herein, a "set" may have one or more members. For example, "a set of programs" could have a single program or multiple programs. As used herein "subset" of a set may have the same number of members as the set or fewer members than the set but at least one member of the set. For example, a set of programs consisting of programs A, B, and C could be divided into the following seven subsets A; B; C; A, B; A, C; B, C; and A, B, C. A set may also be formed from other sets. For example, set X may be made up of set Y and set Z; that is set Y and set Z are each a subset of set X.

As used herein, the term "or" is intended to mean an inclusive "or," and is used interchangeably with "and/or," unless the context clearly dictates otherwise. Thus, "A or B" encompasses "A alone," "B alone," and "both A and B together." Only where the specification explicitly describes alternatives as being mutually exclusive, or where such exclusivity is otherwise clearly required by the context, should "or" be construed as an exclusive "or."

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A system comprising:

a bastion platform having at least one processor, a network peripheral and at least one non-transitory computer-readable storage medium, the at least one non-transitory computer-readable storage medium having stored thereon a set of program execution elements (PEE), each PEE of the set of PEEs (i) executable by the at least one processor, (ii) having a respective privilege level, (iii) in a respective memory address space, and (iv) enforcing a trusted network security mechanism;

a set of computer platforms, the set including the bastion platform and one or more second computer platforms, each of the one or more second computer platforms having a respective second processor, second network peripheral, and second non-transitory computer-readable storage medium;

a network of the set of computer platforms; and a mathematical model of the network, the mathematical model (I) having a formal representation of the computer platforms including, for the bastion platform, a representation of the at least one processor, the network peripheral, the at least one non-transitory computer-readable storage medium, and the set of PEEs, and, for the one or more second computer platforms, a representation of the respective second processor, second network peripheral, and second non-transitory computer-readable storage medium, and (II) specifying invariants to enforce the trusted network security mechanism with assume-guarantee interface-confined mathematical reasoning, and (III) proving the trusted network security mechanism for the set of computer platforms, wherein the trusted network security mechanism enforces permitted patterns of operations of the network, the operations of the network including at least one of (i) point-to-point network operations, (ii) broadcast network operations, (iii) multi-cast network operations, and (iv) operations involving access to and manipulation of the state of the bastion platform ("bastion platform network state").

2. The system of claim 1, wherein each of the one or more second computer platforms has a respective network address; and the trusted network security mechanism comprises an anti-spoofing mechanism that ensures authenticity of the respective network addresses of the one or more second computer platforms.

3. The system of claim 1, wherein the one or more second computer platforms includes a third computer platform; and the trusted network security mechanism comprises an anti-flooding mechanism that ensures that a network throughput of the third computer platform is limited to a predefined threshold.

4. The system of claim 1, wherein the one or more second computer platforms includes a third computer platform;

the trusted network security mechanism comprises a secure kill-switch mechanism; and the bastion platform utilizes the secure kill-switch mechanism to completely block network traffic from the third computer platform.

5. The system of claim 1, wherein the one or more second computer platforms includes a source computer platform and a destination computer platform; and the trusted network security mechanism comprises a secure patch-delivery mechanism that permits the source computer platform to send a tamper-proof, signed patch to the destination computer platform.

6. The system of claim 1, wherein the trusted network security mechanism comprises a secure network flow mechanism to permit only predefined network packet flow between the computer platforms.

7. The system of claim 1, wherein the one or more second computer platforms includes a set of trusted computer platforms, a set of untrusted computer platforms, and a set of other bastion platforms; and the bastion platform comprises a set of ports, the set of ports including (i) a set of management ports for managing a state of the bastion platform including network policies, (ii) a set of trusted device ports for connecting to the set of trusted computer platforms, (iii) a set of untrusted-device ports for connecting to the set of untrusted computer platforms, and (iv) a set of bastion-platform ports for connecting to the set of other bastion platforms.

8. A system for performing a computer-implemented method for formal verification of a design and operation of a network of a set of computer platforms, the set of computer platforms including a bastion platform and one or more second computer platforms, the system comprising:

one or more processors; and a non-transitory computer-readable storage medium storing computer-executable instructions that, when executed by the one or more processors, cause the one or more processors to perform operations comprising acts of:

modeling in a mathematical model the set of computer platforms in the network using a formal representation of a set of processors ("platform processors") including one or more bastion platform processors for the bastion platform, non-transitory computer-readable storage media ("platform memory") including bastion platform memory for the bastion platform, and a set of network peripherals of the computer platforms;

further modeling in the mathematical model the bastion platform with a set of program execution elements (PEEs) in the formal representation, each PEE of the set of PEEs represented as (a) executable by the one or more bastion platform processors, (b) having a respective privilege level, and (c) utilizing a respective memory address space in the bastion platform memory;

specifying, in the mathematical model, invariants, to enforce a trusted network security mechanism (TNSM), with assume-guarantee interface-confined mathematical reasoning;

evaluating the mathematical model of the network; and determining from the evaluating that the TNSM holds true for the network.

9. The system of claim 8, wherein the TNSM comprises at least one of the group consisting of an anti-spoofing mechanism, an anti-flooding mechanism, a secure kill-switch mechanism, a secure patch delivery mechanism, and a secure network flow mechanism.

10. The system of claim 8, wherein the formal representation of the TNSM includes an anti-spoofing mechanism to ensure authenticity of network addresses of the computer platforms in the network.

11. The system of claim 8, wherein the formal representation of the TNSM includes an anti-flooding mechanism that ensures that the throughput of a third computer platform among the one or more second computer platforms is limited to a predefined threshold.

12. The system of claim 8, wherein the formal representation of the TNSM includes a secure kill-switch mechanism; and the bastion platform utilizes the secure kill-switch mechanism to completely block network traffic from a third computer platform among the one or more second computer platforms.

13. The system of claim 8, wherein the formal representation of the TNSM includes a secure patch-delivery mechanism that permits a source computer platform to send a tamper-proof signed patch to a destination computer platform, the source and destination computer platforms among the one or more second computer platforms.

14. The system of claim 8, wherein the formal representation of the TNSM includes a secure network flow mechanism to permit only predefined network packet flow between the set of computer platforms.

15. The system of claim 8, wherein the formal representation further comprises (i) an interface defined for each computer platform in the set of computer platforms, wherein the interface includes conditions that must be met before and after execution of one or more network operations of the respective computer platform;

(ii) a specification of the platform memory and memory regions accessible for each computer platform in the set of computer platforms;

(iii) a representation of conditions as predicates over the platform memory's state(s), platform processors' state(s), and platform network peripheral state where the predicates indicate whether the platform memory's state(s), platform processors' state(s) and platforms network peripheral state satisfy the conditions; and (iv) enforced invariants of the TNSM at a start and at an end of each network operation.

16. The system of claim 8, wherein the computer-executable instructions, when executed by one or more processors, further cause the one or more processors to perform operations comprising acts of defining, in the mathematical model, predicates for the TNSM on the set of computer platforms that are translatable to proof obligations; and providing a theorem prover in the mathematical model, wherein the evaluating the mathematical model further comprises interpreting and verifying the proof obligations using the theorem prover.

17. The system of claim 8, wherein the computer-executable instructions, when executed by the one or more processors, further cause the one or more processors to perform operations comprising acts of defining, in the mathematical model, predicates for the TNSM on the set of computer platforms that are translatable to proof obligations; and providing a model checker in the mathematical model, wherein the evaluating the mathematical model further comprises interpreting and verifying the proof obligations using the model checker.

18. A bastion platform comprising:

one or more processors;

a network peripheral; and at least one non-transitory computer-readable storage medium storing computer-executable instructions that, when executed by the one or more processors, cause the bastion platform to perform a respective operation, the computer-executable instructions comprising a set of program execution elements (PEE), each PEE of the set of PEEs, when executed, having a respective privilege level, is in a respective memory address space, and enforcing a trusted network security mechanism for a set of computer platforms on a network including the bastion platform, wherein the trusted network security mechanism provides mathematically guaranteed enforcement of permitted patterns of operations of the network, the operations of the network including at least one of (i) point-to-point network operations, (ii) broadcast network operations, (iii) multi-cast network operations, and (iv) operations involving access to and manipulation of the state of a computer platform in the set of computer platforms.

19. The bastion platform of claim 18, wherein the trusted network security mechanism comprises an anti-spoofing mechanism that ensures authenticity of network addresses of the computer platforms in the set of computer platforms.

20. The bastion platform of claim 18, wherein the trusted network security mechanism comprises an anti-flooding mechanism that ensures that a network throughput of a computer platform in the set of computer platforms is limited to a predefined threshold.

21. The bastion platform of claim 18, wherein the trusted network security mechanism comprises a secure kill-switch mechanism to completely block network traffic from a computer platform in the set of computer platforms.

22. The bastion platform of claim 18, wherein the trusted network security mechanism comprises a secure patch delivery mechanism that permits a source computer platform in the set of computer platforms to send a tamper-proof, signed patch to a destination computer platform in the set of computer platforms.

23. The bastion platform of claim 18, wherein the trusted network security mechanism comprises a secure network flow mechanism to permit only predefined network packet flow between the computer platforms in the set of computer platforms.

24. A non-transitory computer-readable storage medium storing computer-executable instructions that, when executed by one or more processors, cause the one or more processors to perform a respective operation, the computer-executable instructions comprising:

a set of program execution elements (PEE), each PEE of the set of PEEs, when executed, having a respective privilege level, is in a respective memory address space, and enforcing a trusted network security mechanism for a set of computer platforms on a network, wherein the trusted network security mechanism provides mathematically guaranteed enforcement of permitted patterns of operations of the network, the operations of the network including at least one of (i) point-to-point network operations, (ii) broadcast network operations, (iii) multi-cast network operations, and (iv) operations involving access to and manipulation of the state of a computer platform in the set of computer platforms.

25. The non-transitory computer-readable storage medium of claim 24, wherein the trusted network security mechanism comprises an anti-spoofing mechanism that ensures authenticity of network addresses of the computer platforms in the set of computer platforms.

26. The non-transitory computer-readable storage medium of claim 24, wherein the trusted network security mechanism comprises an anti-flooding mechanism that ensures that a network throughput of a computer platform in the set of computer platforms is limited to a predefined threshold.

27. The non-transitory computer-readable storage medium of claim 24, wherein the trusted network security mechanism comprises a secure kill-switch mechanism to completely block network traffic from a computer platform in the set of computer platforms.

28. The non-transitory computer-readable storage medium of claim 24, wherein the trusted network security mechanism comprises a secure patch-delivery mechanism that permits a source computer platform in the set of computer platforms to send a tamper-proof, signed patch to a destination computer platform in the set of computer platforms.

29. The non-transitory computer-readable storage medium of claim 24, wherein the trusted network security mechanism comprises a secure network flow mechanism to permit only predefined network packet flow between the computer platforms in the set of computer platforms.

30. The non-transitory computer-readable storage medium of claim 24, wherein the computer-executable instructions, when executed by the one or more processors, provide a bastion platform among the set of computer platforms;

the trusted network security mechanism is adapted for the set of computer platforms to further include a set of trusted computer platforms, a set of untrusted computer platforms, and a set of other bastion platforms; and the computer-executable instructions, when executed by the one or more processors, provide a set of ports for the bastion platform, the set of ports including (i) a set of management ports for managing a state of the bastion platform including network policies, (ii) a set of trusted-device ports for connecting to the set of trusted computer platforms, (iii) a set of untrusted-device ports for connecting to the set of untrusted computer platforms, and (iv) a set of bastion-platform ports for connecting to the set of other bastion platforms.

* * * * *